(12) United States Patent
Mitchell et al.

(10) Patent No.: US 8,660,877 B2
(45) Date of Patent: *Feb. 25, 2014

(54) TECHNICIAN CONTROL SYSTEM

(71) Applicant: Accenture Global Services Limited, Dublin (IE)

(72) Inventors: Clarence Mitchell, New York, NY (US); Ankur Mathur, Chicago, IL (US)

(73) Assignee: Accenture Global Services Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 13/685,380

(22) Filed: Nov. 26, 2012

(65) Prior Publication Data

US 2013/0150983 A1 Jun. 13, 2013

Related U.S. Application Data

(63) Continuation of application No. 12/490,730, filed on Jun. 24, 2009, now Pat. No. 8,321,253, which is a continuation-in-part of application No. 12/481,046, filed on Jun. 9, 2009, now Pat. No. 8,364,513.

(51) Int. Cl.
*G06Q 10/00* (2012.01)

(52) U.S. Cl.
USPC ....... 705/7.13; 705/7.11; 705/7.12; 705/7.14; 705/7.15; 705/7.16; 705/7.17; 705/7.18; 705/7.19; 705/7.21; 705/7.22; 705/7.23; 705/7.24; 705/7.25; 705/7.26; 705/7.27

(58) Field of Classification Search
USPC .............................................. 705/7.11–7.42
See application file for complete search history.

(56) References Cited

U.S. PATENT DOCUMENTS

| | | | |
|---|---|---|---|
| 5,467,268 A | | 11/1995 | Sisley et al. |
| 5,687,212 A | | 11/1997 | Kinser et al. |
| 5,920,846 A | * | 7/1999 | Storch et al. .................. 705/7.14 |
| 6,445,912 B1 | * | 9/2002 | Cole et al. ...................... 455/406 |
| 6,578,005 B1 | | 6/2003 | Lesaint et al. |
| 6,671,824 B1 | * | 12/2003 | Hyland et al. .................. 714/26 |
| 7,283,971 B1 | | 10/2007 | Levine et al. |

(Continued)

OTHER PUBLICATIONS

Murthy, Sowmya, Ph.D., "Combined training-scheduling problem for service personnel", The Pennsylvania State University, 1998, 164 pages, AAT9901100.*

(Continued)

*Primary Examiner* — Jason Dunham
*Assistant Examiner* — Amber A Misiaszek
(74) *Attorney, Agent, or Firm* — Fish & Richardson P.C.

(57) ABSTRACT

Technician control, in which a control system is configured to control scheduling and dispatch operations for work orders being handled by technicians. Multiple technician devices are each associated with one or more technicians, are configured to communicate, over a network, with the control system, and also are configured to provide output in response to communications that are received from the control system and that are related to the scheduling and dispatch operations performed by the control system. A set of scheduling configuration options may be pre-defined and user input weighting at least one of the scheduling configuration options relative to other of the scheduling configuration options may be received. A scheduling application used by the control system to perform scheduling operations may be configured based on configuration data that reflects the weighting and scheduling operations may be performed using the configured scheduling application.

20 Claims, 33 Drawing Sheets

(56) References Cited

U.S. PATENT DOCUMENTS

| | | | |
|---|---|---|---|
| 7,346,531 | B2 | 3/2008 | Jacobs |
| 7,373,361 | B2 | 5/2008 | Monroe et al. |
| 7,401,144 | B1 | 7/2008 | Smith et al. |
| 7,406,432 | B1 | 7/2008 | Motoyama |
| 7,487,106 | B2 | 2/2009 | Levine et al. |
| 7,555,440 | B2 | 6/2009 | Ingman |
| 2001/0002464 | A1* | 5/2001 | Hogan .................... 702/186 |
| 2002/0169644 | A1 | 11/2002 | Greene |
| 2005/0015501 | A1* | 1/2005 | Kaplan et al. ............ 709/228 |
| 2006/0111957 | A1* | 5/2006 | Carmi et al. ................ 705/9 |
| 2006/0136902 | A1 | 6/2006 | Monroe et al. |

OTHER PUBLICATIONS

European Search Report issued in Application No. EP 10 00 5955, mailed Sep. 6, 2010, 6 pages.

Field Force Enablement within the Communications Industry. from www.accenture.com dated Oct. 28, 2005.

Media Alert. Accenture, Avanade and Microsoft alliance: harnessing the benefits of Field Force Enablement. Word Document creation date: Nov. 5, 2002.

U.S. Non-Final Office Action for U.S. Appl. No. 12/490,730 dated Sep. 29, 2011, 26 pages.

U.S. Non-Final Office Action for U.S. Appl. No. 12/481,046 dated Oct. 20, 2011, 11 pages.

U.S. Non-Final Office Action for U.S. Appl. No. 12/481,046 dated Apr. 12, 2012, 15 pages.

U.S. Notice of Allowance for U.S. Appl. No. 12/490,730 dated Apr. 3, 2012, 13 pages.

Murthy, Sowmya, Ph.D., 'Combined training-scheduling problem for service personnel', The Pennsylvania State University, 1998, 164 pages, AAT9901100.

* cited by examiner

400

| Scheduling Configuration Option | Description |
|---|---|
| Preferred Status | Account for Any Preferred Status for Customers |
| Provide Shortest Time Windows | Create the Shortest Average Time Window Per Appointment |
| Minimize Response Time | Create an Appointment as Close to Date/Time of Request |
| Room for Same Day Scheduling | Leave Room in the Daily Schedule for Unplanned Work |
| Least Drive Time | Minimize Drive Time Between Work Orders |
| Minimize Overtime | Minimize Amount of Extra Pay for Overtime Work |
| Least Costly Labor Resource | Select Least Costly Labor Resource Per Assignment |
| Same Equipment for Most Jobs | Bunch Orders that Require the Same Equipment Needs |
| Preference to Higher Profit Work | Prioritize Work that has a Higher Profit Margin |
| Maximize Number of Jobs Per Day | Maximize Number of Jobs Performed Per Day |
| Preferred Field Technician | Prioritize Assignment Based On Providing Best-Skilled or Requested Technician |
| Allow for Fill-In Work | Provide Room in Daily Schedule for Fill-In Work |

410 (Scheduling Configuration Option column); 420 (Description column); 430–441 (row labels)

Logic Domain

| | | | |
|---|---|---|---|
| 616a Rules | 616b Objectives | 616c Business Value | 616d Appointment Booking Values |

| Objective Name | Weight |
|---|---|
| 617a ☑ Internal Engineers Preference | 20 |
| 617b ☐ Minimize Elasticity from Late Start | 0 |
| 617c ☑ Minimize Idle Time | 66 |
| 617e ☑ Minimize the use of overtime | 30 |
| 617f ☑ Minimize travel between Assignments | 100 |
| 617g ☑ Minimize travel from Home Base | 20 |
| 617h ☑ Priority By Due Date | 8 |
| 617i ☑ Priority By Proximity to Home Base | 0 |
| 617j ☐ Priority Objective | 10 |
| 617k ☑ Same Site Objective | 100 |
| 617m ☑ Schedule as soon as possible | 10 |
| 617n ☑ Preferred Field Technician | 50 |

618a [Select All]  618b [Select None]   619 [Edit Weight]

618c [Ok]  [Cancel]

| Dictionary Entry – Capacity Limits | ☒ |
|---|---|
| Data Type | Attribute |
| 🔑<br>integer<br>text<br>🔑<br>🔑<br>percentage | Key = 12336600 — 652a<br>Revision = 2 — 652b<br>Name = Indianapolis Capacity — 652c<br>District = Indianapolis — 652d<br>TaskType = Downed Power Lines — 652e<br>CapacityThreshold = 90 — 652f |

Edit — 654a  Save — 654b  Cancel — 654c

Engineer Cost ☒

[ General ]

Relevance group: [ External Engineers ▼ ] — 672a

— Working Time Cost —
Defined in: 673a [ Specific Settings ▼ ]
Cost per Hour: [ 10.00 ]
672b — Overtime Cost —
Defined in: 673b [ Specific Settings ▼ ]
Cost per Hour: [ 0.00 ]
672c — Base Cost per Task —
Defined in: 673c [ Specific Settings ▼ ]
Cost per Hour: [ 40.00 ]
672d — Idle Time Cost —
Defined in: 673d [ Specific Settings ▼ ]
Cost per Hour: [ 30.00 ]
672e 674a [ Ok ]   [ Cancel ]
                          674b

FIG. 6I

TECHNICIAN CONTROL SYSTEM

CROSS-REFERENCE TO RELATED APPLICATIONS

This application is a continuation (and claims the benefit of priority under 35 USC 120) of U.S. patent application Ser. No. 12/490,730, filed Jun. 24, 2009, which is a continuation-in-part of U.S. patent application Ser. No. 12/481,046, filed Jun. 9, 2009, now allowed. Both of these prior applications are incorporated herein by reference in their entirety.

FIELD

The present disclosure generally relates to control systems.

BACKGROUND

Scheduling and dispatch services may help to manage a mobile technician workforce. A dispatch system may be used for managing mobile technicians working with home security, plumbing, taxi services, courier, emergency, pest control, natural gas, cable, electrical services, telecommunications, satellite television, HVAC (heating, ventilating, and air conditioning), appliance repair, other utility services, and other types of installation, repair, or other services.

SUMMARY

In one aspect, a technician control system includes a control system configured to control scheduling and dispatch operations for work orders being handled by technicians associated with a client, at least one electronic data store configured to store data associated with the client and multiple technician devices that are each associated with one or more technicians, configured to communicate, over a network, with the control system, and configured to provide output in response to communications that are received from the control system and that are related to the scheduling and dispatch operations performed by the control system. The control system includes at least one processor configured to perform operations that include aggregating a set of predefined scheduling configuration options. At least one scheduling configuration option represents a scheduling goal and impacts multiple parameters of a scheduling application when selected. The operations also include receiving, from the client, user input weighting at least one of the scheduling configuration options relative to other of the scheduling configuration options and storing, in the at least one electronic data store and in association with the client, configuration data that reflects the weighting of at least one of the scheduling configuration options relative to other of the scheduling configuration options. The operations further include, based on the configuration data that reflects the weighting of at least one of the scheduling configuration options relative to other of the scheduling configuration options, configuring, for the client, a scheduling application used by the control system to perform scheduling operations for the client. The configuration includes modification of more parameters of the scheduling application than scheduling configuration options related to the user input. In addition, the operations include performing scheduling operations for the client using the configured scheduling application.

Implementations may include one or more of the following features. For example, the operations may include receiving user input selecting a subset of the scheduling configuration options. The selected subset may represent scheduling goals on which the user would like to focus in performing scheduling operations. The operations also may include identifying scheduling rules that relate to the selected subset of the scheduling configuration options, tailoring the identified scheduling rules based on the selected subset of the scheduling configuration options, and configuring, for the client, the scheduling application to use the tailored scheduling rules.

In some implementations, the operations may include receiving user input setting weighting parameters for one or more of the scheduling configuration options. In these implementations, the operations may include mapping the weighting parameters for the one or more of the scheduling configuration options to a set of rules and configuration variables and adapting, in accordance with the weighting parameters, the scheduling application based on the set of rules and configuration variables. The operations also may include receiving, from a client system associated with the client, data defining unscheduled work orders associated with the client and assigning, using the configured scheduling application, the unscheduled work orders to one or more of the technicians associated with the client.

In some examples, the operations may include identifying technicians supervised by a particular supervisor that uses a particular device, determining progress of scheduled work orders for each of the identified technicians, and enabling the supervisor to view data reflecting the determined progress of scheduled work orders. In these examples, the operations may include monitoring progress of the scheduled work orders for each of the identified technicians and, based on the monitoring, detecting whether a schedule or quality issue occurs in the scheduled work orders for each of the identified technicians. In response to detecting that a schedule or quality issue has occurred in at least one of the scheduled work orders being handled by at least one of the identified technicians, a message may be sent to the particular device used by the particular supervisor to alert the supervisor of the detected issue and the supervisor may be assisted in taking action to correct the detected issue.

In addition, the operations may include comparing progress of a particular work order being handled by a particular technician to an expected progress for the particular work order and, based on the comparison, determining whether the progress of the particular work order being handled by the particular technician is behind the expected progress by more than a threshold amount. The operations also may include detecting an issue in response to a determination that the progress of the particular work order being handled by the particular technician is behind the expected progress by more than the threshold amount and detecting that an issue does not exist in response to a determination that the progress of the particular work order being handled by the particular technician is not behind the expected progress by more than the threshold amount.

In some examples, the operations further may include sending, to the particular device used by the particular supervisor, a message to alert the supervisor of the detected issue comprises sending a message that indicates that the particular technician is behind schedule in performing the particular work order, that provides an indication of the progress of the particular work order being handled by the particular technician, and that provides an indication of the expected progress. In these examples, the operations may include enabling the supervisor to respond to the message by communicating with the particular technician, enabling the supervisor to respond to the message by receiving directions to attend the particular work order, and enabling the supervisor to respond to the message by sending another technician to assist the particular technician with the particular work order.

The operations may include determining an expected amount of time remaining for a particular technician to complete a particular work order being handled by the particular technician, determining a travel time between a location of the particular work order and a location of a next work order scheduled for completion by the particular technician, and identifying a scheduled start time of the next work order scheduled for completion by the particular technician. The operations also may include analyzing the expected amount of time remaining for the particular technician to complete the particular work order and the determined travel time with respect to the scheduled start time of the next work order and, based on the analysis, determining whether the particular technician is likely to miss the scheduled start time of the next work order. The operations further may include detecting an issue in response to a determination that the particular technician is likely to miss the scheduled start time of the next work order and detecting that an issue does not exist in response to a determination that the particular technician is not likely to miss the scheduled start time of the next work order.

In some implementations, the operations may include sending, to the particular device used by the particular supervisor, a message to alert the supervisor of the detected issue comprises sending a message that indicates that the particular technician is likely to miss the scheduled start time of the next work order, that provides an indication of the expected amount of time remaining for the particular technician to complete the particular work order, that provides an indication of the determined travel time, and that provides an indication of the scheduled start time of the next work order. In these implementations, the operations may include enabling the supervisor to respond to the message by rescheduling the next work order for the particular technician and enabling the supervisor to respond to the message by communicating with a customer corresponding to the next work order.

In some examples, the control system may be configured to control scheduling and dispatch operations for multiple, different clients, the at least one electronic data store may be configured to maintain segregated data areas for each of the multiple, different clients, control access to the segregated areas using admission rights, and store configuration data for each of the multiple, different clients; and the control system may be further configured to control scheduling and dispatch operations for each of the multiple, different clients in a configured manner that leverages the stored configuration data for each of the multiple, different clients. In these examples, the operations may include establishing a particular client and defining, in the at least one electronic data store, a segregated data area for the particular client. The segregated data area may be separate from other data areas associated with other clients of the control system. The operations also may include setting admission rights and privileges for the particular client to enable users associated with the particular client to access the segregated data area, enabling the particular client to configure standard, pre-defined assets and applications of the control system, and storing configuration data for the particular client that reflects configurations to the standard, pre-defined assets and applications made by the particular client.

In these examples, the operations may include receiving a request from a technician device, identifying, from among the multiple, different clients, a client associated with the technician device, comparing admission rights of the technician device to admission rights of the identified client, and, based on the comparison, determining whether the technician device is authorized to perform the request. In response to a determination that the technician device is not authorized to perform the request, the request may be denied. In response to a determination that the technician device is authorized to perform the request, the request may be handled using standard, pre-defined assets and applications based on configurations defined by the identified client and data related to the request may be stored in a segregated data area associated with the identified client.

In another aspect, a computer-implemented method includes aggregating, at a control system, a pre-defined set of scheduling configuration options. At least one scheduling configuration option represents a scheduling goal and impacts multiple parameters of a scheduling application when selected. The method also includes receiving, from a client, user input weighting at least one of the scheduling configuration options relative to other of the scheduling configuration options and storing, in at least one electronic data store of the control system and in association with the client, configuration data that reflects the weighting of at least one of the scheduling configuration options relative to other of the scheduling configuration options. The method further includes, based on the configuration data that reflects the weighting of at least one of the scheduling configuration options relative to other of the scheduling configuration options, configuring, for the client using at least one processor of the control system, a scheduling application used by the control system to perform scheduling operations for the client. The configuration includes modification of more parameters of the scheduling application than scheduling configuration options related to the user input. In addition, the method includes performing, using at least one processor of the control system, scheduling operations for the client using the configured scheduling application.

Implementations may include one or more of the following features. For example, the method may include receiving user input selecting a subset of the scheduling configuration options, the selected subset representing scheduling goals on which the user would like to focus in performing scheduling operations. The method also may include identifying scheduling rules that relate to the selected subset of the scheduling configuration options, tailoring the identified scheduling rules based on the selected subset of the scheduling configuration options, and configuring, for the client, the scheduling application to use the tailored scheduling rules.

In some examples, the method may include receiving user input setting weightings parameters for one or more of the scheduling configuration options. In these examples, the method may include mapping the weighting parameters for the one or more of the scheduling configuration options to a set of rules and configuration variables and adapting, in accordance with the weighting parameters, the scheduling application based on the set of rules and configuration variables. The method also may include receiving, from a client system associated with the client, data defining unscheduled work orders associated with the client and assigning, using the configured scheduling application, the unscheduled work orders to one or more of technicians associated with the client.

In some implementations, the method may include identifying technicians supervised by a particular supervisor that uses a particular device, determining progress of scheduled work orders for each of the identified technicians, and enabling the supervisor to view data reflecting the determined progress of scheduled work orders. In these implementations, the method may include monitoring progress of the scheduled work orders for each of the identified technicians and, based on the monitoring, detecting whether a schedule or quality issue occurs in the scheduled work orders for each of the identified technicians. In response to detecting that a schedule or quality issue has occurred in at least one of the scheduled work orders being handled by at least one of the identified technicians, a message may be sent to the particular device used by the particular supervisor to alert the supervisor of the detected issue, and the supervisor may be assisted in taking action to correct the detected issue.

In these implementations, the method may include comparing progress of a particular work order being handled by a particular technician to an expected progress for the particular work order and, based on the comparison, determining whether the progress of the particular work order being handled by the particular technician is behind the expected progress by more than a threshold amount. The method also may include detecting an issue in response to a determination that the progress of the particular work order being handled by the particular technician is behind the expected progress by more than the threshold amount and detecting that an issue does not exist in response to a determination that the progress of the particular work order being handled by the particular technician is not behind the expected progress by more than the threshold amount. The method further may include sending a message that indicates that the particular technician is behind schedule in performing the particular work order, that provides an indication of the progress of the particular work order being handled by the particular technician, and that provides an indication of the expected progress. In addition, the method may include enabling the supervisor to respond to the message by communicating with the particular technician, enabling the supervisor to respond to the message by receiving directions to attend the particular work order, and enabling the supervisor to respond to the message by sending another technician to assist the particular technician with the particular work order.

In these implementations, the method may include determining an expected amount of time remaining for a particular technician to complete a particular work order being handled by the particular technician, determining a travel time between a location of the particular work order and a location of a next work order scheduled for completion by the particular technician, and identifying a scheduled start time of the next work order scheduled for completion by the particular technician. The method also may include analyzing the expected amount of time remaining for the particular technician to complete the particular work order and the determined travel time with respect to the scheduled start time of the next work order and, based on the analysis, determining whether the particular technician is likely to miss the scheduled start time of the next work order. The method further may include detecting an issue in response to a determination that the particular technician is likely to miss the scheduled start time of the next work order and detecting that an issue does not exist in response to a determination that the particular technician is not likely to miss the scheduled start time of the next work order. In addition, the method may include sending a message that indicates that the particular technician is likely to miss the scheduled start time of the next work order, that provides an indication of the expected amount of time remaining for the particular technician to complete the particular work order, that provides an indication of the determined travel time, and that provides an indication of the scheduled start time of the next work order. The method further may include enabling the supervisor to respond to the message by rescheduling the next work order for the particular technician and enabling the supervisor to respond to the message by communicating with a customer corresponding to the next work order.

In some examples, the method may include establishing a particular client and defining, in the at least one electronic data store, a segregated data area for the particular client. The segregated data area may be separate from other data areas associated with other clients of the control system. In these examples, the method may include setting admission rights and privileges for the particular client to enable users associated with the particular client to access the segregated data area, enabling the particular client to configure standard, pre-defined assets and applications of the control system, and storing configuration data for the particular client that reflects configurations to the standard, pre-defined assets and applications made by the particular client.

In these examples, the method may include receiving a request from a technician device, identifying, from among multiple, different clients, a client associated with the technician device, comparing admission rights of the technician device to admission rights of the identified client, and, based on the comparison, determining whether the technician device is authorized to perform the request. In response to a determination that the technician device is not authorized to perform the request, the request may be denied. In response to a determination that the technician device is authorized to perform the request, the request may be handled using standard, pre-defined assets and applications based on configurations defined by the identified client and data related to the request may be stored in a segregated data area associated with the identified client.

In yet another aspect, at least one computer-readable storage medium is encoded with executable instructions that, when executed by at least one processor, cause the at least one processor to perform operations that include aggregating, at a control system, a pre-defined set of scheduling configuration options. At least one scheduling configuration option represents a scheduling goal and impacts multiple parameters of a scheduling application when selected. The operations also includes receiving, from a client, user input weighting at least one of the scheduling configuration options relative to other of the scheduling configuration options and storing, in at least one electronic data store of the control system and in association with the client, configuration data that reflects the weighting of at least one of the scheduling configuration options relative to other of the scheduling configuration options. The operations further includes, based on the configuration data that reflects the weighting of at least one of the scheduling configuration options relative to other of the scheduling configuration options, configuring, for the client using at least one processor of the control system, a scheduling application used by the control system to perform scheduling operations for the client. The configuration includes modification of more parameters of the scheduling application than scheduling configuration options related to the user input. In addition, the operations include performing, using at least one processor of the control system, scheduling operations for the client using the configured scheduling application.

In another aspect, a technician control system includes a control system configured to control processing of work orders being handled by technicians in each of multiple, different industries, at least one electronic data store configured to store work order data and work flow data for each of the multiple, different industries, and multiple technician devices that are each associated with one or more technicians, configured to communicate, over a network, with the control system, and configured to provide output in response to communications that are received from the control system and that are related to the processing of work orders. The control system includes at least one processor configured to perform operations that include defining, in the at least one electronic data store, work order data for work orders corresponding to each of the multiple, different industries based on user input and defining, in the at least one electronic data store, work flow data for the work orders corresponding to each of the multiple, different industries based on user input. The operations also include configuring the technician control system to leverage the defined work order data and the defined work flow data in performing work order processing for technicians in the multiple, different industries, and enabling processing of work orders for technicians in the multiple, different industries using the defined work order data and the defined work flow data.

Implementations may include one or more of the following features. For example, the operations may include establishing a first client that manages technicians that operate in a first industry and establishing a second client that manages technicians that operate in a second industry that is different than the first industry, the second client being different than the first client. In this example, the operations also may include determining the first industry associated with the first client and determining the second industry associated with the second client. The operations further may include configuring the technician control system to leverage first pre-defined work order and work flow data associated with the first industry for technicians managed by the first client and configuring the technician control system to leverage second pre-defined work order and work flow data associated with the second industry for technicians managed by the second client. The first pre-defined work order and work flow data may have been defined in the technician control system prior to establishing the first client and the second pre-defined work order and work flow data may have been defined in the technician control system prior to establishing the second client and may be different than the first pre-defined work order and work flow data.

The operations may include defining, prior to establishing the first client and in the at least one electronic data store, the first pre-defined work order and work flow data based on input received from an entity operating the technician control system. The entity operating the technician control system may be different than the first client. The operations also may include defining, prior to establishing the second client and in the at least one electronic data store, the second pre-defined work order and work flow data based on input received from the entity operating the technician control system. The entity operating the technician control system also may be different than the second client.

In some implementations, the operations may include receiving a request associated with a work order from a technician device and accessing, from the at least one electronic data store, pre-defined work order data and work flow data related to handling the work order based on an industry associated with the technician device. In these implementations, the operations may include controlling user interface display on the technician device and data collection on the technician device related to the work order based on the accessed work order data and controlling processing flow related to handling the work order on the technician device based on the accessed work flow data.

Further, the operations may include determining, from among the multiple, different industries, the industry associated with the technician device and accessing, from the at least one electronic data store, pre-defined work order data and work flow data for the determined industry. In addition, the operations may include identifying, from among multiple clients, a client associated with the technician device and accessing, from the at least one electronic data store, pre-defined work order data and work flow data for which the technician control system has been configured to leverage for the identified client.

In some examples, the operations may include establishing a first client that manages technicians that operate in a first industry and establishing a second client that manages technicians that operate in the first industry. The second client may be different than the first client. In these example, the operations also may include determining the first industry associated with the first client and determining the first industry associated with the second client. The operations further may include configuring the technician control system to leverage first pre-defined work order and work flow data associated with the first industry for technicians managed by the first client and configuring the technician control system to leverage the first pre-defined work order and work flow data associated with the first industry for technicians managed by the second client. The first pre-defined work order and work flow data may have been defined in the technician control system prior to establishing the first client and the first pre-defined work order and work flow data may have been defined in the technician control system prior to establishing the second client.

In some implementations, the operations may include establishing a first client that manages technicians that operate in a first industry and technicians that operate in a second industry that is different than the first industry and determining the first industry associated with the first client and the second industry associated with the first client. In these implementations, the operations may include configuring the technician control system to leverage first pre-defined work order and work flow data associated with the first industry for the technicians managed by the first client that operate in the first industry and to leverage second pre-defined work order and work flow data associated with the second industry for the technicians managed by the first client that operate in the second industry. The first pre-defined work order and work flow data may be different than the second pre-defined work order and work flow data and both the first pre-defined work order and work flow data and the second pre-defined work order and work flow data may have been defined in the technician control system prior to establishing the first client.

Further, the operations may include controlling user interface display and data collection for technician devices using the defined work order data and controlling work flow processing for the technician devices using the defined work flow data. The operations also may include sending the defined work order data and the defined work flow data to technician devices to enable the technician devices to process work orders.

In another aspect, a computer-implemented method includes defining, in at least one electronic data store of a technician control system, work order data for work orders corresponding to each of multiple, different industries based on user input and defining, in the at least one electronic data store of the technician control system, work flow data for the work orders corresponding to each of the multiple, different industries based on user input. The method also includes configuring the technician control system to leverage the defined work order data and the defined work flow data in performing work order processing for technicians in the multiple, different industries and enabling processing of work orders for technicians in the multiple, different industries using the defined work order data and the defined work flow data.

Implementations may include one or more of the following features. For example, the method may include establishing a first client that manages technicians that operate in a first industry and establishing a second client that manages technicians that operate in a second industry that is different than the first industry, the second client being different than the first client. In this example, the method also may include determining the first industry associated with the first client and determining the second industry associated with the second client. The method further may include configuring the technician control system to leverage first pre-defined work order and work flow data associated with the first industry for technicians managed by the first client and configuring the technician control system to leverage second pre-defined work order and work flow data associated with the second industry for technicians managed by the second client. The first pre-defined work order and work flow data may have been defined in the technician control system prior to establishing the first client and the second pre-defined work order and work flow data may have been defined in the technician control system prior to establishing the second client and may be different than the first pre-defined work order and work flow data.

The method may include defining, prior to establishing the first client and in the at least one electronic data store, the first pre-defined work order and work flow data based on input received from an entity operating the technician control system. The entity operating the technician control system may be different than the first client. The method also may include defining, prior to establishing the second client and in the at least one electronic data store, the second pre-defined work order and work flow data based on input received from the entity operating the technician control system. The entity operating the technician control system may be different than the second client.

In some implementations, the method may include receiving a request associated with a work order from a technician device and accessing, from the at least one electronic data store, pre-defined work order data and work flow data related to handling the work order based on an industry associated with the technician device. In these implementations, the method may include controlling user interface display on the technician device and data collection on the technician device related to the work order based on the accessed work order data and controlling processing flow related to handling the work order on the technician device based on the accessed work flow data.

Further, the method may include determining, from among the multiple, different industries, the industry associated with the technician device and accessing, from the at least one electronic data store, pre-defined work order data and work flow data for the determined industry. In addition, the method may include identifying, from among multiple clients, a client associated with the technician device and accessing, from the at least one electronic data store, pre-defined work order data and work flow data for which the technician control system has been configured to leverage for the identified client.

In some examples, the method may include establishing a first client that manages technicians that operate in a first industry and establishing a second client that manages technicians that operate in the first industry, the second client being different than the first client. In these example, the method also may include determining the first industry associated with the first client and determining the first industry associated with the second client. The method further may include configuring the technician control system to leverage first pre-defined work order and work flow data associated with the first industry for technicians managed by the first client and configuring the technician control system to leverage the first pre-defined work order and work flow data associated with the first industry for technicians managed by the second client. The first pre-defined work order and work flow data may have been defined in the technician control system prior to establishing the first client and the first pre-defined work order and work flow data may have been defined in the technician control system prior to establishing the second client.

In some implementations, the method may include establishing a first client that manages technicians that operate in a first industry and technicians that operate in a second industry that is different than the first industry and determining the first industry associated with the first client and the second industry associated with the first client. In these implementations, the method may include configuring the technician control system to leverage first pre-defined work order and work flow data associated with the first industry for the technicians managed by the first client that operate in the first industry and to leverage second pre-defined work order and work flow data associated with the second industry for the technicians managed by the first client that operate in the second industry. The first pre-defined work order and work flow data may be different than the second pre-defined work order and work flow data and both the first pre-defined work order and work flow data and the second pre-defined work order and work flow data may have been defined in the technician control system prior to establishing the first client. Further, the method may include controlling user interface display and data collection for technician devices using the defined work order data and controlling work flow processing for the technician devices using the defined work flow data.

In yet another aspect, at least one computer-readable storage medium is encoded with executable instructions that, when executed by at least one processor, cause the at least one processor to perform operations. The operations include defining, in at least one electronic data store of a technician control system, work order data for work orders corresponding to each of multiple, different industries based on user input and defining, in the at least one electronic data store of the technician control system, work flow data for the work orders corresponding to each of the multiple, different industries based on user input. The operations also include configuring the technician control system to leverage the defined work order data and the defined work flow data in performing work order processing for technicians in the multiple, different industries and enabling processing of work orders for technicians in the multiple, different industries using the defined work order data and the defined work flow data.

Implementations of any of the techniques described throughout the disclosure may include a method or process, a system, or instructions stored on a computer-readable storage device. The details of particular implementations are set forth in the accompanying drawings and description below. Other features will be apparent from the following description, including the drawings, and the claims.

BRIEF DESCRIPTION OF THE DRAWINGS

FIG. 4 illustrates example scheduling configuration options.

FIGS. 6B to 6K are example interfaces for tailoring scheduling rules.

Like reference numbers represent corresponding parts throughout.

DETAILED DESCRIPTION

A technician control system enables multiple clients to leverage integrated technician control applications and configure the integrated technician control applications to client specifications. For instance, the technician control system may include a scheduling application that prioritizes schedules and use of resources based on client configuration settings. To establish configured settings, a client may provide user input weighting a set of pre-defined scheduling configuration options. A scheduling configuration option may represent a scheduling goal that impacts multiple parameters of the scheduling application. The technician control system automatically configures the scheduling application by modifying parameters of the scheduling application based on the weighting of the pre-defined scheduling configuration options provided by the client.

Figure 1:
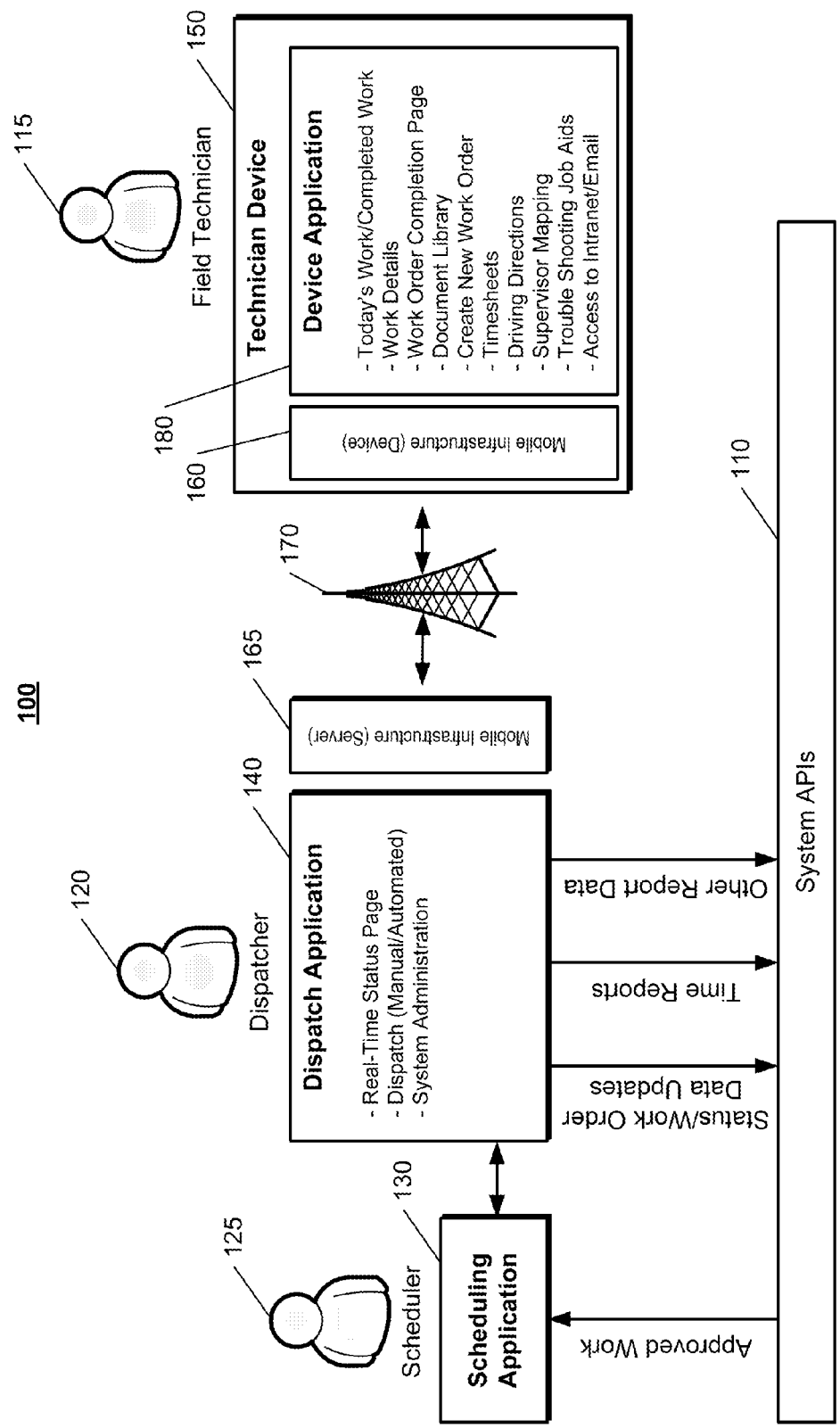
FIG. 1 is a contextual diagram of an exemplary technician control system.

FIG. 1 is a contextual diagram of a technician control system 100. The technician control system 100 includes several pre-integrated technician control solutions that may be leveraged by multiple clients. For instance, the technician control system 100 may include pre-integrated scheduling, dispatch, and mobility applications that multiple clients may leverage and configure to fit specific needs. Based on the integration of a number of control solutions, the technician control system 100 may enable an end-to-end workforce management (WFM) solution provided on a hosted/services basis (e.g., the technician control system may host WFM services and applications for multiple clients). The technician control system 100 may include WFM applications for sophisticated scheduling, dispatch and productivity applications, wireless network access, mobile device, help desk, application hosting and maintenance on a "per-month per-technician" pricing structure (e.g., clients may be charged a particular rate per month, based on the number of technicians who use the system).

The technician control system 100 provides a set of system application programming interfaces (API's) 110 for scheduling, dispatch, and other aspects of managing a mobile technician workforce. The technician control system may automate some or all scheduling and dispatch processes, may help reduce human error, may increase consistency across multiple manual schedulers, may improve schedule efficiency by using automated processes rather than manual scheduling, and may help minimize cost while maintaining customer service.

The technician control system 100 may be configured to control scheduling and dispatch operations for multiple, different clients, and possibly for clients related to different industries. The technician control system 100 includes an electronic data store which is configured to maintain segregated data areas for each of the clients, to control access to the segregated areas using admission rights, and to store configuration data for each of the clients. Scheduling and dispatch operations may be controlled for each of the clients in a configured manner that leverages the stored configuration data for each of the clients. Multiple field technicians 115 may be associated with (e.g., work for) a particular client. Also, multiple dispatcher 120 and scheduler 125 users may control dispatching and scheduling operations for one or more clients leveraging the integrated scheduling and dispatch applications.

One or more schedulers 125 may use a scheduling application 130 to define work schedules for some or all of the field technicians 115 associated with a client. The scheduler 125 performs scheduling operations for the client, using the scheduling application 130 to assign unscheduled work orders to one or more of the field technicians 115 associated with the client. In some implementations, work orders are scheduled automatically by the scheduling application 130. The scheduler 125 can review the generated schedule and make changes if desired.

Historical work orders may be monitored and future work orders may be forecasted to help plan the number and skills of technicians that may be needed for a particular client. In some implementations, data defining unscheduled work orders associated with a client may be received from a client system. In other implementations, data defining work orders may be received from a call center component of the technician control system 100 and/or from an online customer appointment reservation component of the technician control system 100. Customers may make appointments in advance or may schedule an appointment for same-day service.

Scheduling performed by the scheduling application 130 may be configured for each client. Each client may weigh each of a set of scheduling configuration options, where a scheduling configuration option represents a high level scheduling goal (e.g., minimize overtime, minimize appointment window). Configuration data that reflects the client weighting of scheduling configuration options may be stored in an electronic data store and the scheduling application 130 may be configured based on the configuration data. For example, one or more parameters, and/or configuration variables of the scheduling application 130 may be modified for performing scheduling operations for the client based on the configuration data.

The scheduling application 130 prioritizes schedules and use of resources based on client configuration settings. For example, a schedule may maximize billable hours and number of service calls while avoiding overtime. Technicians may be matched to work orders based, for example, on skills, experience, licensure, parts on hand, distance to the work site, job priority, and/or union status. The scheduling application 130 may, for example, use street-level routing to determine optimal routes for field technicians 115 in order to minimize drive time and fuel consumption. The scheduling application 130 may use zoning, where a technician is limited to performing work orders within a defined geographic area. A schedule may be prepared for field technicians 115 on a daily basis, or on some other frequency.

One or more dispatchers 120 may use a dispatch application 140 to convey schedule change information to the field technicians 115 and to manage alerts and reminders related to each of the scheduled appointments. The dispatcher 120 views the work orders happening during the current day, and manages changes that may occur due to schedule deviations (e.g., technician illness, technician stuck in traffic). The dispatcher 120 may view a real-time status interface which provides a filterable view of all field technicians 115 and work orders out in the field, such as in a list or displayed on a map. A GPS (Global Positioning Satellite) component of technician device 150 may pinpoint the location of a field technician 115.

The dispatch application 140 may be configured for each client based on stored configuration data. The dispatch application 140 may be used to respond to events that occur throughout the work day. For example, work orders may be assigned or reassigned to balance assignments (e.g., either manually by the dispatcher 120 or automatically by the dispatch application 140). A work order may be reassigned if a field technician 115 is delayed on a work order and may not arrive on time for the next scheduled work order. Field technicians 115 may be assigned or reassigned to high-priority or emergency work orders. Field technicians 115 may be manually or automatically rerouted based on dynamic traffic condition information. A field technician 115 may be assigned to a work order located in an adjacent zone, if the dispatcher 120 and/or the dispatching application 140 determine that the assigned field technician 115 is the most optimal choice. In response to work order completion, parts inventory may be maintained and resupply of parts use for repair may be initiated. The dispatcher 120 may communicate through voice and/or electronic communication, in real-time or non real-time, with field technicians 115, as needed.

A field technician 115 may use the technician device 150 to communicate with the dispatcher 120 and/or other technicians (e.g., a supervisor). The technician device 150 includes a mobile infrastructure 160, which enables the technician device 150 to communicate with a server mobile infrastructure 165 over a network 170. The mobile infrastructure 160-165 allows the field technicians 115 to work in an intermittently connected environment (e.g., work either online of offline), enables the software running on the technician device 150 to be updated remotely, and manages security protocols and authentication for technician devices 115, the network 170 and one or more server devices.

The network 170 may be one or more public or private, wireless and/or wired networks, such as the Internet or a WAN (wide area network). The network 170 may be an IP (Internet Protocol) based network, using, for example, technologies such as UMTS (Universal Mobile Telecommunications System), CDMA (Code Division Multiple Access), GPRS (General Packet Radio Service), or EVDO (Evolution Data Optimized). The mobile infrastructure 160 may be configured to detect and to switch to the most efficient network based on a set of pre-configured rules.

The technician device 150 may be a handheld PC (personal computer), wireless handheld device, laptop, smart phone, desktop computer, or other device. The technician device 150 executes a device application 180. The device application 180 may include various functionality. For example, the device application 180 may include functionality related to work orders, such as providing the ability to display a view of the current day's completed and yet-to-be-completed work orders. Work orders may be displayed in a filtered list. Work orders may also be displayed in a map view, with map markers indicating locations of assigned work orders. Driving directions may be provided, informing the field technician 115 how to get from one work order location to the next work order location.

A field technician 115 may select a particular work order to view additional details about the work order, such as details about the customer, involved field assets, and tasks to be performed related to the work order. A work-order completion interface may be used for validation of work order details at the point of completion of a work order. While in the field, a field technician 115 may be able to create a new work-order using the technician device 150. Information about the new work order may be transmitted to the dispatch application 140 and the new work order may be scheduled.

A document library feature may provide a field technician 115 with a library of online manuals that may be referenced when servicing work orders. For example, manuals for various equipment that the field technician 115 may use or service may be stored on the technician device 150. As another example, the document library may include regulatory compliance information, or information on access guidelines for accessing equipment at a customer site The document library may be updated as new versions of documents become available (e.g., updated manuals or manuals for new equipment). The device application 180 may also provide the field technician 115 with a knowledge base of trouble shooting job aids. The knowledge base may provide field access to electronic trouble shooting documents describing how to debug various equipment and assess problems. For example, a field technician 115 may select a document from a list of documents associated with a particular item of equipment, or a field technician 115 may select a document from a list of documents displayed in a search results list. The document library information may be accessed from electronic storage on the technician device 150 or may be received over the network 170 from another electronic device (e.g., from the dispatch application 140, from another technician device, from a web server, etc.).

The device application 180 may provide timesheet functionality. For example, field technician 115 login, logout and status changes may be captured to automate timesheet entry and completion. As another example, timesheets may accurately capture the duration and task break down of a work order. A timesheet application may review timestamps from each status change (e.g., accepted, traveling-to-site, on-site, completed) and then present these timestamps to the field technician 115 for verification. A supervisor interface may be displayed on the device application 180, allowing a supervisor to view the field locations of allocated field technicians 115, to change assignments of work orders, and to generally respond to schedule and quality issues. The technician control system 100 may include various administrative functions. Administrative functions may be provided by the scheduling application 130, the dispatch application 140, or by one or more other integrated components of the technician control system 100. For example, account and user information for field technicians 115, schedulers 125, and dispatchers 120 may be managed and maintained. Work order types and configuration information may be managed. Document libraries and other reference information may be updated. Other administrative features may include device management, reporting, customer data management, maintaining information on equipment at customer locations, parts inventory control, historical service data access, and routing and GIS (geographic information system) updates (e.g., due to new roads or road construction).

Figure 2:
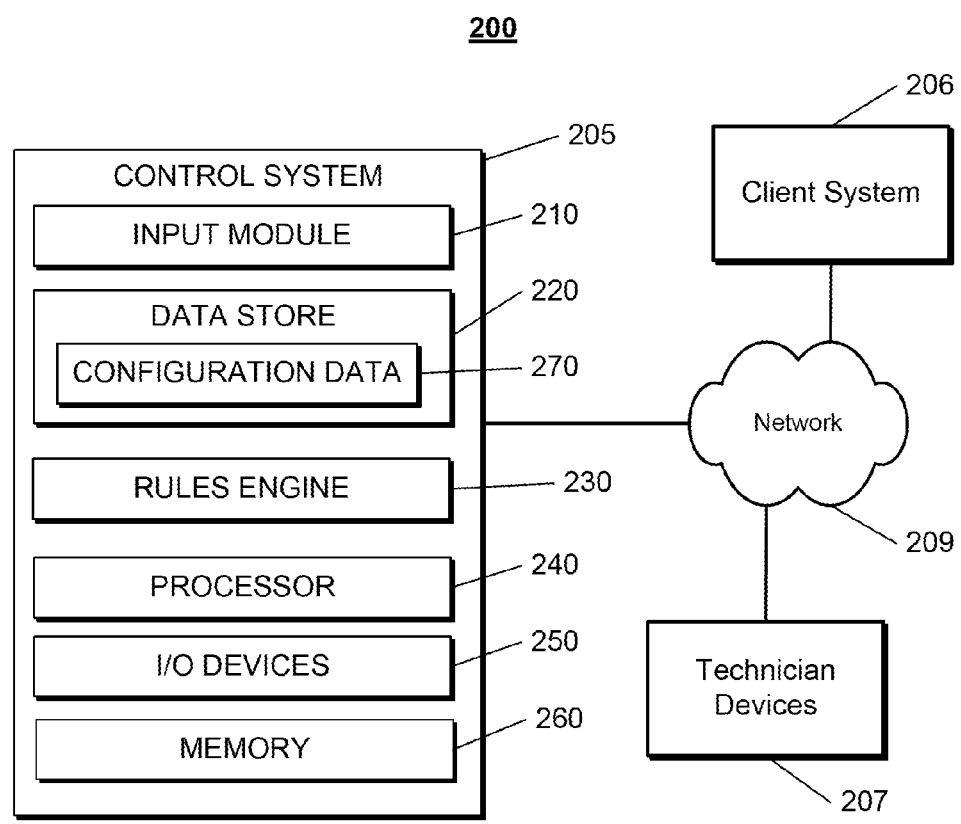
FIG. 2 is a block diagram illustrating an exemplary control system.

FIG. 2 illustrates a system 200 which includes a control system 205 connected to one or more client systems 206 and one or more technician devices 207 over a network 209. The control system 205 includes an input module 210, a data store 220, a rules engine 230, a processor 240, one or more I/O (Input/Output) devices 250, and memory 260. The control system 205 may communicate with a different client system 206 for each client serviced by the control system 205. Since each client may have multiple field technicians, the control system 205 may communicate with multiple technician devices 207 per client. The network 209 may be an IP (Internet Protocol) based network, using, for example, technologies such as UMTS (Universal Mobile Telecommunications System), CDMA (Code Division Multiple Access), GPRS (General Packet Radio Service), or EVDO (Evolution Data Optimized). Each of the technician devices 207 may be a handheld PC (personal computer), wireless handheld device, laptop, smart phone, desktop computer, or other device.

The input module 210 may be used to input any type of information related to performing technician control. The input module 210 may input configuration data or information about unscheduled work orders. For example, configuration data or information about unscheduled work orders for a client may be received from the client system 206. As another example, the input module 210 may receive information about unscheduled work orders from a call center component of the control system 205, and/or from an online customer appointment reservation component of the control system 205.

In some implementations, data from the input module 210 is stored in the data store 220. The data store 220 may be, for example, a relational database that logically organizes data into a series of database tables. The data included in the data store 220 may be, for example, data resulting from a particular process (e.g., scheduling data, dispatch data, technician work order completion data, and/or other types of report data related to technician performance). Each database table arranges data in a series of columns (where each column represents an attribute of the data stored in the database) and rows (where each row represents attribute values). The data store 220 may be, for example, an object-oriented database that logically or physically organizes data into a series of objects. Each object may be associated with a series of attribute values. The data store 220 also may be a type of database management system that is not necessarily a relational or object-oriented database. For example, a series of XML (Extensible Mark-up Language) files or documents may be used, where each XML file or document includes attributes and attribute values. Data included in the data store 220 may be identified by a unique identifier such that data related to a particular process may be retrieved from the data store 220.

The data store 220 may be configured to maintain segregated data areas for each of the clients and control access to the segregated areas using admission rights. For example, the data store 220 may include configuration data 270 for each client. The configuration data 270 may store data, for each client, that reflects technician data related to technicians associated with the client (e.g., personnel information, work order status, technician scheduling, etc.) and configured client settings for controlling the integrated components of the control system 205. For instance, the configuration data 270 may include client weighting of various scheduling configuration options used to control scheduling operations, client configured work orders, client configured documents, etc. The configuration data 270 may also include, for each client, historical data on completed work orders. The historical data may be used to forecast future work orders to help plan the number and skills of technicians that may be needed for a particular client.

The rules engine 230 may identify scheduling rules that relate to a client-selected subset of scheduling configuration options. The scheduling rules may be identified by comparing the selected subset of the scheduling configuration options to data mapping scheduling configuration options to rules of a scheduling application. A particular scheduling configuration option may correspond to many, different scheduling rules and, therefore, the number of scheduling rules may be greater than (perhaps, significantly greater than) the number of selected scheduling configuration options. Identified scheduling rules may be used by one or more scheduling applications. An identified scheduling rule may be based on one or more configurable parameters.

The processor 240 may be a processor suitable for the execution of a computer program such as a general or special purpose microprocessor, and any one or more processors of any kind of digital computer. In some implementations, the control system 205 includes more than one processor 240. The processor 240 may receive instructions and data from memory 260. Memory 260 may store instructions and data corresponding to any or all of the components of the control system 205. Memory 260 may include read-only memory, random-access memory, or both.

The I/O devices 250 are configured to provide input to and output from the control system 205. For example, the I/O devices 250 may include a mouse, a keyboard, a stylus, or any other device that allows the input of data into the control system 205 or otherwise communicate with the control system 205. The I/O devices 250 may also include a display, a printer, or any other device that accepts data from the control system 205 and outputs the accepted data to a user of the control system 205. The network 209 may be one or more public or private, wired or wireless networks, such as the Internet.

Figure 3:
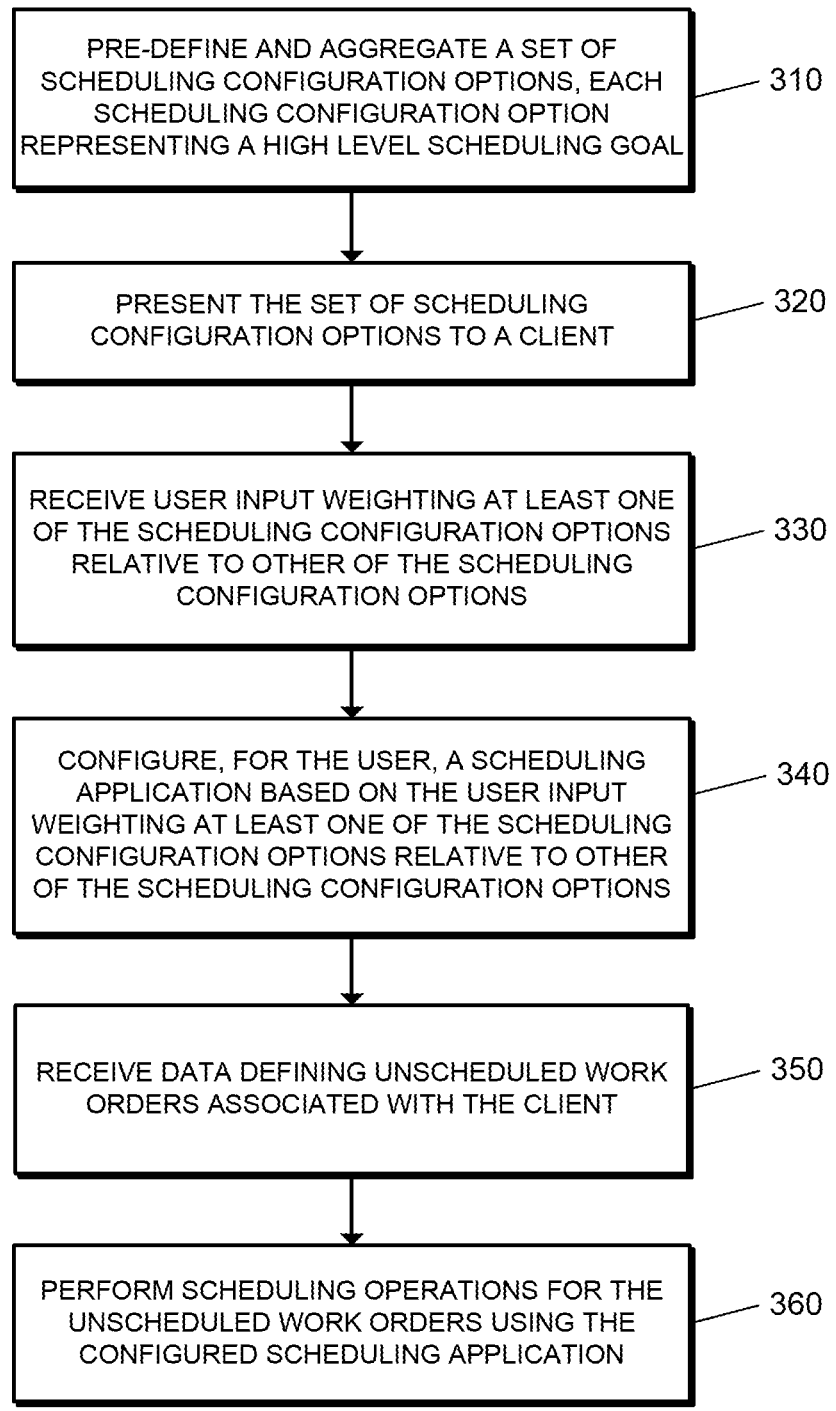
FIGS. 3, 5, 7, 9, 16, 17, 19, 20, and 21 are flowcharts of exemplary processes.

FIG. 3 is a flowchart illustrating an exemplary computer-implemented process 300 for controlling scheduling and dispatch operations for work orders being handled by technicians associated with a client. Briefly, the computer-implemented process 300 includes: pre-defining and aggregating a set of scheduling configuration options, with each scheduling configuration option representing a high level scheduling goal; presenting the set of scheduling configuration options to a client; receiving user input weighting at least one of the scheduling configuration options relative to other of the scheduling configuration options; configuring, for the user, a scheduling application based on the user input weighting at least one of the scheduling configuration options relative to other of the scheduling configuration options; receiving data defining unscheduled work orders associated with the client; and performing scheduling operations for the unscheduled work orders using the configured scheduling application. The operations of the process 300 may be performed by one or more components of the technician control system 100, one or more components of the system 200, or one or more processors included in one or more electronic devices.

In further detail, when the process 300 begins, a set of scheduling configuration options is pre-defined and aggregated, with each scheduling configuration option representing a high level scheduling goal (310). For example, scheduling configuration options related to focusing on the customer (e.g., reducing response time, facilitating same-day scheduling) may be defined and aggregated. As another example, scheduling configuration options related to minimizing cost (e.g., minimizing overtime, minimizing drive time) may be defined and aggregated. As yet another example, scheduling configuration options related to revenue generation (e.g., maximizing number of jobs completed, prioritizing higher profit work) may be defined and aggregated.

In some implementations, each of the scheduling configuration options may impact multiple parameters of a scheduling application. For instance, the scheduling application may have a very large number of tunable parameters that impact performance of the scheduling application. Each scheduling configuration option, however, may represent a higher level scheduling goal that encompasses a number of the tunable parameters, rather than corresponding directly to a single tunable parameter. In this regard, rather than presenting a user with all of the possible combinations of tunable parameters, the user is presented with a reduced and more manageable set of high level configuration options with which to configure the scheduling application. Based on user selections related to the high level configuration options, the system automatically adjusts the many tunable parameters of the scheduling application to meet the user's high level scheduling goals.

The scheduling configuration options may be defined based on high level scheduling goals that are important to clients. For instance, based on past experience with scheduling and business decision making, the scheduling configuration options may be defined to correspond to high level goals that are important to clients. The high level goals may then be mapped to particular tunable parameters or scheduling rules needed to implement the higher level goal using the scheduling application, so that a client's input related to a higher level goal may be realized. High level goals that are important to clients may be input by an expert that has a large amount of industry experience, may be automatically determined by receiving survey data from multiple clients (or potential clients), and may be automatically determined based on interaction with the system and client actions and/or requests related to scheduling over time.

The scheduling configuration options also may be defined based on the tunable parameters of the scheduling application. For example, the tunable parameters of the scheduling application may be grouped into related parameters and a scheduling goal that describes the relationship between the parameters may be defined. In this example, the parameters may be grouped to maximize the number of parameters included in the respective groups. Maximizing the number of parameters in each group may reduce the number of scheduling configuration options and provide the most convenient options to the user for ease of selection.

The parameters also may be grouped by analyzing past configurations of the scheduling application. For instance, the system may track past configuration of the tunable parameters and identify trends in changing particular parameters (e.g., which parameters are changed together and how). Based on the identified trends, the parameters may be arranged in groups that are typically configured in a similar manner and a high level goal related to each group/trend may be defined. The scheduling configuration options may be defined based on user input and/or may be defined automatically by a system/processor.

Figure 6A:
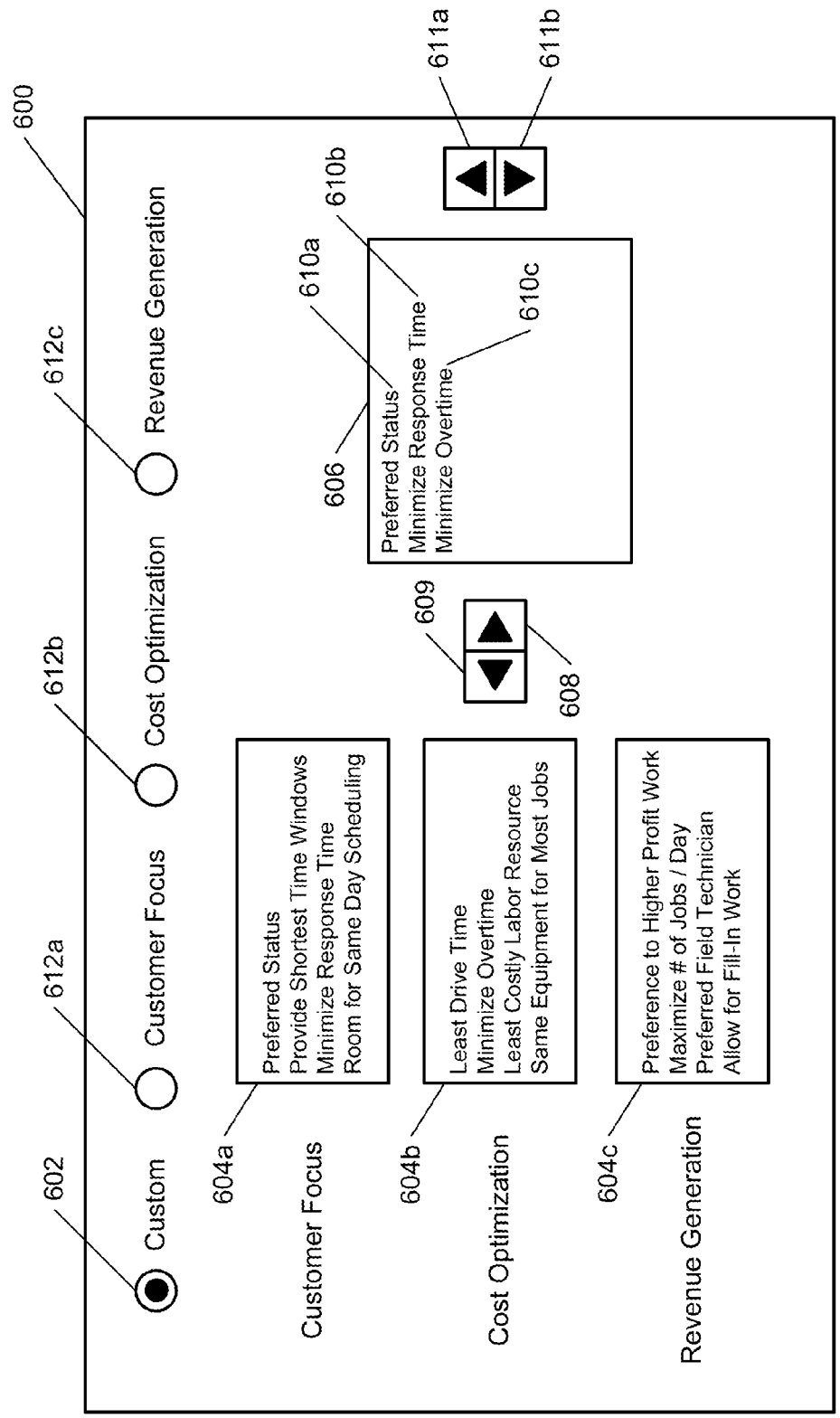
FIGS. 6A and 8 are example interfaces for selecting and weighting scheduling configuration options.

The set of scheduling configuration options is presented to a client (320). For example, the set of scheduling configuration options may be presented to a client on a graphical user interface (e.g., interface 600 (see FIG. 6A), interface 800 (see FIG. 8)). As another example, the set of scheduling configuration options may be presented to a client using a paper-based form.

User input weighting at least one of the scheduling configuration options relative to other of the scheduling configuration options is received (330). For example, user input selecting a subset of the scheduling configuration options may be received, where the selected subset represents scheduling goals on which the client would like to focus in performing scheduling operations. As another example, weighting parameters may be received for one or more configuration options, indicating relative importance for weighted scheduling configuration options as compared to other scheduling configuration options.

A scheduling application is configured for the user based on the user input weighting at least one of the scheduling configuration options relative to other of the scheduling configuration options (340). For example, a scheduling application may be configured by identifying and tailoring weighting parameters that relate to scheduling configuration options selected by the client. As another example, a set of rules and configuration variables may be mapped to client-inputted weighting parameters, and the scheduling application may be adapted based on the set of rules and configuration variables. The configuration of the scheduling application may include modification of more parameters of the scheduling application than the number of scheduling configuration options input by the client. For example, the client may select five scheduling configuration options representing five high level goals on which the client would like to focus in performing scheduling operations, and twenty five variables of the scheduling application may be configured based on the five selected scheduling configuration options.

Data defining unscheduled work orders associated with the client is received (350). For example, data defining unscheduled work orders may be received by a client system associated with the client. As another example, data defining work orders may be received from a call center and/or from an online customer appointment reservation system.

Scheduling operations are performed for the unscheduled work orders using the configured scheduling application (360). For example, unscheduled work orders may be assigned, using the configured scheduling application, to one or more of technicians associated with the client, and work orders may be dispatched to assigned technicians.

FIG. 4 illustrates a table 400 of example scheduling configuration options. A scheduling configuration option represents a scheduling goal. A scheduling configuration option may impact one or more parameters of a scheduling application when selected. Column 410 of the table 400 displays scheduling configuration option names and column 420 displays scheduling configuration option descriptions. The scheduling configuration options presented in the table 400 may be used as the pre-defined and aggregated set of scheduling configuration options in the process 300.

A preferred-status option 430 affects accounting for preferred status customers. For example, a priority may be given to scheduling preferred status customers over customers that do not have preferred status. In this example, the preferred status customers may be given more desirable appointment times or may be scheduled sooner than a customer with non-preferred status. A provide-shortest-time-windows option 431 indicates a preference to create the shortest average time window per appointment. A minimize-response-time option 432 indicates a preference that an appointment be created as close as possible to the date/time of the appointment request. A room-for-same-day-scheduling option 433 indicates a preference that time slots be left open in the daily schedule in anticipation of unplanned work. For example, one or more time slots may be left unassigned in schedules for some or all technicians. A least-drive-time option 434 indicates a preference that drive time between work orders be minimized. For example, when assigning a technician to a work order, preference may be given to assign a technician whose previous appointment is closest to the customer. A minimize-overtime option 435 indicates a preference that the amount of extra pay for overtime work be minimized. For example, technicians may be scheduled so that total weekly hours for each technician are forty hours or less.

A least-costly-labor-resource option 436 indicates a preference that the least costly labor resource be selected per assignment. For example, a technician who earns a lower rate per hour may be selected over a technician who earns a higher rate per hour. As another example, the least qualified technician who is capable of performing the work may be selected. A same-equipment-for-most-jobs option 437 indicates a preference that orders that require the same equipment needs be grouped. For example, a technician may use special equipment for installation work orders, and installation work orders (as compared to repair work orders) may be grouped.

A preference-to-higher-profit-work option 438 indicates a preference that a priority be given to work that has a higher profit margin. For example, the client may service more than one product, with a first product having a higher profit margin than a second product, and preference may be given in scheduling to the first product. A maximize-number-of-jobs-per-day option 439 indicates a preference that the number of jobs performed per day be maximized. For example, technicians may be scheduled to work overtime in order to increase the number of jobs performed per day. A preferred-field-technician option 440 indicates a preference that assignments be scheduled based on providing the best-skilled technician or a requested technician. An allow-for-fill-in-work option 441 indicates a preference that time slots be left open in the daily schedule for fill-in work. For example, one or more time slots may be left open for fill-in work in schedules for some or all technicians.

In some implementations, scheduling configuration options may be grouped by category (e.g., an even higher level goal). For example, options 430-433 may be associated with a customer-focus category. As additional examples, options 434-437 may be associated with a cost-optimization category and options 438-441 may be associated with a revenue-generation category.

Figure 5:
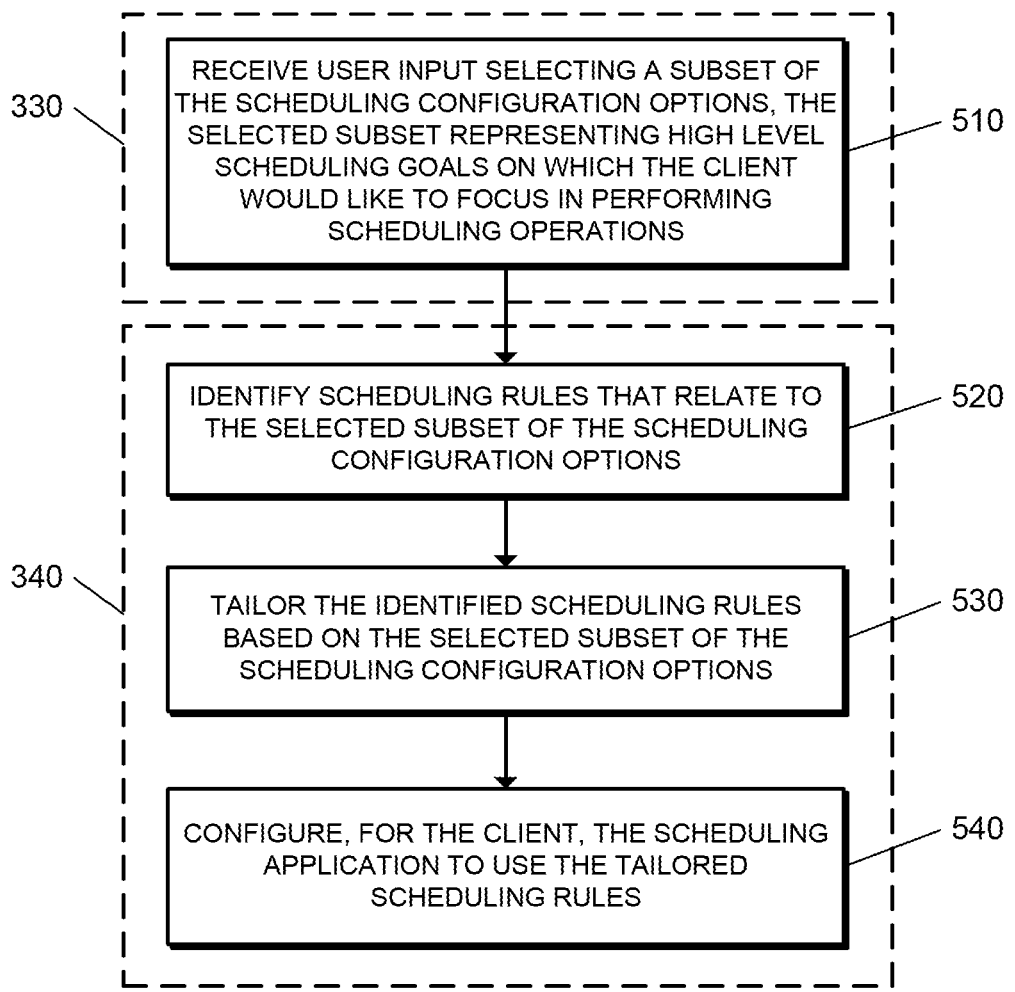

FIG. 5 is a flowchart illustrating a computer-implemented process 500 for configuring a scheduling application. Briefly, the computer-implemented process 500 includes: receiving user input selecting a subset of the scheduling configuration options, the selected subset representing high level scheduling goals on which the client would like to focus in performing scheduling operations; identifying scheduling rules that relate to the selected subset of the scheduling configuration options; tailoring the identified scheduling rules based on the selected subset of the scheduling configuration options; and configuring, for the client, the scheduling application to use the tailored scheduling rules. The operations of the process 500 may be performed by one or more components of the technician control system 100, one or more components of the system 200, or one or more processors included in one or more electronic devices.

In further detail, when the process 500 begins, user input selecting a subset of the scheduling configuration options is received (510), the selected subset representing high level scheduling goals on which the client would like to focus in performing scheduling operations. The user may select scheduling configuration options using, for example, a user interface 600 (illustrated in FIG. 6A).

The user interface 600 includes a control 602, which the user may select to indicate that the user desires to select a custom set of scheduling configuration options. Areas 604*a-c* display scheduling configuration options that the user may select. The areas 604*a-c* display scheduling configuration options grouped by category. For example, area 604*a* displays scheduling configuration options related to customer focus, area 604*b* displays scheduling configuration options related to cost optimization, and area 604*c* displays scheduling configuration options related to revenue generation.

Area 604*a* displays example scheduling configuration options related to accounting for preferred-status customers, providing minimum time windows for appointments, minimizing response time, and leaving room in a daily schedule to allow for same day scheduling of appointments. Area 604*b* displays example scheduling configuration options related to minimizing drive time, minimizing overtime, using the least expensive labor resource, and grouping orders which require the same equipment needs. Area 604*c* displays example scheduling configuration options related to prioritizing work that has a higher profit margin, maximizing the number of jobs completed per day, prioritizing assignments based on providing the best-skilled or requested technician, and providing room in the daily schedule for fill-in work.

The user may select one or more scheduling configuration options in one or more of the areas 604*a-c* and then add the one or more selected options to a selected options list 606. For example, the user may "drag and drop" selected options onto the selected options list 606 or the user may add selected options using an add button 608. A scheduling configuration option may be removed from the selected options list 606, by, for example, using a remove button 609. The selected options list 606 currently includes scheduling configuration options 610*a* and 610*b* (which had been added from the area 604*a*) and scheduling configuration option 610*c* (which had been added from the area 604*b*).

The user may promote or demote options included in the selected options list 606 using buttons 611*a* and 611*b*. For example, the selected options list 606 may be a ranked list in which the first option in the list is the most important to the user and the other options are provided in the list in order of decreasing importance. The buttons 611*a* and 611*b* may be used to adjust the order of the selected options. The order may be used in configuring the scheduling application (e.g., breaking ties/conflicts that arise when two selected goals would result in contrary adjustments to the scheduling application).

In addition to allowing the user to select scheduling configuration options from more than one category (e.g., from more than one of customer focus, cost optimization, revenue generation), the user may alternatively select control 612*a*, 612*b*, or 612*c* to indicate that a general focus for scheduling should be either customer focus, cost optimization, or revenue generation, respectively. For instance, selection of the control 612*a* may cause all of the configuration options included in the customer focus category to be selected.

The controls 612*a-c* may also be used to filter the display of selectable options. For example, if the user selects control 612*a*, the area 604*a* may remain displayed in the interface 600, while the areas 604*b* and 604*c* may become hidden, otherwise removed from the interface 600, or non-operational. User interface approaches other than those shown in FIG. 6A may be used. For example, a series of interlinked slider controls may be used to select and prioritize scheduling configuration options.

Returning to FIG. 5, after a subset of scheduling configuration options is selected, scheduling rules that relate to the selected subset of the scheduling configuration options are identified (520). The scheduling rules may be identified by comparing the selected subset of the scheduling configuration options to data mapping scheduling configuration options to rules of the scheduling application. A particular scheduling configuration option may correspond to many, different scheduling rules and, therefore, the number of scheduling rules may be greater than (perhaps, significantly greater than) the number of selected scheduling configuration options. Identified scheduling rules may be used by a scheduling application. An identified scheduling rule may be based on one or more configurable parameters.

The identified scheduling rules are tailored based on the selected subset of the scheduling configuration options (530). For example, the value of one or more configurable parameters may be modified according to the selected subset of scheduling configuration options. For example, if a selected scheduling configuration option indicated a priority for minimizing overtime, a parameter affecting the maximum number of hours worked per day per technician may be modified to a value of eight, and a parameter affecting the maximum number of hours worked per technician per week may be modified to a value of forty. As another example, if a selected configuration option indicated a priority for maximizing the number of jobs performed per day, and if there was no indication to minimize overtime, then a parameter affecting the maximum number of hours worked per day per technician may be modified to a value higher than eight (e.g., twelve), and a parameter affecting the maximum number of hours worked per week per technician may be modified to a value higher than forty (e.g., sixty). The modified parameter values may be stored in a configured data section of an electronic data store associated with the control system, in association with the client. In some implementations, the tailoring of identified scheduling rules is done once during client configuration (e.g., not done every day).

An order in which the selected subset of the scheduling configuration options are ranked may be used in tailoring the identified scheduling rules. For instance, when two identified scheduling rules conflict, the rule associated with the higher ranked scheduling configuration option may be selected and the other rule may not be selected. In addition, when two goals suggest different modifications to parameters of the scheduling application, the order may be used to tailor the scheduling rules. Suppose both the minimize overtime and maximize the number of jobs performed per day configuration options have been selected. As discussed above, selection of the minimize overtime option may result in the maximum number of hours worked per day per technician parameter being set to eight and selection of the maximize the number of jobs performed per day option may result in the maximum number of hours worked per day per technician parameter being set to twelve. In this case, the maximum number of hours worked per day per technician parameter may be set to eight when the minimize overtime option is ranked higher than the maximize the number of jobs performed per day option. Alternatively, the maximum number of hours worked per day per technician parameter may be set to twelve when the maximize the number of jobs performed per day option is ranked higher than the minimize overtime option.

The identified scheduling rules may be tailored automatically by a computer process, or manually through a user interface. For example, FIG. 6B shows an example user interface 614 for tailoring scheduling rules. The interface 614 includes tabs 616*a-d*, which an administrator may select to tailor general rules, or rules corresponding to objectives, business values, or appointment booking values, respectively. For example, the interface 614 shows the tab 616*b* as selected, which allows the administrator to tailor rules corresponding to objectives by selecting or deselecting various controls 617*a-n*. Each of the controls 617*a-n* correspond to a scheduling objective. For example, control 617*c* corresponds to an objective to minimize idle time and control 617*f* corresponds to an objective to minimize travel time between assignments.

The administrator may select a control 617*a-n* to toggle the selected control state. The administrator may also select all controls 617*a-n* by selecting a select-all button 618*a*, or may deselect all controls 617*a-n* by selecting a select-none button 618*b*. The administrator may select an "ok" button 618*c* to save any changes and close the interface 614. The interface 614 may be closed without saving changes by the selection of a cancel button 618*d*.

For each client-selected scheduling configuration option, one or more controls 617*a-n* may be modified. For example, if the client selected a "minimize overtime" scheduling configuration option, control 617*e* may be selected, which may result in consideration of overtime in scheduling processes. In addition to selecting or deselecting controls 617*a-n*, the administrator may adjust the relative weight of a selected objective by selecting an edit weight button 619. Weight values may be specified as a value from 0 to 100. For example, if the client indicated a slight preference to minimize overtime, the administrator may set the weight of the "minimize overtime" objective to a relatively moderate value (e.g., 31 to 50), whereas if the client indicated a strong preference to minimize overtime, the administrator may set the weight of the "minimize overtime" objective to a high value, such as 100. As another example of tailoring a scheduling rule, an administrator may select the control 617*n*, in response to a client-selected scheduling configuration option of "preferred field technician", to configure scheduling so that assignments are prioritized based on providing the best-skilled or most-requested field technician.

Several objectives may be modified in response to one client-selected scheduling configuration option. For example, if the client selected a "least drive time" scheduling configuration option to reduce mileage and gas costs, the administrator may select some or all of the controls 617*f*, 617*g*, and 617*k* to minimize travel between assignments, minimize travel from the home base, and configure a preference for work to be done at a common site by a technician who is already assigned to work at that location, respectively. The weights of the objectives corresponding to controls 617*f*, 617*g*, and 617*k* may be individually configured to fine tune how drive time is minimized. For example, for a company who services a rural area, where all drive times are relatively long, the weight for the "minimize travel between assignments" may be set to a lower weight (e.g., 50) than a weight of 100 for the objective corresponding to control 617*k* ("same site objective"). As another example, the weight of the objective corresponding to control 617*g* can be increased if a client has a strong preference to minimize travel from the home base.

One objective may be associated with more than one client-selected scheduling configuration option. For example, if a client selected a scheduling configuration option of "minimizing response time", an administrator may select and/or change the corresponding weight of the "schedule as soon as possible" objective (e.g., control 617*m*). The administrator may also select and/or change the weight of the "schedule as soon as possible" objective if the client selects a scheduling configuration option of "preferred status". If the client selects the preferred status scheduling configuration option, they are indicating a priority for taking into account service level agreements for customers (for example, customers who have a "Platinum" service-level agreement may be promised same-day service, while customers who have a "Gold" or "Silver" service-level agreement may be promised 3 or 5 day service response times). If the client indicated a high preference for minimizing response time, the "schedule as soon as possible" objective may be given a relatively high weight, which may result in work orders being completed well before the contractual response times specified by a customer's service-level agreement. If the client desires that the response time be close to, but still within the time specified by the service-level agreement, a lower weight can be specified for the "schedule as soon as possible" objective.

Other user interfaces may be used to tailor scheduling rules. For example, an example interface 622 shown in FIG. 6C may be used to configure appointment booking time slots. Appointment booking time slots may be configured as part of new client configuration. Multiple appointment booking profiles may be configured within the technician control system. Example appointment booking profiles may include full-day, half-day or two-hour slots. One or more appointment booking profiles may be associated with a client, for example, in response to client selection and weighting of a "use shortest time window" scheduling configuration option.

Existing appointment booking profiles are shown in the interface 622 in a list 623. An administrator may add a new appointment booking profile by selecting an add button 624*a*. The administrator may duplicate an existing appointment booking profile by selecting an appointment booking profile in the list 623 and then selecting a duplicate button 624*b*. An appointment booking profile may be deleted by selecting it in the list 623 and then selecting a delete button 624*c*.

Details about an existing appointment booking profile may be displayed in an area 625 by selecting an appointment booking profile in the list 623. For example, a two-hour appointment booking profile 626 is currently selected in the list 623 and the area 625 displays four defined two-hour time slots for each weekday. A new time slot may be added by selecting a day of the week using a control 627*a*, selecting a start time using a control 627*b*, selecting an end time using a control 627*c*, and selecting an add button 627*d*. The most recently added time slot may be duplicated by selecting a duplicate button 627*e*. A time slot may be deleted by selecting the time slot in the area 625 and then selecting a delete button 627*f*. Changes made to appointment booking profiles may be saved and the interface 622 may be closed by selecting an "ok" button 627*g*. The interface 622 may be closed without saving changes by selecting a cancel button 627*h*.

An appointment booking profile may be associated with one or more service level agreements. A customer of the client may, in turn, be associated with a service level agreement. An example interface 630 shown in FIG. 6D allows an administrator to configure service level agreements. Existing service level agreement profiles are shown in the interface 630 in a list 631. An administrator may add a new service level agreement profile by selecting an add button 632*a*. The administrator may duplicate an existing service level agreement profile by selecting a service level agreement profile in the list 631 and then selecting a duplicate button 632*b*. A service level agreement profile may be deleted by selecting it in the list 631 and then selecting a delete button 632*c*.

Figure 6C:
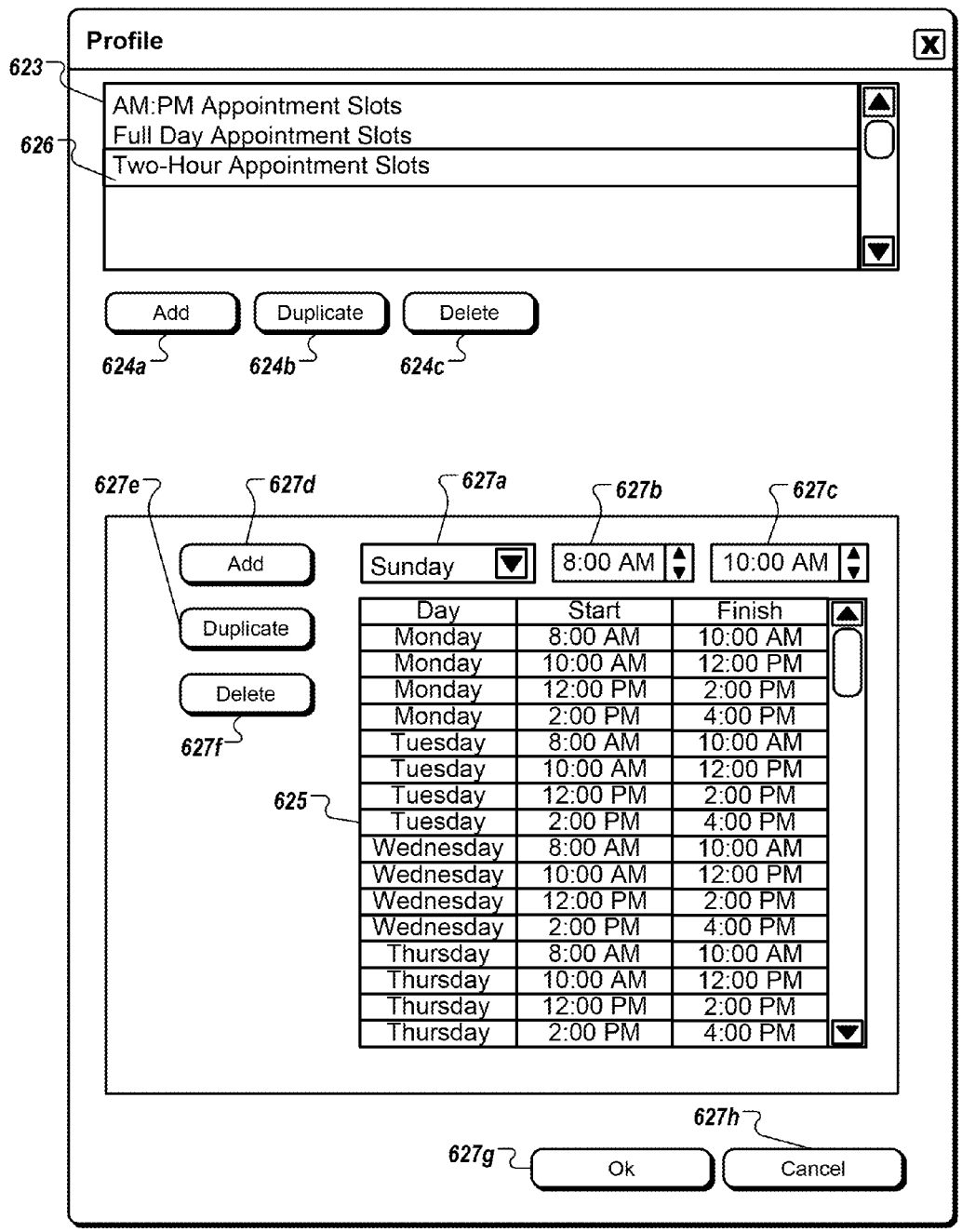
Figure 6D:
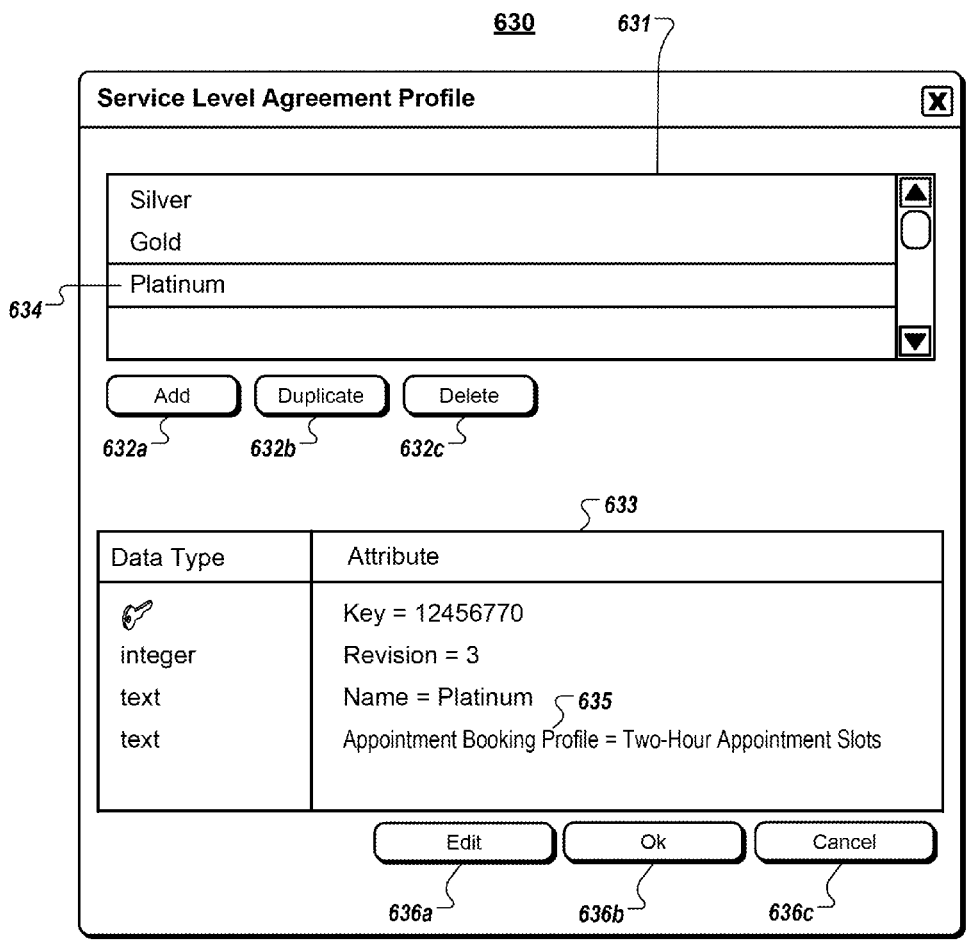

Details about an existing service level agreement profile may be displayed in an area 633 by selecting a service level agreement profile in the list 631. For example, a "Platinum" service level agreement profile 634 is currently selected in the list 631 and the area 633 displays attribute names, attribute data types and attribute values for the service level agreement profile 634. The service level agreement profile 634 includes an appointment booking profile attribute 635 which has a value of "Two-Hour Appointment Slots". For example, the appointment booking profile attribute 635 may correspond to an appointment booking profile created using the interface 622 (FIG. 6C).

Attribute values for a selected service level agreement profile may be modified by selecting an edit button 636*a*. Changes made to service level agreement profiles may be saved and the interface 630 may be closed by selecting an "ok" button 636*b*. The interface 630 may be closed without saving changes by selecting a cancel button 630*c*.

Figure 6E:
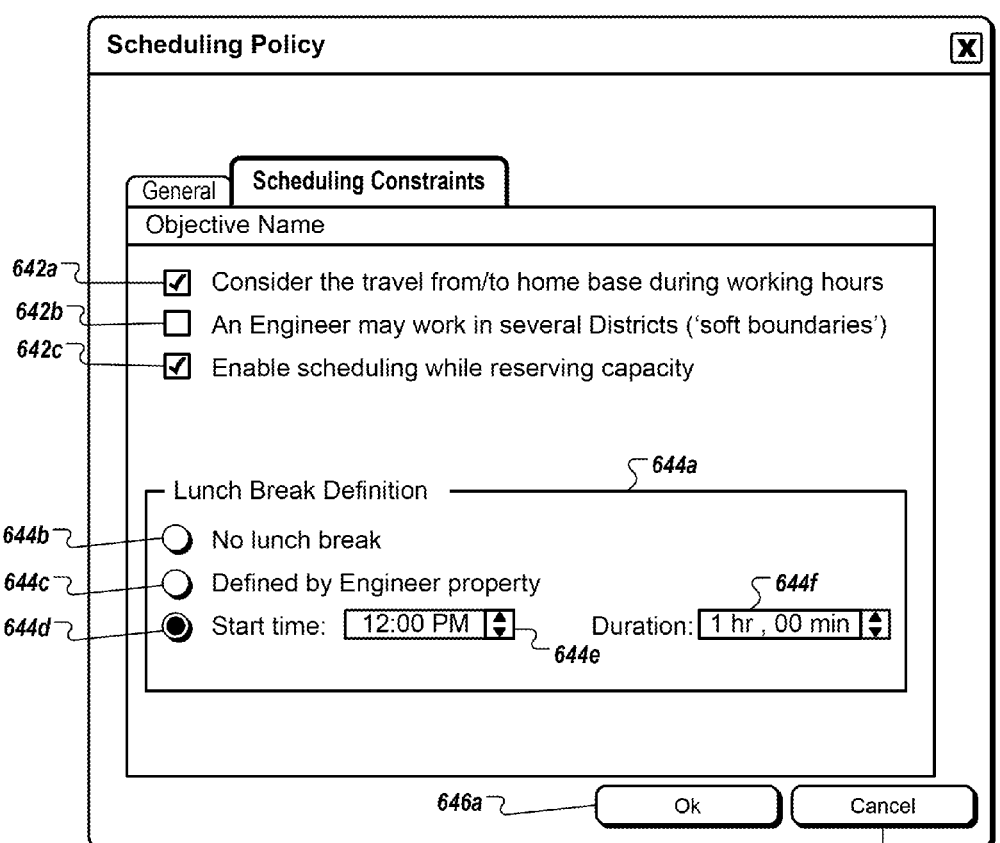
Figure 6G:
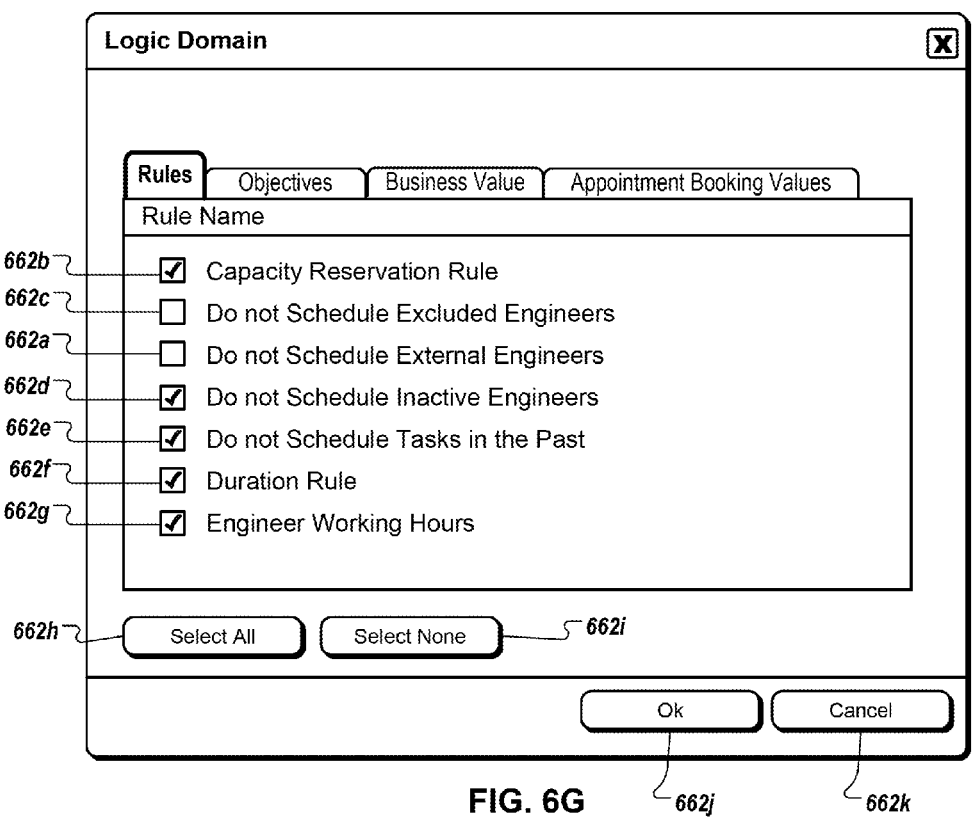

FIG. 6E illustrates an example interface 640 for tailoring scheduling rules related to scheduling constraints. An administrator may select a control 642*a* to configure whether field technician travel to and from the home base during working hours is considered when scheduling field technicians. A control 642*b* may be selected to configure whether a field technician may work in several districts. The administrator may select control 642*c* to configure whether scheduling capacity is reserved. An area 644*a* may be used to define lunch break times for field technicians. The settings in interface 640 may be saved by selecting an "ok" button 646*a*. The interface 640 may be closed without saving changes by selecting a cancel button 646*b*.

Enabling control 642*b* configures "soft boundaries" for field technicians. Field technicians may be assigned to a "home" district, and if soft boundaries are not enabled, field technicians may be restricted to working on work orders that are located within their assigned district. If soft boundaries are enabled, field technicians may be assigned to work orders outside of their home district. For example, a field technician may be assigned to a work order in an adjacent district if there are no field technicians available in the adjacent district. If there is an overabundance of a particular type of work in a first district that field technicians in a second district are qualified for, then field technicians from the second district may be dispatched to the work (e.g., if the first district does not have capacity to service all of the work). The system may be configured to prefer field technicians who are assigned to the district associated with the work order, and may only schedule field technicians from other districts if a scheduling optimization process determines that assigning field technicians external to the district creates a preferable schedule.

The area 644*a* may be used by an administrator to configure whether a defined field technician lunch break is considered during scheduling. For example, field technicians may be excluded from scheduling during their lunch break. A control 644*b* may be selected to disable lunch break definition, which may result in making field technicians available for work orders during lunchtime (e.g., eleven A.M. to one P.M.). A control 644*c* may be selected if lunch break definitions exist but are defined elsewhere. For example, lunch break definitions may be defined using another interface on a per-field-technician or per-field-technician-group basis. A control 644*d* may be selected if a particular lunch break timeframe is to be defined. If control 644*d* is selected, a control 644*e* may be used to define the lunch break start time (e.g., twelve P.M.) and a control 644*f* may be used to define the lunch break duration (e.g., one hour).

As mentioned above, control 642*c* may be selected to configure whether scheduling capacity is reserved. For example, capacity may be reserved for unplanned work, such as for high priority emergency work (e.g., downed power lines). Control 642*c* may be configured in response to a client-selected "room for same day scheduling" scheduling configuration option.

Once capacity reservation has been enabled in the scheduling policy (e.g., control 642c), capacity may be reserved within the system on a task and district basis. For example, for each district, the system can be configured to reserve a percentage of the workday for a task or group of tasks. FIG. 6F illustrates an example interface 650 for configuring capacity reservation for a task type for a district. The interface 650 displays information corresponding to a dictionary entry for a district named "Indianapolis". The dictionary entry includes a "Key" attribute 652a, a "Revision" attribute 652b, a "Name" attribute 652c, a "District" attribute 652d, a "TaskType" attribute 652e, and a "CapacityThreshold" attribute 652f. The attributes 652a-f may be edited by selecting an edit button 654a. Changes to attribute values may be saved by selecting an "ok" button 654b. The interface 650 may be closed without saving changes by selecting a cancel button 654c.

The "TaskType" attribute 652e has a value corresponding to a task type for servicing downed power lines. The "CapacityThreshold" attribute 652f has a value of ninety, which indicates that for the Indianapolis district, that no more than ninety percent of a days scheduled work orders may be for tasks that are not servicing downed power lines. When selecting a capacity threshold value, an administrator may select a value that reserves sufficient capacity to handle the corresponding task, but the administrator may also be mindful that the reserved capacity may not be utilized if capacity-requiring tasks (e.g., downed power lines) do not come into the system.

An administrator may use the example interfaces illustrated in FIGS. 6G-6K to configure scheduling rules in response to client-selected "least costly labor resource" or "preference to higher profit work" scheduling configuration options. For scheduling processes to determine least costly labor resources, costs of internal field technicians may be compared to costs for external field technicians (e.g., internal field technicians may be employees of the client while external field technicians may be contractors working for another company). An administrator may select a control 662a on an example interface 660 illustrated in FIG. 6G to configure whether external field technicians are to be considered for scheduling.

The interface 660 includes other controls 662b-g corresponding to other scheduling rules, such as whether to reserve capacity for unplanned work, schedule external engineers, schedule inactive engineers, schedule tasks in the past, use a duration rule, or schedule within engineer working hours, respectively. The administrator may select all controls 662a-g by selecting a select-all button 662h, or may deselect all controls 662a-g by selecting a select-none button 662i. The administrator may select an "ok" button 662j to save any changes and close the interface 660. The interface 660 may be closed without saving changes by the selection of a cancel button 662k.

Figure 6H:
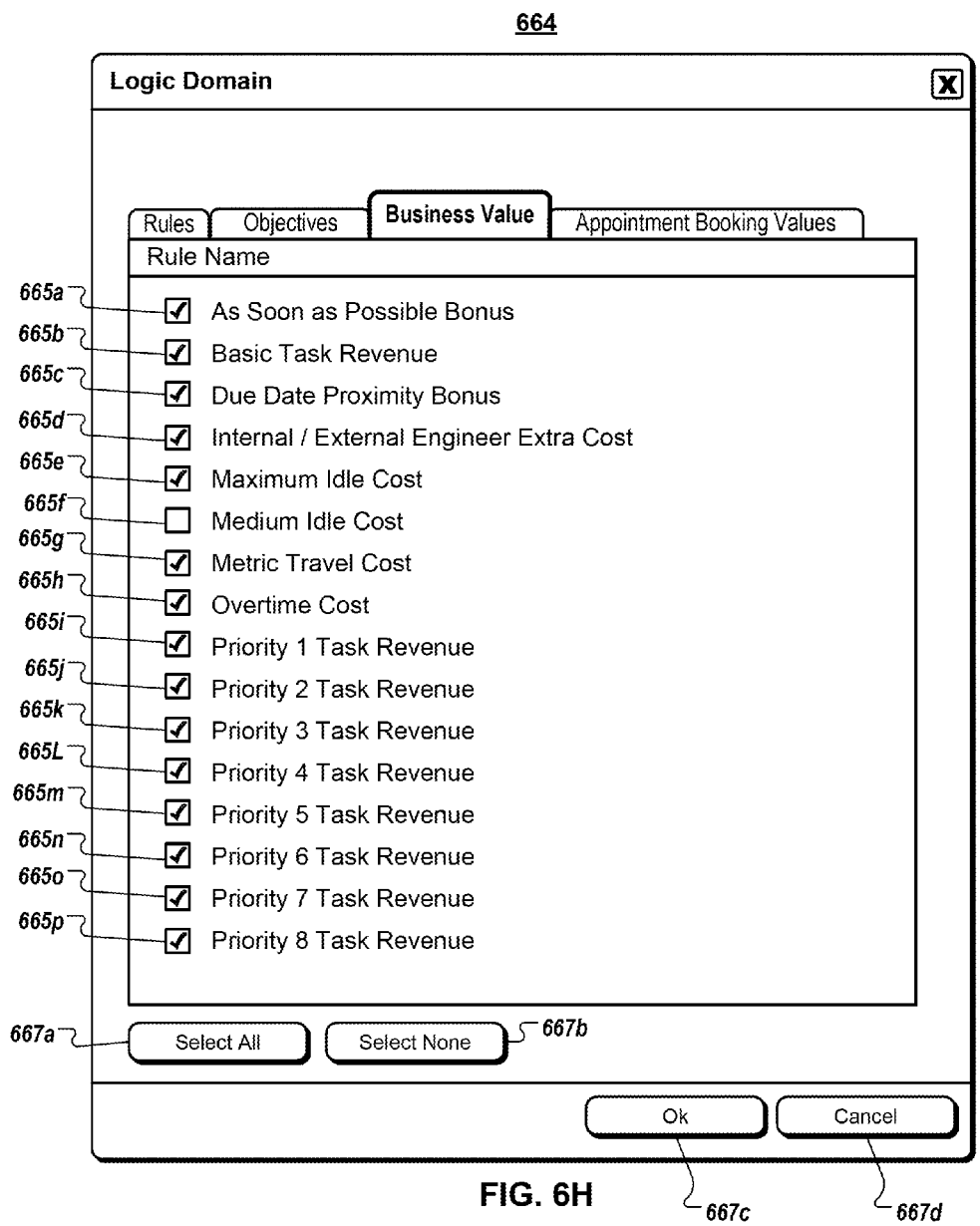
Figure 6J:
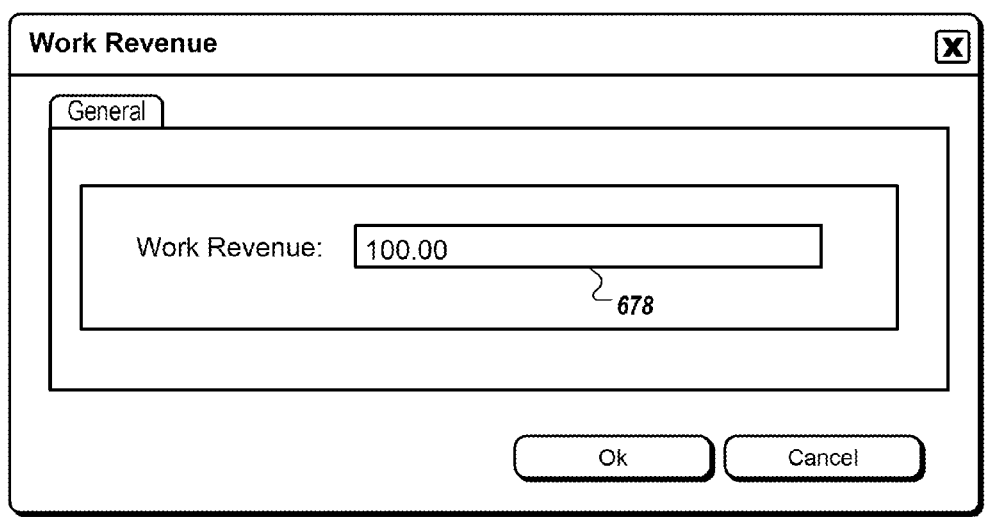

FIG. 6H illustrates an example interface 664 which may be used to further configure cost and revenue related scheduling rules. An administrator may select one or more controls 665a-p. If external field technicians are enabled to be scheduled, an administrator may select control 665d to configure whether scheduling processes may consider relative costs of external engineers as compared to internal engineers.

FIG. 6I illustrates an example interface 670 which an administrator may use to configure field technician costs. The interface 670 may be used to configure relative cost differentials between internal and external field technicians. If external field technicians are more expensive then internal field technicians, a relevance group control 672a may be set to a value of "external engineers". If internal field technicians are more expensive than external field technicians, the relevance group control 672a may be set to a value of "internal engineers". In this example, where the relevance group is "external engineers", a control 672b may be used to configure the cost differential between external and internal field technicians. In other words, the control 672b may be used to enter a value which indicates how much more an external field technician may cost per hour than an internal field technician.

The value displayed in the control 672b may be a relative amount based on the value of a task revenue setting. An example interface 676 illustrated in FIG. 6J may be used to configure a relative task revenue setting that may be used to calculate other business value costs. A task revenue value may be entered into a control 678. Considering the control 672b of FIG. 6I, if the task revenue setting has a value of one hundred, and if external field technicians cost ten percent more than internal field technicians, then the value of the control 672b may be ten percent of one hundred (e.g., ten).

The interface 670 may also be used to configure the relative overtime cost difference between external and internal field technicians. A control 672c may be used, in this example, to configure how much more per hour overtime costs are for an external field technician as compared to an internal field technician. As shown, the control 672 has a value of zero, indicating that overtime rates for external field technicians are the same as overtime rates for internal field technicians.

Other cost-related settings may be configured using the interface 670. For example, a control 672d may be used to configure a base cost per task. As another example, a control 672e may be used to configure an idle time cost. Idle time cost represents the cost to the client when a field technician is unassigned to revenue-producing work.

Controls 673a-d may be selected to indicate that corresponding settings are defined elsewhere, such as on a per-field-technician basis. The administrator may select an "ok" button 674a to save any changes and close the interface 670. The interface 670 may be closed without saving changes by the selection of a cancel button 674b.

Field technician costs may be considered for scheduling when a client selects a "preference for higher profit work" scheduling configuration option. Additionally, in response to the selection of a "preference for higher profit work" scheduling configuration option, other revenue-related costs may be considered and scheduling rules related to revenue generation may be tailored. For example, an administrator may select various controls in the example interface 664 (FIG. 6H). The control 665b may be used to configure whether basic task revenue is considered in scheduling processes. The control 665a may be used to configure whether bonus revenue may be considered for scheduling work orders as soon as possible. The control 665c may be used to configure whether bonus revenue may be considered when work orders are scheduled on or near the work order due date. The controls 665g and 665h may be used to configure whether travel and overtime costs are considered, respectively. The controls 665i-p may be used to configure whether tasks of different priority levels generate more revenue than other tasks.

The controls 665e and 665f may be used to configure whether idle cost is considered. As mentioned, idle cost represents the cost to the client when a field technician is unassigned to revenue-producing work. In some implementations, the controls 665e and 665f are mutually exclusive, meaning that if control 665e is selected to indicate that maximum idle cost be considered, then control 665f may be controlled to be unselected. Similarly, if control 665f is selected to indicate that a medium idle cost be considered, then control 665e may be controlled to be unselected. The administrator may select all controls 665*a-p* by selecting a select-all button 667*a*, or may deselect all controls 665*a-p* by selecting a select-none button 667*b*. The administrator may select an "ok" button 667*c* to save any changes and close the interface 660. The interface 660 may be closed without saving changes by the selection of a cancel button 667*d*.

Figure 6K:
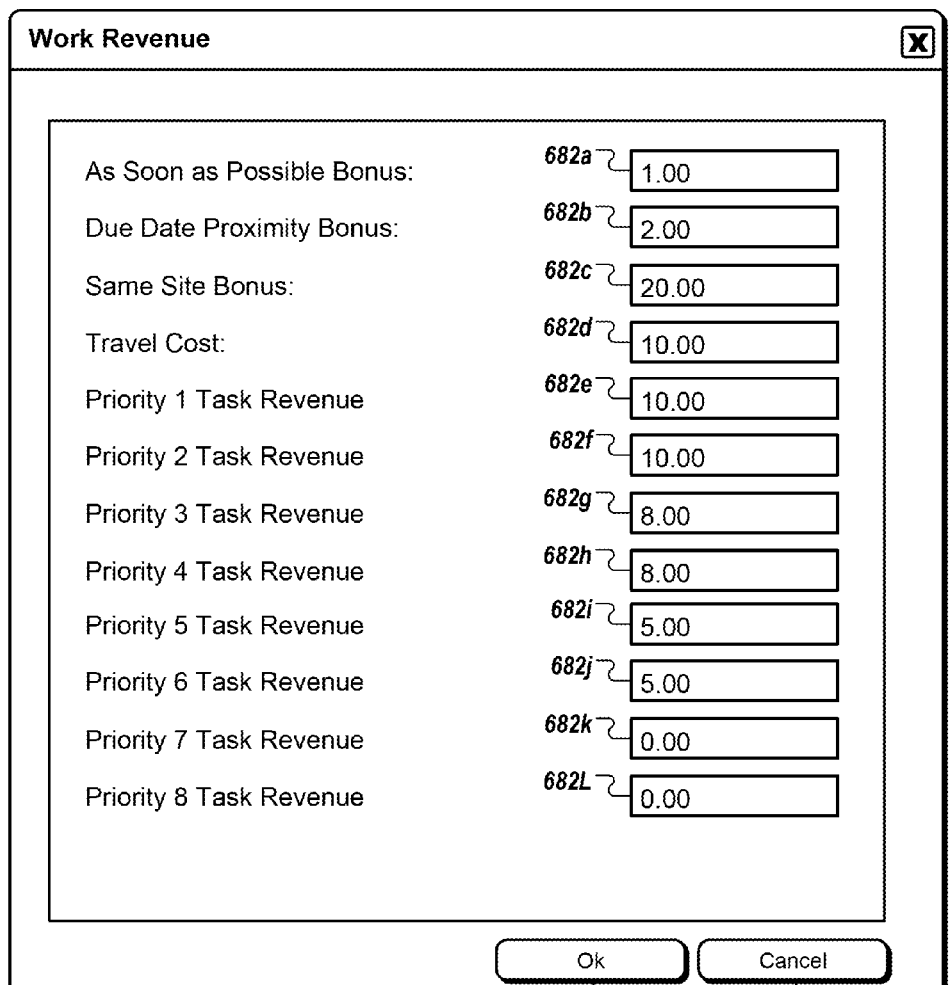

If revenue-related rules are enabled, an administrator may use the example interface 680 illustrated in FIG. 6K to configure values for revenue-related settings. For example, a control 682*a* may be used to configure a bonus revenue amount for scheduling work orders as soon as possible and a control 682*b* may be used to configure a bonus amount for scheduling work orders on or near the work order due date. The bonus amounts entered in the controls 682*a-b* may be tangible, actual increases in revenue or may be values representing an intangible benefit such as increased customer satisfaction.

The control 682*c* may be used to configure an amount representing the additional revenue obtained if a second work order is scheduled at the same site where a field technician is servicing a first work order. The amount entered in control 682*c* may include, for example, saved travel costs and saved idle time costs. The control 682*d* may be used to configure a travel cost per work order.

The controls 682*e*-682L may be used to configure amounts of additional revenue which may be generated by completing tasks of different priority levels. For example, a priority 1 task may correspond to a high priority or emergency task which gets escalated and which results in a higher charge to the customer (and therefore may earn more revenue for the client). Revenue amounts for up to eight priority levels may be configured using the interface 680. The administrator may select an "ok" button 684*a* to save any changes and close the interface 680. The interface 680 may be closed without saving changes by the selection of a cancel button 684*b*.

Returning to FIG. 5, the scheduling application is configured, for the client, to use the tailored scheduling rules (540). The performance of scheduling operations by the scheduling application may be based on and/or be conditional upon the evaluation and interpretation of rules. The interpretation and evaluation of rules may be based on configurable, variable parameter values. For example, the scheduling application may read configured parameter values from an electronic data store associated with the client, and these retrieved values may be used as a part of rule evaluation and interpretation. For example, before assigning a work order to a technician, a check may be performed to see whether the technician has reached either a maximum hours per day or maximum hours per week limit. Client-specific "maximum-hours-per-day" and "maximum-hours-per-week" parameter values may be read from an electronic data store before testing to see whether the technician has reached either the maximum hours per day or maximum hours per week limit. Retrieved parameter values may be different for each client. For example, for one client, the value of the maximum-hours-per-day parameter may be eight, while the maximum-hours-per-day parameter value may be twelve for another client.

Figure 7:
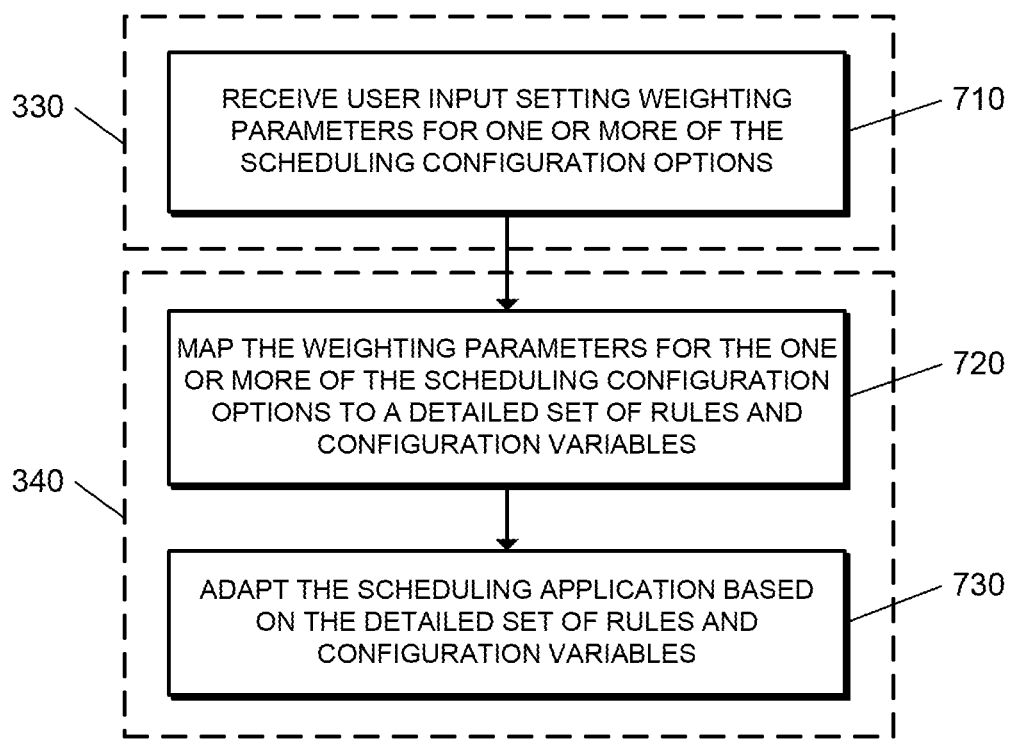

FIG. 7 is a flowchart illustrating a computer-implemented process 700 for adapting a scheduling application. Briefly, the computer-implemented process 700 includes receiving a user input setting weighting parameters for one or more of the scheduling configuration options, mapping the weighting parameters for the one or more of the scheduling configuration options to a detailed set of rules and configuration variables, and adapting the scheduling application based on the detailed set of rules and configuration variables. The operations of the process 700 may be performed by one or more components of the technician control system 100, one or more components of the system 200, or one or more processors included in one or more electronic devices.

Figure 8:
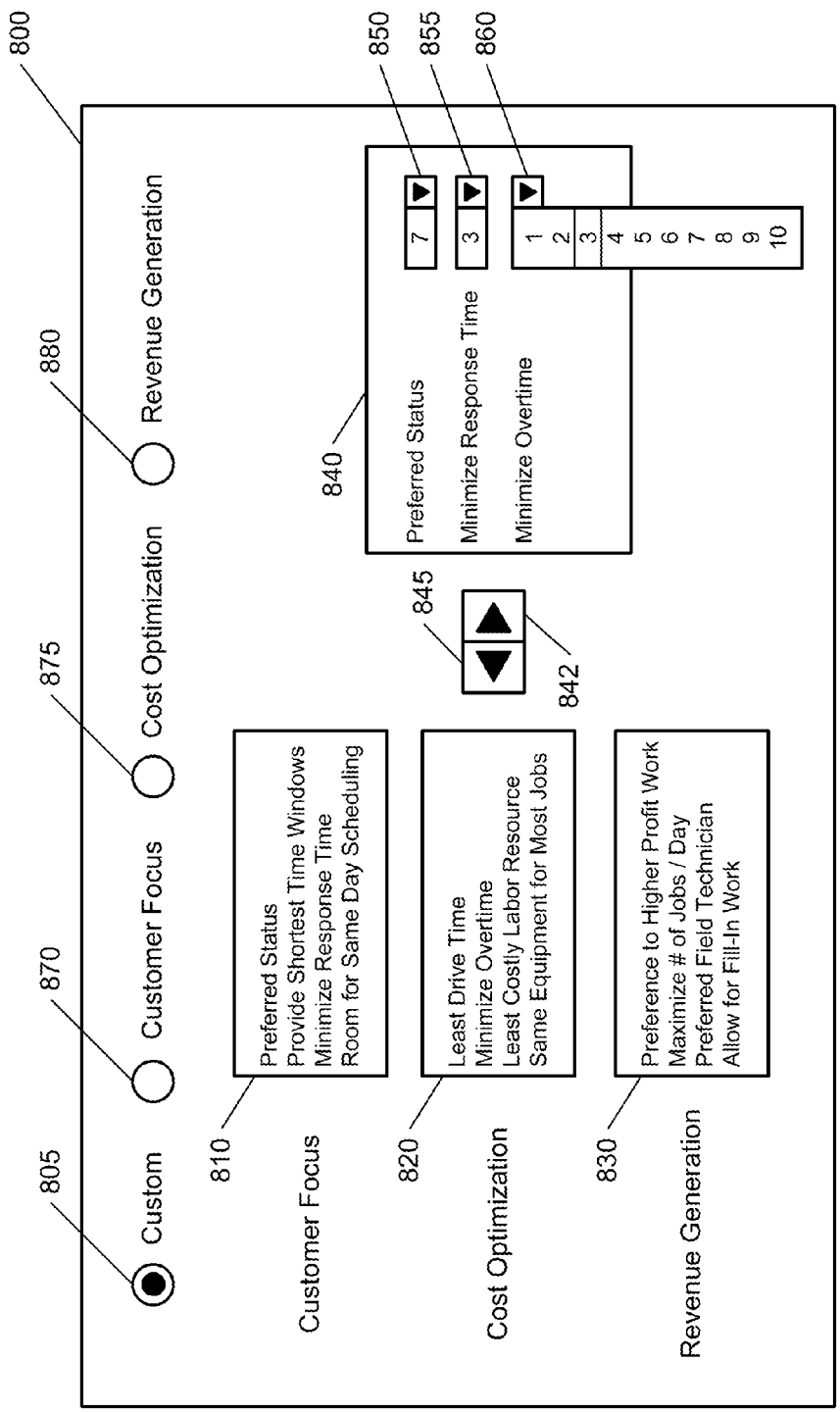

In further detail, when the process 700 begins, user input setting weighting parameters for one or more of the scheduling configuration options is received (710). The user may input weighting parameters using an interface 800 (as illustrated in FIG. 8). Similar to the interface 600 of FIG. 6A, the interface 800 includes a control 805, which the user may select to indicate that the user desires to select and weight a custom set of scheduling configuration options. The interface 800 includes areas 810, 820, and 830 for displaying available scheduling configuration options related to customer focus, cost optimization, and revenue generation, respectively.

Similar to the interface 600, the user may add selected scheduling configuration options to a selected options list 840 from the areas 810-830, for example, using an add button 842. The user may select a weighting parameter for each scheduling configuration option displayed in the selected options list 840. For example, a weighting parameter value of seven for a preferred-status option has been selected using a control 850 and a weighting parameter value of three for a minimize-response-time option has been selected using a control 855. As shown by the expanded control 860, the user may be presented with a defined list of weighting parameter values (e.g., whole number values from one to ten). In the expanded control, the user has selected a weighting parameter value of three to indicate that the minimize overtime option is of equal importance to the user as the minimize response time option. Each of the minimize overtime option and the minimize response time option are of relatively less importance to the user as compared to the preferred status option and are of relatively greater importance to the user as compared to the other options that have not been selected.

Scheduling configuration options may be removed from the selected options list 840 using a remove option button 845. Similar to the interface 600, the user may select one of controls 870-880 to filter the selectable scheduling configuration options to a category such as customer-focus, cost-optimization, or revenue-generation. For example, in some implementations, if the user selects control 880, the area 820 may remain displayed in the interface 800, while the areas 810 and 830 may become hidden, otherwise removed from the interface 800, or non-operational. In some implementations, selecting a control 870-880 results in the selection of all scheduling configuration options corresponding to the respective category.

Returning to FIG. 7, when the weighting parameters have been received, the weighting parameters for the one or more of the scheduling configuration options are mapped to a detailed set of rules and configuration variables (720). The weighting parameters may be mapped, for example, to a set of rules and configuration variables included in a scheduling application. For example, if leaving room for same day appointments is selected as a scheduling configuration option, a rule may be identified which determines, for example, whether to leave a block of unscheduled time at the end of all or some technicians' schedules to be made available for same day appointments.

The identified rule may be based on one or more configuration variables. For example, the identified rule may be based on a configuration variable which may have a value of either true or false, with a true value indicating that end-of-day time should be intentionally left unscheduled for same-day appointments and a false value indicating that end-of-day time should not be intentionally left unscheduled for same-day appointments. The identified rule may also be based on a second configuration variable which may indicate how much time to leave unscheduled or may indicate what percentage of technicians should have end-of-day slots open. The value of the second configuration variable may be based on the received weighting parameter. For example, if the weighting parameter for a "leave room for unplanned appointments" scheduling configuration option is 10 (e.g., indicating a very high priority), the value of a configuration variable may be set to "two hours", interpreted as meaning that the last two hours of every technician's schedule should be left open to facilitate servicing unplanned appointments. As another example, if the weighting parameter for the "leave room for unplanned appointments" is two (e.g., indicating, some, but not high importance), the value of a custom variable may be set to "ten percent", indicating that ten percent of technicians should remain unscheduled for the last portion (e.g., one hour) of their work day, to facilitate servicing of unplanned appointments.

The scheduling application is adapted based on the detailed set of rules and configuration variables (730). For example, the value of one or more configuration variables may be read from an electronic data store, and the retrieved values may be used during rule interpretation and evaluation, which may affect performed scheduling operations. The scheduling application may be adapted dynamically based on configuration data accessed during operation of the scheduling application or the adapted scheduling application may be stored as a client-specific version of the scheduling application that is used for scheduling work orders for the particular client.

Figure 9:
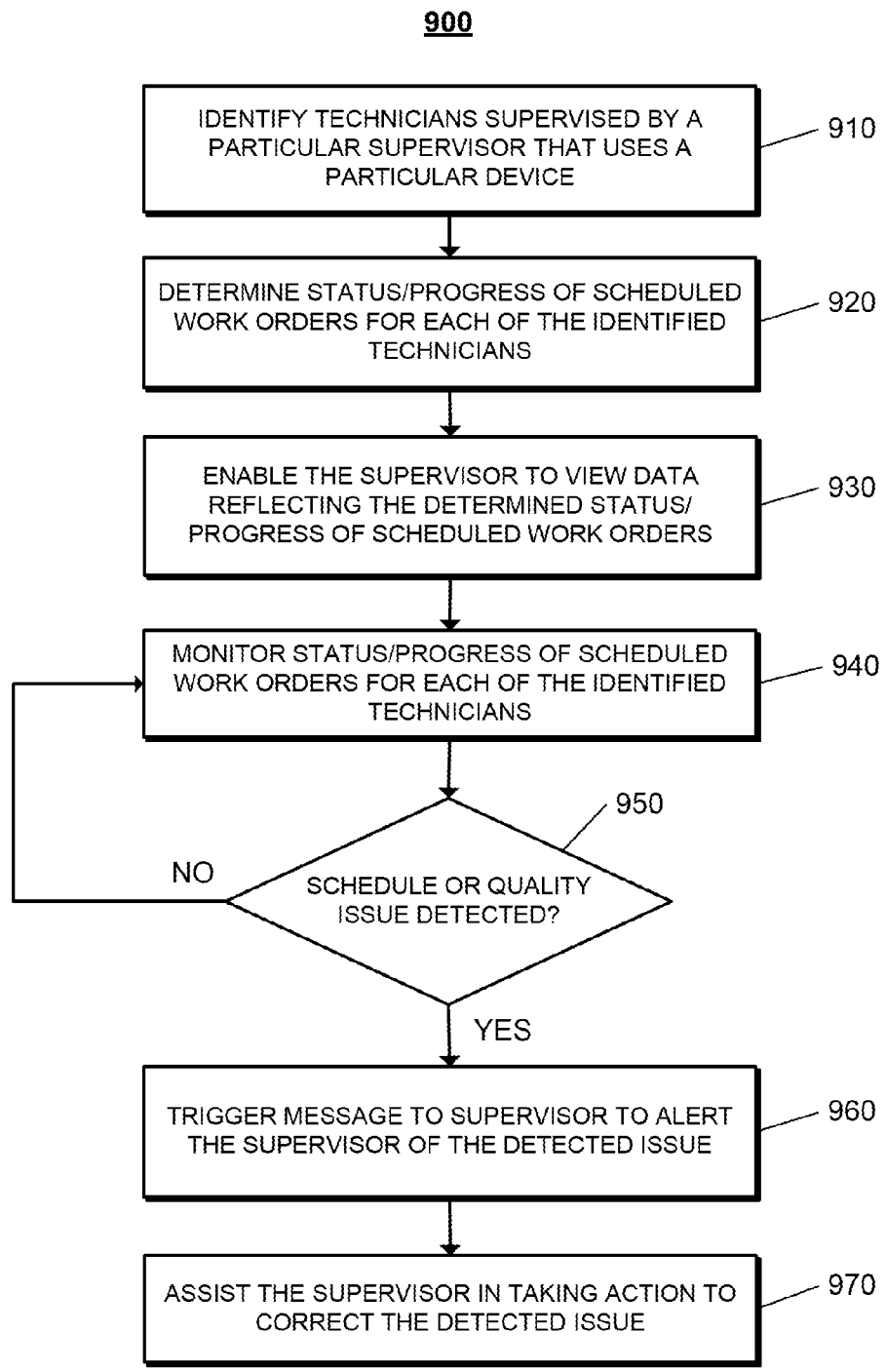

FIG. 9 is a flowchart illustrating a computer-implemented process 900 for assisting a supervisor to take action to address a schedule or quality issue. Briefly, the computer-implemented process 900 includes identifying technicians supervised by a particular supervisor that uses a particular device, determining progress of scheduled work orders for each of the identified technicians, enabling the supervisor to view data reflecting the determined progress of scheduled work orders, monitoring progress of scheduled work orders for each of the identified technicians, determining whether a schedule or quality issue is detected, and if a schedule or quality issue is detected, triggering a message to the supervisor to alert the supervisor of the detected issue, and assisting the supervisor in taking action to correct the detected issue. The operations of the process 900 may be performed by one or more components of the technician control system 100, one or more components of the system 200, or one or more processors included in one or more electronic devices.

In further detail, when the process 900 begins, technicians supervised by a particular supervisor that uses a particular device are identified (910). For example, a supervisor may supervise multiple technicians (e.g., 10 technicians). In a dispatch application, configuration of a technician account may include the selection of a supervisor user who supervises the technician. A query may be performed in the dispatch application to determine a set of technicians who are configured as being supervised by a particular supervisor. The supervisor may be determined by selecting a particular supervisor from a list, or by determining a supervisor who is registered to user a particular handheld device from which the query was initiated. For example, the supervisor may use a handheld device to run a dispatch application, communicate with technicians and perform other actions. For example, the supervisor may use a handheld PC (personal computer), wireless handheld device, laptop, smart phone, desktop computer, or other device.

Progress and status of scheduled work orders is determined for each of the identified technicians (920). For example, technicians may communicate status and progress of work orders using a mobile device, such as a handheld PC, laptop, smart phone, wireless handheld device, or other device. A technician may carry a mobile device, or a mobile device may be mounted in a technician's vehicle. Progress and status may be communicated from each technician to a dispatch application.

The supervisor is enabled to view data reflecting the determined progress and status of scheduled work orders (930). For example, in some implementations, the supervisor may be provided access to a dispatch application. The supervisor may have access to the dispatch application from a mobile device (e.g., handheld PC) and/or from another device such as a desktop computer. Progress and status of each work order for each technician supervised by the supervisor may be displayed in the dispatch interface in a list and/or map interface. In some implementations, the supervisor has access to a supervisor application which provides a different view of work orders than the dispatch application.

Progress and status of scheduled work orders is monitored for each of the identified technicians (940). For example, as each technician updates the status and progress of work orders that they are working on, the updated status and progress may be communicated to and displayed in the dispatch application. The supervisor may use the dispatch application to monitor progress and status of the work orders assigned to the technicians that the supervisor supervises.

Figure 10:
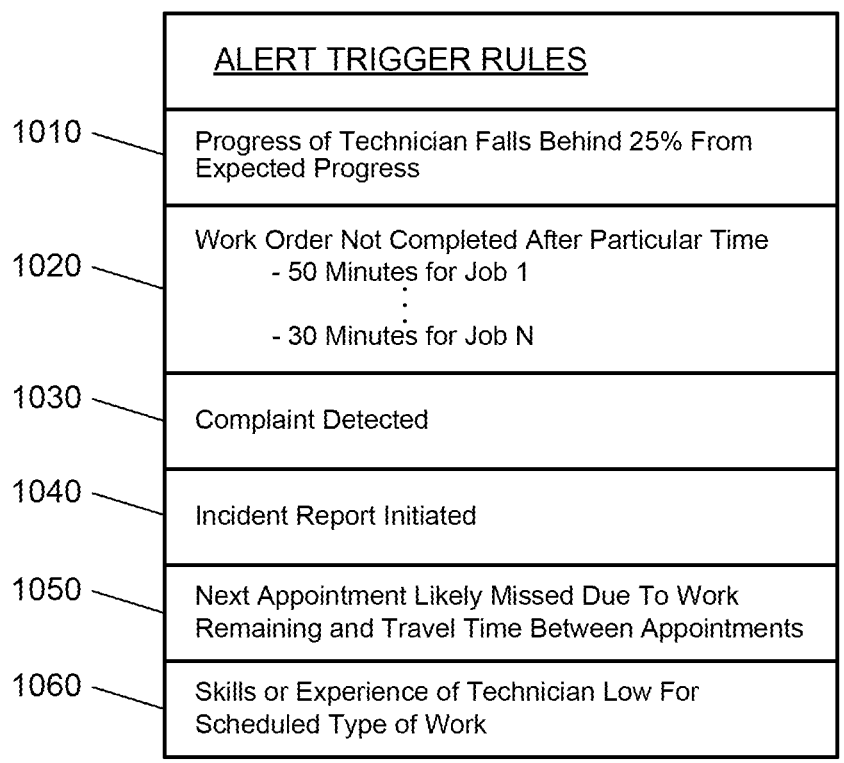
FIG. 10 illustrates example alert trigger rules.

It is determined whether a schedule or quality issue is detected (950). The determination whether a schedule or quality issue has been detected may be performed manually or automatically. For example, a set of rules can be defined which describe conditions which indicate a schedule or quality issue. For example, FIG. 10 illustrates a set of alert trigger rules 1000. As illustrated by rules 1010-1020, a schedule or quality issue may be detected if progress of a technician falls a certain percentage (e.g., twenty five percent) behind expected progress or if a work order is not completed after a threshold amount of time (e.g., fifty minutes, thirty minutes, etc.) has elapsed. Different threshold amounts of time may be configured for different jobs or different types of jobs. Different threshold amounts of time may be defined for different types of technicians (e.g., rules may be set for specific technicians, rules may be set for specific groups of technicians, such as groups of technicians with similar skills or technicians having a similar number of years of experience). As illustrated by rules 1030-1060, a schedule or quality issue may be detected if a complaint is received, if an incident report is initiated, if it is determined that the skills and/or experience of an assigned technician is low for a work order that the technician is assigned to, or if it is determined that it is likely that the technician may miss the next scheduled appointment due to the combination of the amount of estimated work time remaining plus the amount of estimated travel time to the next scheduled appointment exceeding the time remaining until the next scheduled appointment.

Figure 11:
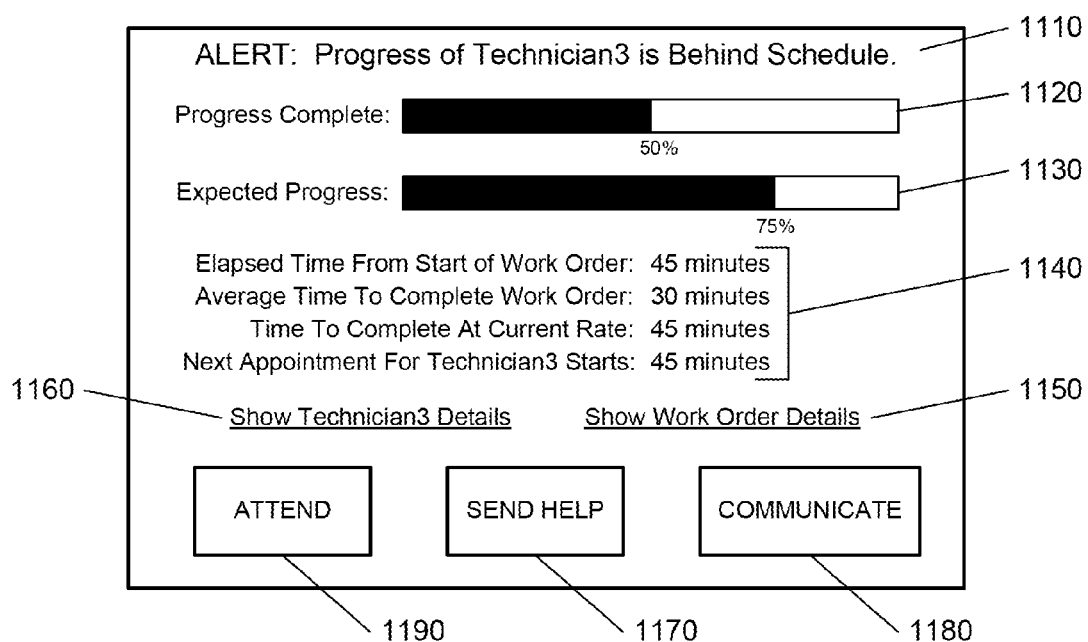
FIGS. 11 to 14 illustrate example supervisor alert messages.

If a schedule or quality issue is not detected, monitoring of status and progress of scheduled work orders continues for each of the identified technicians. If a schedule or quality issue is detected, a message to the supervisor is triggered to alert the supervisor of the detected issue (960). For example, if progress of a technician falls a certain percentage behind expected progress, an alert message such as the example alert message 1100 illustrated in FIG. 11 may be sent to the supervisor's device.

The alert message 1100 includes a title 1110 indicating that progress of "technician three" is behind schedule. A status bar 1120 indicates that the work order is fifty percent complete, whereas a status bar 1130 indicates that it is expected that the work order would be seventy five percent complete. The alert message 1100 may be triggered if the actual progress falls behind the expected progress by a configured threshold percentage, such as twenty five percent. A details area 1140 describes that forty five minutes have elapsed since the start of the work order, that the average time to complete the remaining portion of the work order is thirty minutes, and that the estimated time to complete the remaining portion of the work order at the current rate is forty five minutes. The details area 1140 also indicates that the next appointment for "technician three" begins in forty five minutes.

Figure 12:
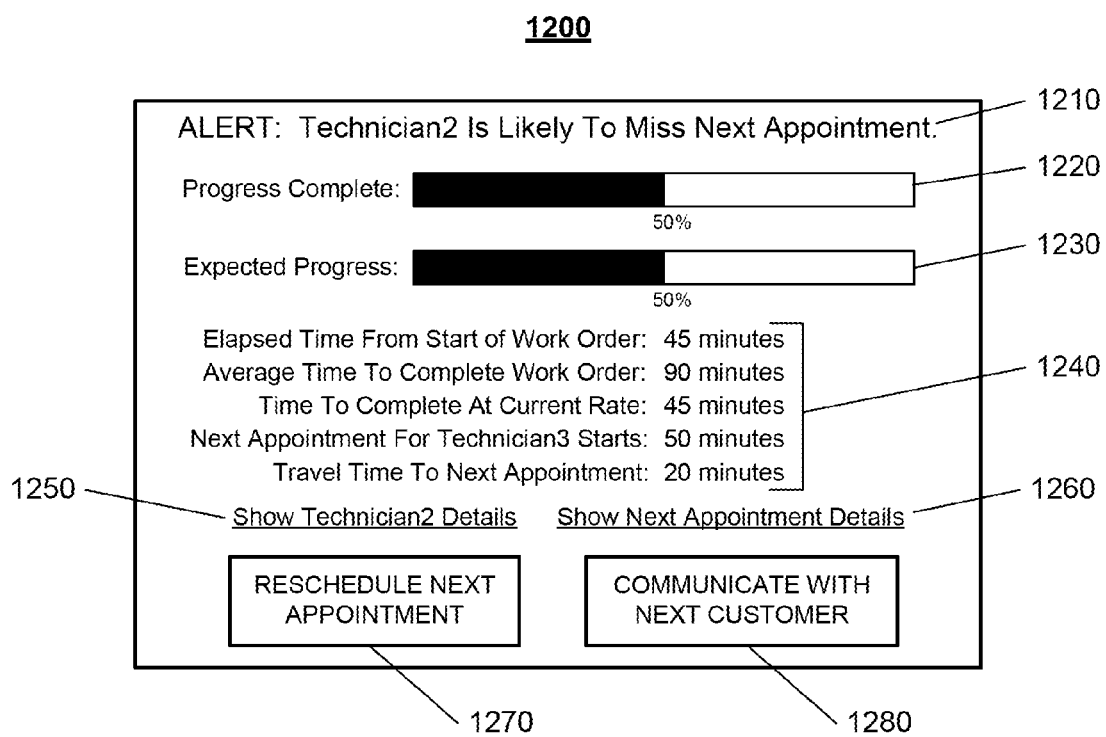

As another example, an alert message such as the alert message 1200 illustrated in FIG. 12 may be sent to the supervisor if it is determined that a technician may likely not be on time for the technician's next scheduled appointment. The alert message 1200 includes a title 1210 indicating that "technician two" is likely to miss the next appointment. A status bar 1220 indicates that the current work order is fifty percent complete, matching the expected progress of fifty percent indicated by a status bar 1230. Although the technician's progress matches the expected progress, the time remaining until the next scheduled appointment is, in this example, less than the combination of the time remaining to complete the current work order and the travel time to the next scheduled appointment. For example, travel time may now be more than earlier expected due to a detected traffic delay along the route to the next appointment. As described in a details area 1240, the estimated time to complete the current work order at the current rate is forty five minutes and the estimated travel time to the next appointment is twenty minutes. A total of sixty five minutes may be computed by adding the work time remaining and travel time. The sixty-five-minute total is more than the fifty-minute time remaining until the start of the next appointment.

Figure 13:
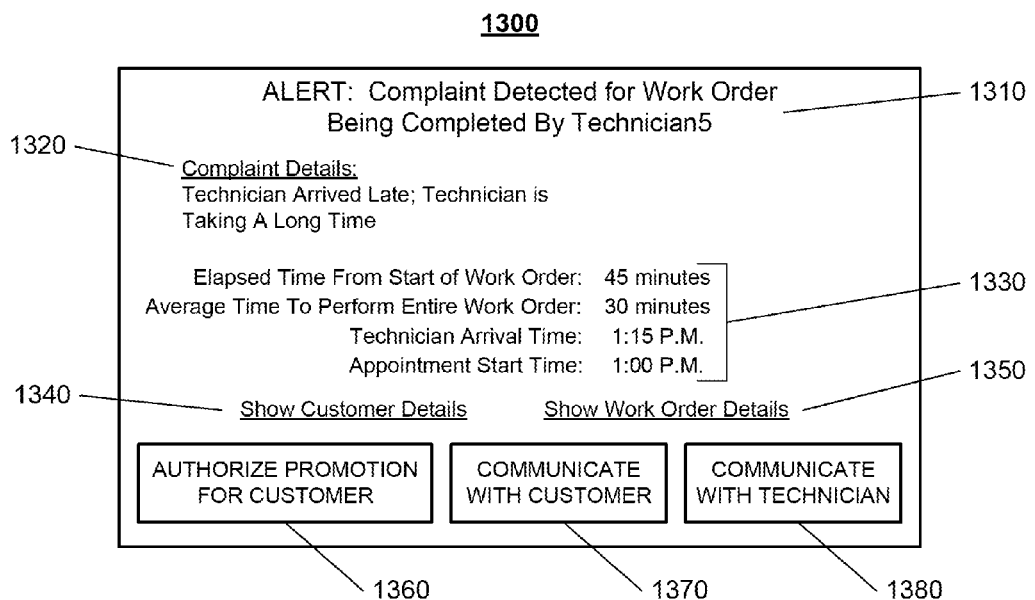

FIG. 13 illustrates another example of an alert message 1300 that a supervisor may receive. The alert message 1300 includes a title 1310 indicating that a complaint has been detected for a work order being completed by "technician five". A complaint details area 1320 indicates that "technician five" arrived late and is also taking a long time to complete the work order. An expanded details area 1330 describes that the elapsed time of forty five minutes exceeds an average time of thirty minutes and that the technician arrived at 1:15 pm for an appointment scheduled at 1:00 pm.

Figure 14:
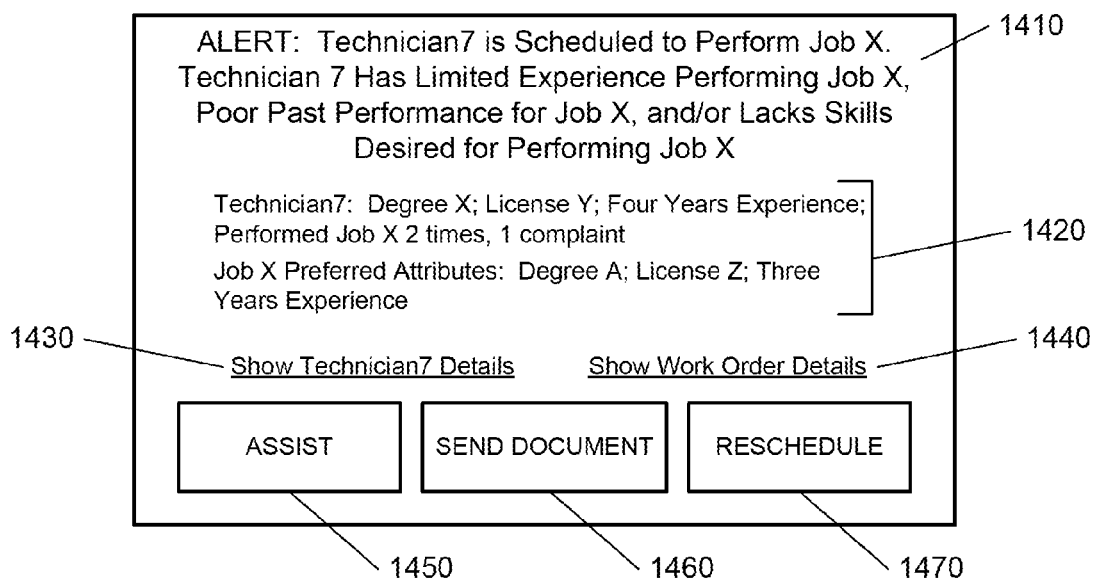

FIG. 14 illustrates an example alert message 1400 alerting a supervisor that the skills and/or experience of a technician assigned to a work order are missing or low for the scheduled type of work. A title 1410 indicates that "technician seven" is scheduled to perform job "X", but that "technician seven" has limited experience performing job "X", poor past performance for job "X", and/or lacks skills desired for performing job "X". A details area 1420 describes the general education and licensure status of "technician seven", and also any particular education, licensure, or experience which specifically qualify a technician to perform job "X". The details area 1420 also indicates whether "technician 7" has previously performed "job X" and whether any quality issues (e.g., complaints) were recorded.

Returning to FIG. 9, when a message to the supervisor is triggered to alert the supervisor of the detected issue, the supervisor is assisted in taking action to correct the detected issue (970). For instance, in the example of FIG. 11 where the supervisor has been alerted that progress of "technician 3" is behind schedule, the supervisor may interact with controls on the alert message 1100 to take action to correct the detected issue. For example, the supervisor may select a control 1150 to view additional details about the work order or may select a control 1160 to view details about "technician 3". The additional details may provide more information related to the detected issue and may assist the supervisor in determining how to handle the issue. In some implementations, the supervisor may initiate the sending of help (e.g., another technician) by selecting a control 1170. For example, if the supervisor activates the control 1170, the supervisor's device triggers an action to identify another technician that is qualified to help and also available to help (e.g., not currently scheduled for a work order or nearly complete with a nearby work order). In this example, when another technician is identified, the technician is scheduled to assist in the work order (e.g., the scheduling application updates the identified technician's schedule) and the supervisor is informed that the identified technician is being sent to help. In other examples, the control 1170 may cause the supervisor's device to display a list of available and qualified technicians and allow the supervisor to select a technician to send to help. Based on the supervisor's selection, the scheduling and dispatching applications may be updated. In some implementations, the supervisor may initiate the sending of help using other means (e.g., a verbal request to a dispatcher).

The supervisor may initiate a conversation (e.g., text and/or audio) with "technician three" by selecting a control 1180. For instance, if the supervisor activates the control 1180, the supervisor's device may automatically place a call to the technician's device to discuss the detected issue.

The supervisor may specify a desire to personally attend the appointment by selecting an attend control 1190. The supervisor may desire to attend the appointment to give personal, on-site assistance to the technician. In response to activation of the control 1190, the supervisor's schedule may be updated to reflect the appointment, and driving directions and other work order details may be displayed on the supervisor's device. Also, notification of the supervisor's pending arrival may be sent to the technician and/or the customer.

In the example of FIG. 12 where the supervisor has been alerted that "technician two" is likely to miss (or be late for) the next scheduled appointment, the supervisor may interact with controls 1250-1280 to take corrective action. Controls 1250 and 1260 may be selected to view additional details about the technician or the work order, respectively. The additional details may provide more information related to the detected issue and may assist the supervisor in determining how to handle the issue. Control 1270 may be selected to reschedule the next appointment. Rescheduling the next appointment may involve scheduling another technician to handle the next appointment or changing the date and/or time of the appointment. In some implementations, rescheduling involves placing a call to a dispatcher and requesting a change to be made through a dispatch application.

Control 1280 may be selected to communicate (e.g., phone call, email, text message, etc.) with the customer associated with "technician two"'s next appointment. For instance, if the supervisor activates the control 1280, the supervisor's device may automatically place a call to the customer to enable the supervisor to discuss the situation with the customer and handle the situation based on preference of the customer. By alerting the supervisor and allowing the supervisor to handle the scheduling issue, the technician may focus on completing the current work order without taking the time to reschedule the next appointment or alert the customer of the next appointment to the delay.

In the example of FIG. 13 where the supervisor has been alerted that a complaint has been detected for a work order being completed by "technician five", the supervisor may interact with controls 1340-1380 to take corrective action. Controls 1340 and 1350 may be selected to view additional details about the customer or the work order, respectively. The additional details may provide more information related to the detected issue and may assist the supervisor in determining how to handle the issue. Control 1360 may be selected to authorize a promotion (e.g., discount) for the customer who initiated and/or was affected by the complaint. In response to activation of the control 1360, a list of promotions or a custom input screen may be displayed to enable the supervisor to input the desired promotion deemed appropriate by the supervisor. A promotion may be identified by the supervisor or automatically identified by the supervisor's device. In response to identification of the promotion, the supervisor's device may send a message to the technician's device that indicates the authorized promotion and allows the technician to present the promotion to the customer. By allowing the supervisor to authorize the promotion at a touch of a button, the supervisor may handle complaints more quickly and without the delay caused by communicating with a disgruntled customer.

Control 1370 may be selected to communicate (e.g., phone call, email, text message, etc.) with the customer. Control 1380 may be selected to initiate a conversation (e.g., text message, email, phone call, etc.) with "technician five".

In the example of FIG. 14 where the supervisor has been alerted that "technician seven" may not have the required skills and/or experience to complete a work order, the supervisor may interact with controls 1430-1470 to take corrective action. Controls 1430 and 1440 may be selected to view additional details about the technician or the work order, respectively. The additional details may provide more information related to the detected issue and may assist the supervisor in determining how to handle the issue. Control 1450 may be selected to initiate an action to assist the technician. For example, another technician may be sent to assist "technician seven", the supervisor may communicate (e.g., through text, audio, and/or video) with "technician seven", or the supervisor may choose to physically attend the appointment to offer assistance. As another example, the supervisor may select control 1460 to send a training or instruction document or manual to "technician seven" (e.g., an electronic document may be sent to a technician device, and/or a document may be sent to a printer connected to a technician device (e.g., a printer may be connected to a device mounted in a technician's vehicle)). The supervisor may select control 1470 to reschedule the appointment (e.g., to reschedule using a technician who is more qualified to perform job "X").

Figure 15:
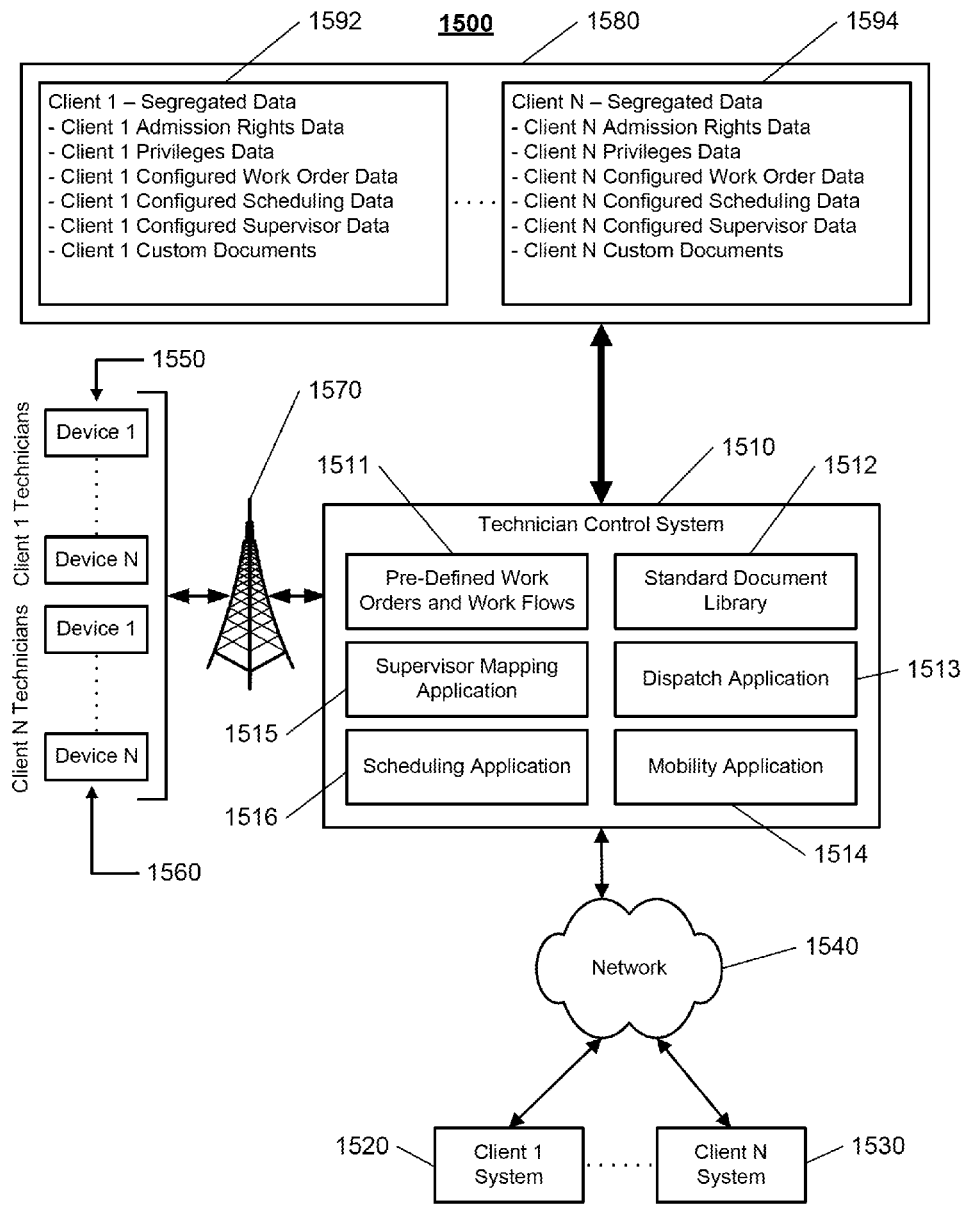
FIG. 15 illustrates an example system for controlling scheduling and dispatch operations for multiple, different clients.

FIG. 15 illustrates an example system 1500 for controlling scheduling and dispatch operations for multiple, different clients. The system 1500 includes a technician control system 1510. The technician control system 1510 includes pre-defined work orders and work flows 1511, a standard document library 1512, a dispatch application 1513, a mobility application 1514, a supervisor mapping application 1515, and a scheduling application 1516. The technician control system 1510 communicates with multiple client systems 1520-1530 over a network 1540. The technician control system 1510 also communicates with multiple technician devices 1550-1560 over a mobile network 1570. The system 1500 implements a "multi-tenant architecture", where each of the clients 1520-1530 is a tenant serviced by the technician control system 1510.

The pre-defined work orders and work flows 1511 include definitions for standard types of work orders that might be applicable for all or a majority of clients. Pre-defined work flows may define a standard set of processing steps for handling pre-defined types of work orders. The standard document library 1512 includes documents that might be applicable for all or a majority of clients.

The dispatch application 1513 may be used to convey schedule information to technicians and to manage alerts and reminders related to scheduled appointments. The mobility application 1514 may enable the technician control system 1510 to communicate with the technician devices 1550-1560. The supervisor mapping application 1515 may be used to enable a supervisor to respond to schedule and quality issues that occur in the field. The scheduling application 1516 may be used to define work schedules for technicians associated with a client.

The technician control system 1510 includes or has access to an electronic data store 1580 configured to maintain segregated data areas for each of the multiple clients associated with the multiple client systems 1520-1530, control access to the segregated areas using admission rights, and store configuration data for each of the multiple clients associated with the multiple client systems 1520-1530. For example, segregated data area 1592 includes, for and specific to a first client (e.g., client associated with client system 1520), admission rights data, privileges data, configured work order data, configured scheduling data, configured supervisor data, and custom documents. Similarly, a second segregated work area 1594 includes admission rights data, privileges data, configured work order data, configured scheduling data, configured supervisor data, and custom documents for a second client (e.g., client associated with client system 1530).

The technician control system 1510 is further configured to control scheduling and dispatch operations for each of the multiple clients associated with the multiple client systems 1520-1530 in a configured manner that leverages the stored configuration data for each of the multiple, different clients. For example, if a request is received from a technician device, a client associated with the technician device may be identified from among the multiple clients associated with the multiple client systems 1520-1530. Admission rights of the technician device may be compared to admission rights of the identified client, and in response to a determination that the technician device is authorized to perform the request, the request may be handled using standard, pre-defined assets and applications based on configurations defined by the client, and data related to the request may be stored in a segregated data area associated with the identified client.

The technician control system 1510 enables clients to deploy dispatching and scheduling applications without investing in expensive IT infrastructure and application development. Clients may purchase services offered by the technician control system, for example for a monthly fee. Clients may leverage pre-implemented, proven processes and avoid costly implementation of complex scheduling logic. Pre-defined processes can be configured and can adapt based on inputted client scheduling configuration options.

Each of the technician devices 1550-1560 may be a handheld PC (personal computer), wireless handheld device, laptop, smart phone, desktop computer, or other device. The network 1540 may be one or more public or private, wireless and/or wired networks, such as the Internet or a WAN (wide area network). The mobile network 1570 may be an IP (Internet Protocol) based network, using, for example, technologies such as UMTS (Universal Mobile Telecommunications System), CDMA (Code Division Multiple Access), GPRS (General Packet Radio Service), or EVDO (Evolution Data Optimized).

Figure 16:
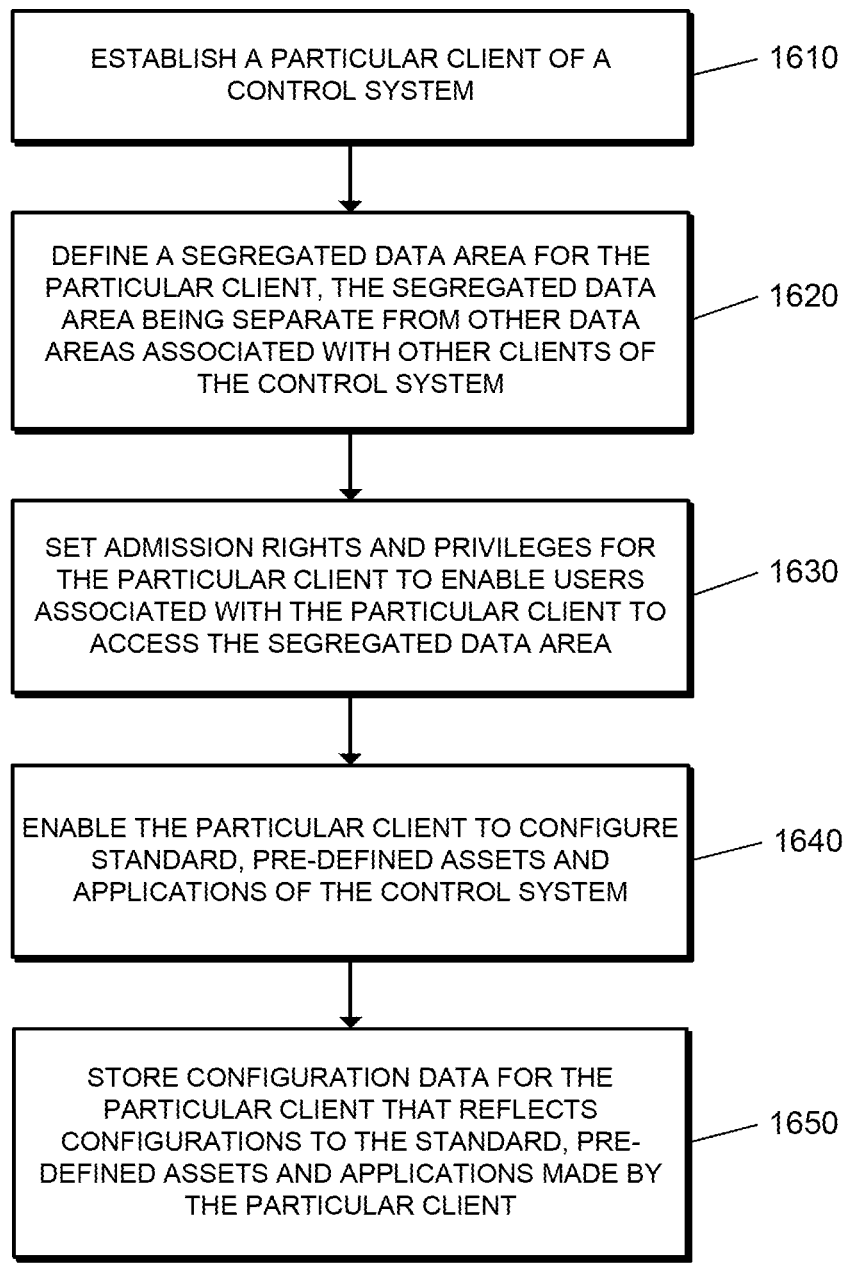

FIG. 16 is a flowchart illustrating a computer-implemented process 1600 for segregating data for multiple, different clients. Briefly, the computer-implemented process 1600 includes: establishing a particular client of a control system; defining a segregated data area for the particular client, the segregated data area being separate from other data areas associated with other clients of the control system; setting admission rights and privileges for the particular client to enable users associated with the particular client to access the segregated data area; enabling the particular client to configure standard, pre-defined assets and applications of the control system; and storing configuration data for the particular client that reflects configurations to the standard, pre-defined assets and applications made by the particular client. The operations of the process 1600 may be performed by one or more components of the system 1500, or one or more processors included in one or more electronic devices.

In further detail, when the process 1600 begins, a particular client of a control system is established (1610). For example, a particular client may commit to being serviced by the control system, and information related to setting up the client may be received from the client, for example through computer and/or paper-based forms. Data regarding user accounts, roles and privileges may be gathered, along with configured work order data, configured scheduling data, configured supervisor data, and custom documents. In further detail, scheduling configuration options which represent various high level scheduling goals may be gathered.

After a client is established, a segregated data area for the particular client is defined (1620), the segregated data area being separate from other data areas associated with other clients of the control system. For example, a segregated data area within an electronic data store may be defined and associated with the client. The segregated data area may represent a particular portion of a data storage device (e.g., a particular range of addresses). The segregated data area may also include a particular tag or encryption that is used specifically on the client's data and that is different than tags or encryption used on data of other clients.

Admission rights and privileges are set for the particular client to enable users associated with the particular client to access the segregated data area (1630). For example, various user roles may be defined, such as scheduler, dispatcher, technician supervisor, and technician. Users of each role type may be identified, and for each identified user, a user account may be established with an associated user identification, password and role membership. The user identification, password and role membership may be stored within the segregated data area associated with the client. The admission rights and privileges may be used to prevent other client devices or other external users from accessing the data associated with the particular client. The admission rights and privileges may be tied to hardware information of technician devices used by technicians of the client such that only technicians physically possessing a technician device associated with the particular client are able to access the particular client's data.

The particular client is enabled to configure standard, pre-defined assets and applications of the control system (1640). For example, custom work order types may be defined to represent custom types of work orders associated with the client. For each work order type, application interfaces may be configured or defined to support custom work order data entry for the custom work order type. As another example, custom documents such as manuals and troubleshooting documents may be defined and associated with specific work order types.

As another example, user input weighting one or more scheduling configuration options relative to other scheduling configuration options may be received from the client, where each scheduling configuration option represents a high level goal that the client desires to focus on in scheduling and dispatch operations. Pre-defined applications may be configured for the client based on the received scheduling configuration options.

Configuration data for the particular client is stored that reflects configurations to the standard, pre-defined assets and applications made by the particular client (1650). For example, custom parameter and variable values used in rules associated with a client's selected configuration options may be stored in the segregated data area associated with the client.

Figure 17:
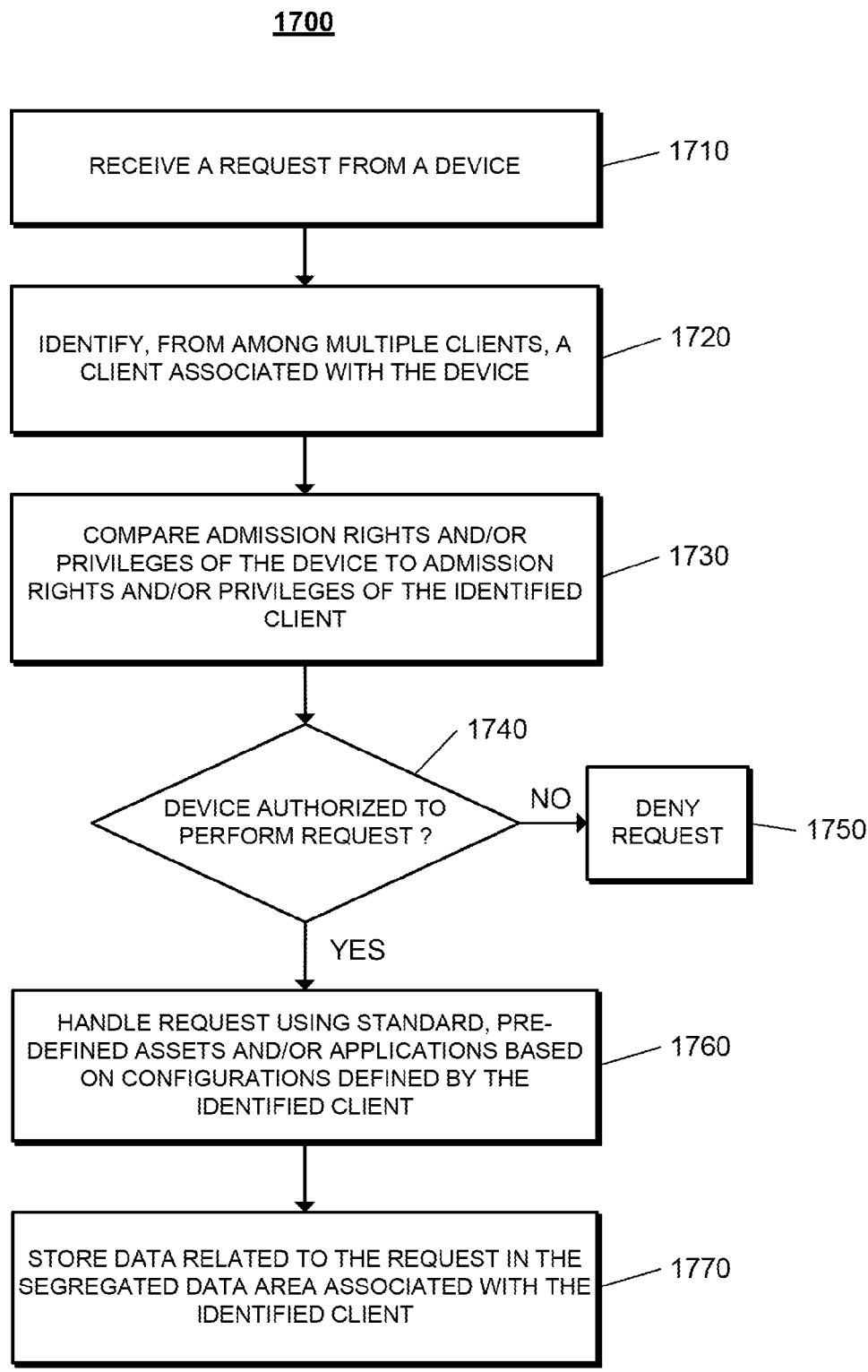

FIG. 17 is a flowchart illustrating a computer-implemented process 1700 for controlling scheduling and dispatch operations for multiple, different clients. Briefly, the computer-implemented process 1700 includes: receiving a request from a device; identifying, from among multiple clients, a client associated with the device; comparing admission rights and/or privileges of the device to admission rights and/or privileges of the identified client; determining whether the device is authorized to perform requests; denying the request if the device is not authorized to perform requests; if the device is authorized to perform requests, handling the request using standard, pre-defined assets and/or applications based on configurations defined by the identified client; and storing data related to the request in the segregated data area associated with the identified client. The operations of the process 1700 may be performed by one or more components of the system 1500, or one or more processors included in one or more electronic devices.

In further detail, when the process 1700 begins, a request is received from a device (1710). For example, a request to mark a work order as complete may be received from a technician device.

A client associated with the device is identified, from among multiple clients (1720). For example, a device identifier may be detected within or in association with the request received from the technician device, and a client identifier may be retrieved from a mapping of device identifiers to client identifiers. The mapping from device identifiers to client identifiers may be retrieved from an electronic data store.

Admission rights and/or privileges of the device are compared to admission rights and/or privileges of the identified client (1730). For example, the request from the technician device may include authentication information such as admission rights and/or privileges. The admission rights and/or privileges received from the device may be compared to admission rights and/or privileges retrieved from a segregated data area associated with the identified client.

It is determined whether the device is authorized to perform requests (1740). For example, it may be determined whether the admission rights and/or privileges of the device are recognized as being associated with a client. If the admission rights and/or privileges of the device are not associated with a client, it is determined that the device is not authorized to perform requests. If it is determined that the admission rights and/or privileges of the device are associated with a client, the privilege level needed to perform the request may be compared to privilege level(s) of the device. If a privilege level of the device is sufficient to perform the request (e.g., a privilege level of the device may be equal to or higher than the minimum needed privilege level, or a privilege level of the device may match or include a defined role which authorizes the request) then it is determined that the device is authorized to perform the request. If the privileges of the device are not sufficient to perform the request, it is determined that the device is not authorized to perform the request.

If the device is not authorized to perform requests, then the request is denied (1750). For example, the request may be ignored, or a denial message may be sent to the device.

If the device is authorized to perform requests, the request is handled using standard, pre-defined assets and/or applications based on configurations defined by the identified client (1760). For example, data related to client configurations may be retrieved from a segregated data area associated with the client. Application execution may be adapted based on the retrieved configured data.

Data related to the request is stored in the segregated data area associated with the identified client (1770). For example, a status value may be stored in the segregated data area associated with the identified client, to indicate that a work order is now complete.

Figure 18:
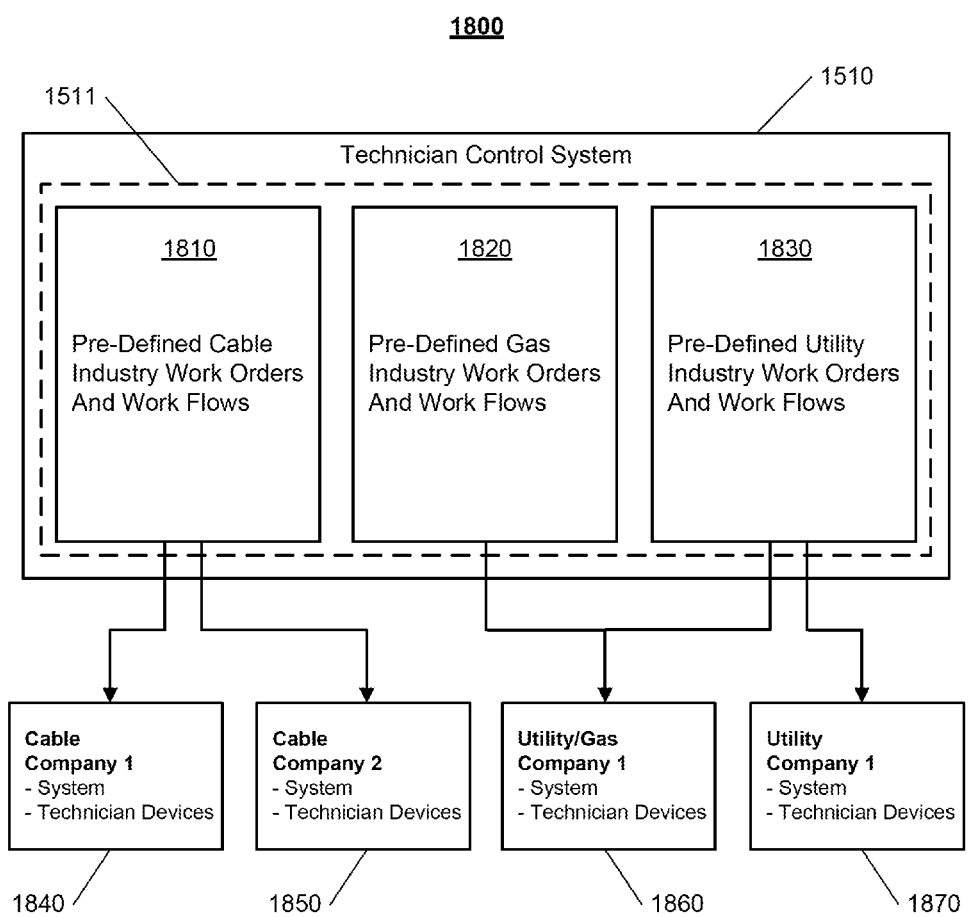
FIG. 18 is a diagram of an example system with pre-integrated work order and work flow data.

FIG. 18 illustrates an example system 1800 with pre-integrated work order and work flow data. The system 1800 illustrates an example of the system 1500 in which the pre-defined work orders and work flows 1511 stored in the technician control system 1510 include pre-defined work orders and work flows in each of multiple, different industries.

For instance, as shown, the pre-defined work orders and work flows 1511 include pre-defined cable industry work orders and work flows 1810, pre-defined gas industry work orders and work flows 1820, and pre-defined utility industry work orders and work flows 1830. The pre-defined industry work orders and work flows 1810-1830 represent work orders that typically occur in the corresponding industry and typical work flows for handling those work orders. Although three sets of pre-defined industry work orders and work flows 1810-1830 are shown in FIG. 18, more or fewer sets of pre-defined industry work orders and work flows may be defined and leveraged.

In some implementations, the pre-defined industry work orders and work flows 1810-1830 are defined based on user input from experts in the corresponding industries and are defined to generally apply to any company operating in the corresponding industry. In these implementations, a company that manages technicians operating in an industry for which work orders and work flows have been pre-defined can begin using the technician control system 1510 in a relatively short period of time by leveraging the pre-defined work orders and work flows. Because the works orders and work flows generally apply to any company operating in the corresponding industry, the company may be able to configure (e.g., define modifications for) the pre-defined work orders and work flows to meet company-specific requirements. Techniques described above with respect to FIGS. 15 and 16 may be used to enable client configuration of the pre-defined work orders and work flows. Leveraging the pre-defined work orders and work flows, even with substantial configuration, may offer a significant time saving in terms of beginning use of the technician control system.

The pre-defined industry work orders 1810-1830 define types of work orders performed in an industry and other information needed to complete the work orders. For instance, the pre-defined industry work orders 1810-1830 may include, for each work order, work order data that identifies the work order, that defines data needed to be collected/entered by a technician in handling the work order, and that defines graphical user interface displays (e.g., skins) displayed on technician devices to facilitate handling of the work order by a technician. In one example, an install new cable hookup work order in the cable industry defines data needed to be collected when installing a new cable hookup (e.g., identification number of cable box used, etc.). In another example, a replace meter work order in the utility industry defines data needed to be collected in replacing a meter (e.g., condition of replaced meter, etc.).

The pre-defined industry work flows 1810-1830 define operations and processing flow for handling the work orders defined in the work order data. For instance, the pre-defined industry work flows 1810-1830 may include, for each work order, work flow data that identifies the work order, that defines operations needed to complete the work order, and that defines an order in which the operations need to be performed. In one example, a replace meter work flow in the utility industry defines operations needed to be performed by a technician in replacing a meter and the order in which those operations are performed (e.g., take meter reading from old meter, remove old meter, enter details of removed meter, install new meter with zeroed reading, and take meter reading from new meter). For operations defined in the work flow data for a work order, the corresponding work order data is used to determine what data needs to be collected in performing the work order and to generate graphical user interfaces displayed on a technician device during completion of the work order.

In the example shown in FIG. 18, four client companies 1840-1870 leverage the pre-defined industry work orders and work flows 1810-1830. The four client companies 1840-1870 include a first cable company 1840, a second cable company 1850, a utility and gas company 1860, and a utility company 1870. Each of the client companies includes a client system (e.g., similar to systems 1520 and 1530 shown in FIG. 15) and multiple technician devices used by technicians managed by the company (e.g., similar to technician devices 1550 and 1560 shown in FIG. 15). Although four client companies 1840-1870 are shown in FIG. 18, more or fewer client companies may use the technician control system 1510 and leverage the pre-defined industry work orders and work flows 1810-1830.

In processing work orders, technician devices associated with the first cable company 1840 leverage the pre-defined cable industry work orders and work flows 1810. For instance, the technician devices associated with the first cable company 1840 send work order related requests to the technician control system 1510 and the technician control system 1510 handles the work order related requests using the pre-defined cable industry work orders and work flows 1810.

In some examples, the technician control system 1510 may send data that is based on the pre-defined cable industry work orders and work flows 1810 to the technician devices associated with the first cable company 1840. The technician devices associated with the first cable company 1840 may store the data and use the stored data in handling work orders.

Technician devices associated with the second cable company 1850 also leverage the pre-defined cable industry work orders and work flows 1810 in processing work orders. Because the second cable company 1850 is in the same industry as the first cable company 1840, the second cable company 1850 leverages the same pre-defined work order data and work flow data as the first cable company 1840. Accordingly, work order processing for the first cable company 1840 and the second cable company 1850 may be the same.

As discussed above, in some implementations, each of the first cable company 1840 and the second cable company 1850 define configurations (e.g., modifications) to the pre-defined cable industry work orders and work flows 1810 such that work order processing for the first cable company 1840 and the second cable company 1850 differs. In these implementations, although configurations are made, the underlying pre-defined cable industry work orders and work flows 1810 are used as a basis on which work order processing for the first cable company 1840 and the second cable company 1850 is handled.

Technician devices associated with the utility and gas company 1860 leverage both the pre-defined gas industry work orders and work flows 1820 and the pre-defined utility industry work orders and work flows 1830 in processing work orders. Because the utility and gas company 1860 manages technicians in both the gas industry and the utility industry, technicians associated with the utility and gas company 1860 use the pre-defined data for both industries. For example, the utility and gas company 1860 manages a first technician that services the gas industry and a second technician that services the utility industry. In this example, requests associated with a first technician device used by the first technician are handled using the pre-defined gas industry work orders and work flows 1820 and requests associated with a second technician device used by the second technician are handled using the pre-defined utility industry work orders and work flows 1830. When a request is being processed, the technician control system 1510 may determine the industry associated with the technician device handling the work order and use the pre-defined work order data and work flow data that corresponds to the determined industry.

In another example, the utility and gas company 1860 manages a technician that services both the gas industry and the utility industry. In this example, a technician device used by the technician leverages both the pre-defined gas industry work orders and work flows 1820 and the pre-defined utility industry work orders and work flows 1830. When a request is being processed, the technician control system 1510 determines the industry associated with the request and uses the pre-defined work order data and work flow data that corresponds to the determined industry.

Technician devices associated with the utility company 1870 leverage the pre-defined utility industry work orders and work flows 1830 in processing work orders. Because the utility company 1870 is in the same industry as a portion of the utility and gas company 1860, the utility company 1870 leverages a portion of the pre-defined work order data and work flow data that is used by the utility and gas company 1860. Accordingly, work order processing for the utility company 1870 and the utility and gas company 1860 may be the same for utility work orders. Of course, either or both of the utility and gas company 1860 and the utility company 1870 may make configurations to the pre-defined utility industry work orders and work flows 1830 such that work order processing for utility work orders differs. Although configurations may be made, the underlying pre-defined utility industry work orders and work flows 1830 are used as a basis on which utility work order processing for the utility and gas company 1860 and the utility company 1870 is handled.

Figure 19:
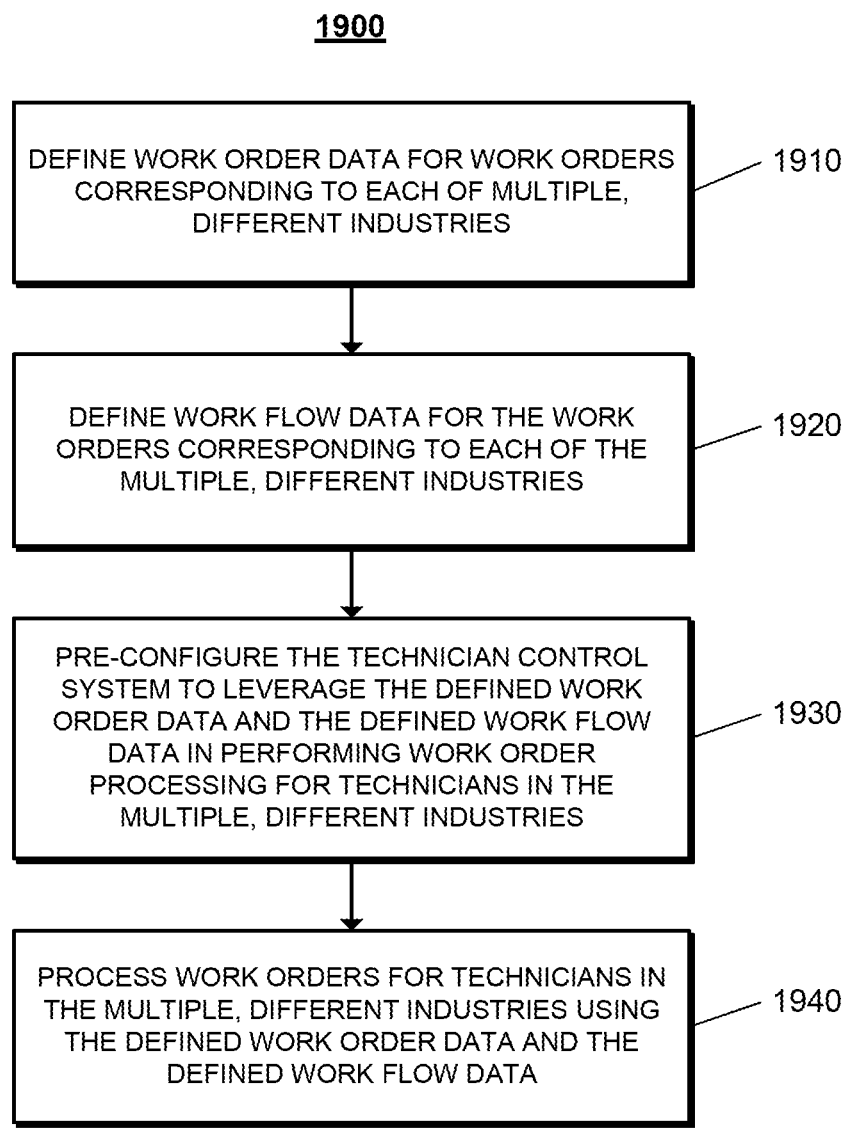

FIG. 19 is a flowchart illustrating a computer-implemented process 1900 for processing work orders for technicians in each of multiple, different industries. Briefly, the computer-implemented process 1900 includes: defining work order data for work orders corresponding to each of multiple, different industries; defining work flow data for the work orders corresponding to each of the multiple, different industries; pre-configuring the technician control system to leverage the defined work order data and the defined work flow data in performing work order processing for technicians in the multiple, different industries; and processing work orders for technicians in the multiple, different industries using the defined work order data and the defined work flow data. The operations of the process 1900 may be performed by one or more components of the system 1500 or 1800, or one or more processors included in one or more electronic devices.

In further detail, when the process 1900 begins, work order data for work orders corresponding to each of multiple, different industries is defined (1910). The work order data is defined in electronic storage of a technician control system based on user input. For example, industry experts associated with the technician control system may develop work order data for a particular industry based on past experience and expertise. In this example, the technician control system receives input describing the developed work order data for the particular industry and defines work order data in electronic storage based on the received input. By using the technician control system, client companies that are unrelated to the industry experts may leverage the work order data that has been pre-defined by the industry experts.

The work order data includes information identifying work orders that occur in the particular industry. For each work order, the work order data may include information that describes data (if any) needed to be collected/entered by a technician in handling the work order. The work order data also may define graphical user interface displays (e.g., skins) that are to be displayed on technician devices when a technician is handling work orders. The graphical user interface displays (e.g., skins) may include a combination of work order specific graphical user interface displays (e.g., skins) and industry specific graphical user interface displays (e.g., skins) that apply to more than one work order (e.g., all work orders). The technician control system receives input for each of multiple, different industries and defines work order data in electronic storage for each of the multiple, different industries.

Work flow data for the work orders corresponding to each of the multiple, different industries also is defined (1920). The work flow data is defined in electronic storage of a technician control system based on user input. The work flow data may be defined using techniques similar to those discussed above at reference numeral 1910 with respect to the work order data.

The work flow data includes information defining operations and processing flow for handling the work orders defined in the work order data. For instance, the work flow data may include, for each work order, information that describes operations needed to complete the work order and an order in which the operations need to be performed. The technician control system and/or the technician devices use the work flow data to control process flow and selection of which interfaces are displayed to technicians handling work orders.

A technician control system is pre-configured to leverage the defined work order data and the defined work flow data in performing work order processing for technicians in the multiple, different industries (1930). For instance, processing components of the technician control system are configured to leverage the defined work order data and the defined work flow data based on an industry of a client or an industry of a technician of a client. In this regard, a client may begin using the technician control system in a relatively short period of time by identifying an industry of the client or its technicians.

Work orders for technicians in the multiple, different industries are processed using the defined work order data and the defined work flow data (1940). For instance, user interface display and data collection is controlled for technician devices using the defined work order data and work flow processing for the technician devices is controlled using the defined work flow data. In some examples, the technician control system and a technician device exchange communications related to a work order, the technician control system accesses the defined work order data and the defined work flow data appropriate for the work order, and the technician control system sends communications to the technician device that control the technician device in accordance with the defined work order data and the defined work flow data. In other examples, the technician control system sends the defined work order data and the defined work flow data to technician devices to enable the technician devices to process work orders locally without having to communicate with the technician control system.

Figure 20:
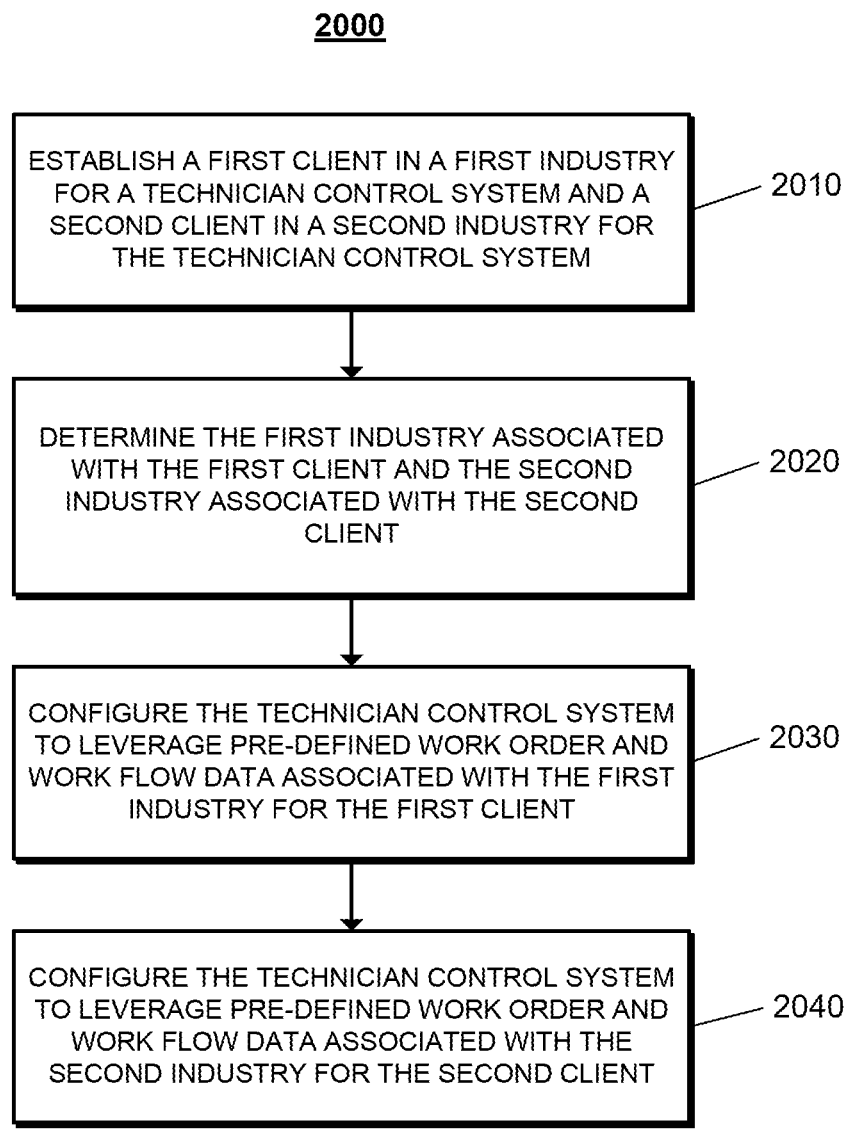

FIG. 20 is a flowchart illustrating a computer-implemented process 2000 for configuring a technician control system to leverage pre-defined work order and work flow data for clients that operate in different industries. Briefly, the computer-implemented process 2000 includes: establishing a first client in a first industry for a technician control system and a second client in a second industry for the technician control system; determining the first industry associated with the first client and the second industry associated with the second client; configuring the technician control system to leverage pre-defined work order and work flow data associated with the first industry for the first client; and configuring the technician control system to leverage pre-defined work order and work flow data associated with the second industry for the second client. The operations of the process 2000 may be performed by one or more components of the system 1500 or 1800, or one or more processors included in one or more electronic devices.

In further detail, when the process 2000 begins, a first client in a first industry and a second client in a second industry are established for a technician control system (2010). For example, a particular client may commit to being serviced by the control system, and information related to setting up the client may be received from the client, for example through computer and/or paper-based forms. Data regarding industry and technicians may be gathered, along with needed configurations to pre-defined work order and work flow data. Many clients in each of many, different industries may be established.

The first industry associated with the first client and the second industry associated with the second client is determined (2020). For instance, the industry of each of the clients may be determined based on information or input received from the clients.

The technician control system is configured to leverage pre-defined work order and work flow data associated with the first industry for the first client (2030). For example, processing components of the technician control system are configured to leverage work order data and work flow data that was defined in the technician control system for the first industry prior to establishment of the first client. In this example, the technician control system may store data that causes the technician control system to use the pre-defined work order and work flow data associated with the first industry for work order requests related to technicians managed by the first client. In some implementations, the processing components of the technician control system are configured to leverage the pre-defined work order data and work flow data based on configurations to the pre-defined work order and work flow data specified by the first client.

The technician control system is configured to leverage pre-defined work order and work flow data associated with the second industry for the second client (2040). For example, processing components of the technician control system are configured to leverage work order data and work flow data that was defined in the technician control system for the second industry prior to establishment of the second client. In this example, the technician control system may store data that causes the technician control system to use the pre-defined work order and work flow data associated with the second industry for work order requests related to technicians managed by the second client. In some implementations, the processing components of the technician control system are configured to leverage the pre-defined work order data and work flow data based on configurations to the pre-defined work order and work flow data specified by the second client.

Figure 21:
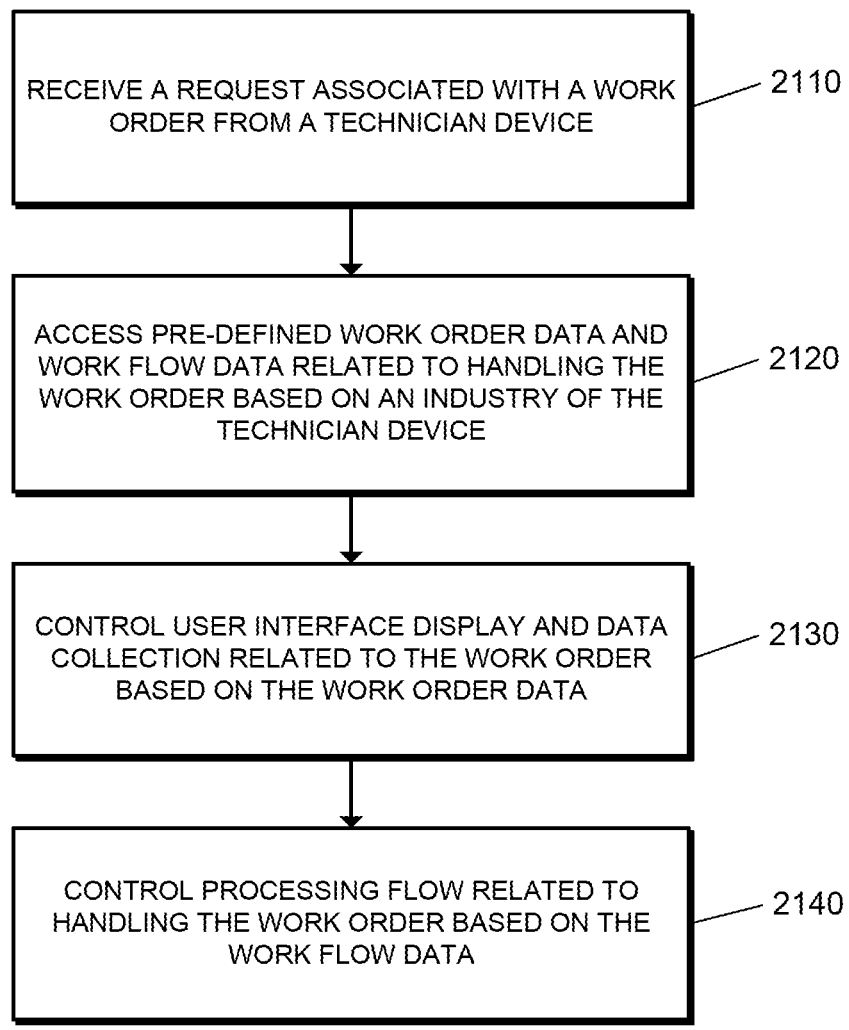

FIG. 21 is a flowchart illustrating a computer-implemented process 2100 for configuring a technician control system to leverage pre-defined work order and work flow data for clients that operate in different industries. Briefly, the computer-implemented process 2100 includes: receiving a request associated with a work order from a technician device; accessing pre-defined work order data and work flow data related to handling the work order based on an industry of the technician device; controlling user interface display and data collection related to the work order based on the work order data; and controlling processing flow related to handling the work order based on the work flow data. The operations of the process 2100 may be performed by one or more components of the system 1500 or 1800, or one or more processors included in one or more electronic devices.

In further detail, when the process 2100 begins, a request associated with a work order is received from a technician device (2110). For example, a request to start a work order may be received from a technician device.

Pre-defined work order data and work flow data related to handling the work order is accessed based on an industry of the technician device (2120). For instance, pre-defined work order data and work flow data for the industry associated with the work order is accessed from electronic storage. In some implementations, the technician control system may determine, from among multiple, different industries, an industry associated with the technician device and access, from at least one electronic data store, pre-defined work order data and work flow data for the determined industry. In these implementations, the technician control system may determine the industry of the technician device by analyzing the work order related to the request or by accessing data from storage (or communications received from the technician device) that indicates the industry of the technician device.

In other implementations, the technician control system may identify, from among multiple clients, a client associated with the technician device and access, from at least one electronic data store, pre-defined work order data and work flow data for which the technician control system has been configured to leverage for the identified client. In these implementations, upon establishment of the client, the technician control system may have been configured to leverage work order data and work flow data associated with the industry of the client for all technician devices managed by the client.

User interface display and data collection related to the work order is controlled based on the work order data (2130). For instance, as a technician is completing a work order using a technician device, graphical user interfaces displayed at each step in completing the work order are generated based on the work order data. The graphical user interfaces are generated by accessing work order data that includes formatting definitions (e.g., skins) associated with the work order and data collection definitions associated with the work order. Aesthetic appearance of the graphical user interfaces is generated based on the formatting definitions (e.g., skins) and data entry controls/fields are generated based on the data collection definitions.

Processing flow related to handling the work order is controlled based on the work flow data (2140). For instance, as a technician is completing a work order using a technician device, a flow of the graphical user interfaces displayed (or other actions) is controlled using the work flow data. The work flow data may define steps needed to complete the work order and an order in which the steps are to be performed. The work flow data may be used to display a graphical user interface defined for a step of the work order currently being completed by the technician and then, when the step is completed, used to select a next graphical user interface defined for the next step of the work order.

Figure 22:
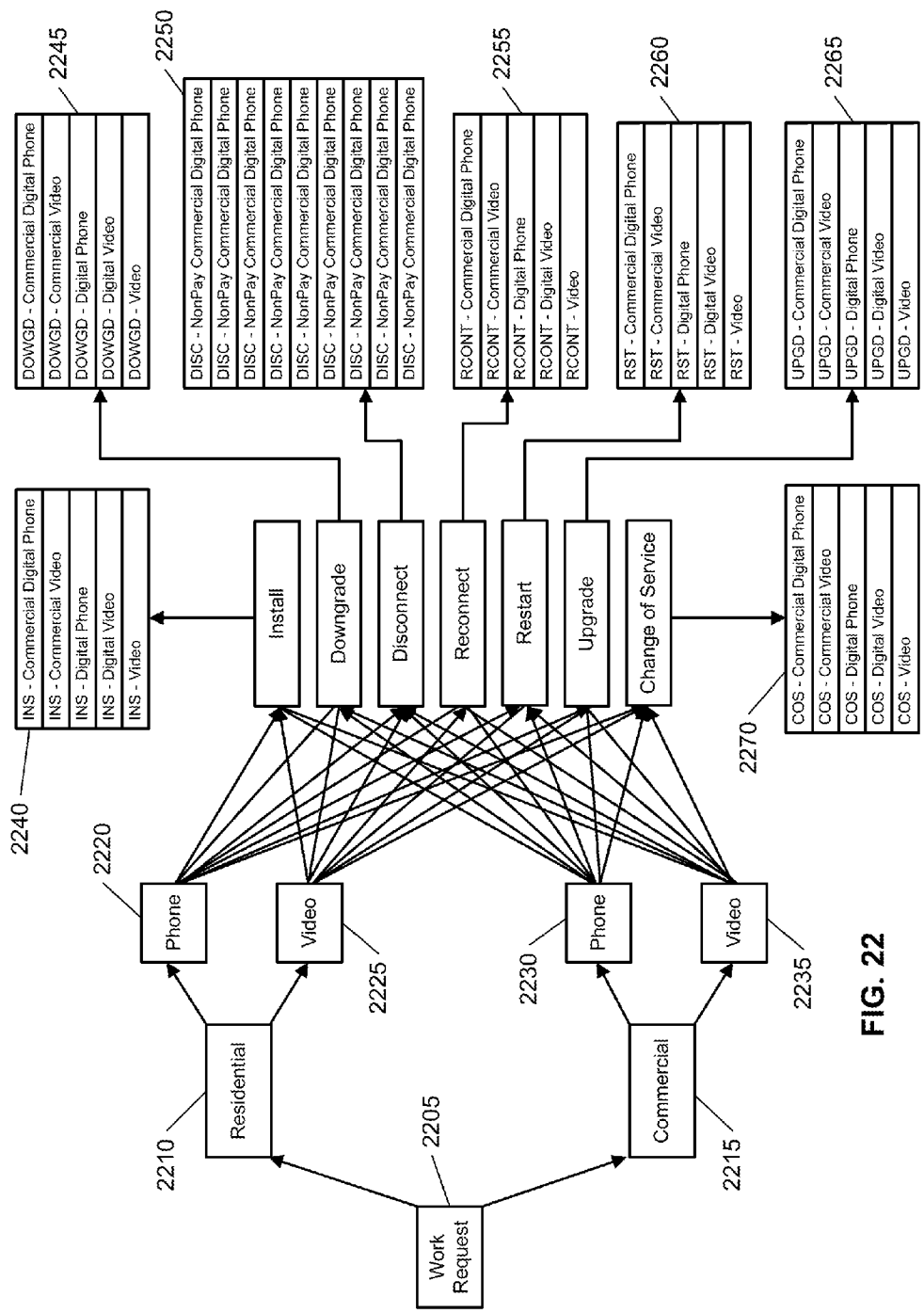
FIG. 22 is a diagram of an example work flow.

FIG. 22 illustrates an example work flow. The example work flow relates to a service work order in the cable industry. As shown, when a work order request is initiated 2205, the technician control system determines whether the work order request is a residential request 2210 or a commercial request 2215. For a residential request 2210, the technician control system determines whether the work order request is for phone 2220 or video 2225. Similarly, for a commercial request 2215, the technician control system determines whether the work order request is for phone 2230 or video 2235.

Next, the technician control system determines whether the work order request is an install work order, a downgrade work order, a disconnect work order, a reconnect work order, a restart work order, an upgrade work order, or a change of service work order. Based on the determinations that more specifically identify the type of the work order request, the technician control system accesses the work order data (e.g., 2240-2270) related to the specific type of request and handles the work order request based on the accessed work order data. For instance, when the work order request is an install work order, the technician control system accesses the install work order data 2240. When the work order request is a downgrade work order, the technician control system accesses the downgrade work order data 2245. Further, when the work order request is an disconnect work order, the technician control system accesses the disconnect work order data 2250.

In addition, when the work order request is a reconnect work order, the technician control system accesses the reconnect work order data 2255. When the work order request is a restart work order, the technician control system accesses the restart work order data 2260. When the work order request is an upgrade work order, the technician control system accesses the upgrade work order data 2265. When the work order request is a change of service work order, the technician control system accesses the change of service work order data 2270. The technician control system then handles the work order using the accessed work order data.

Figure 23:
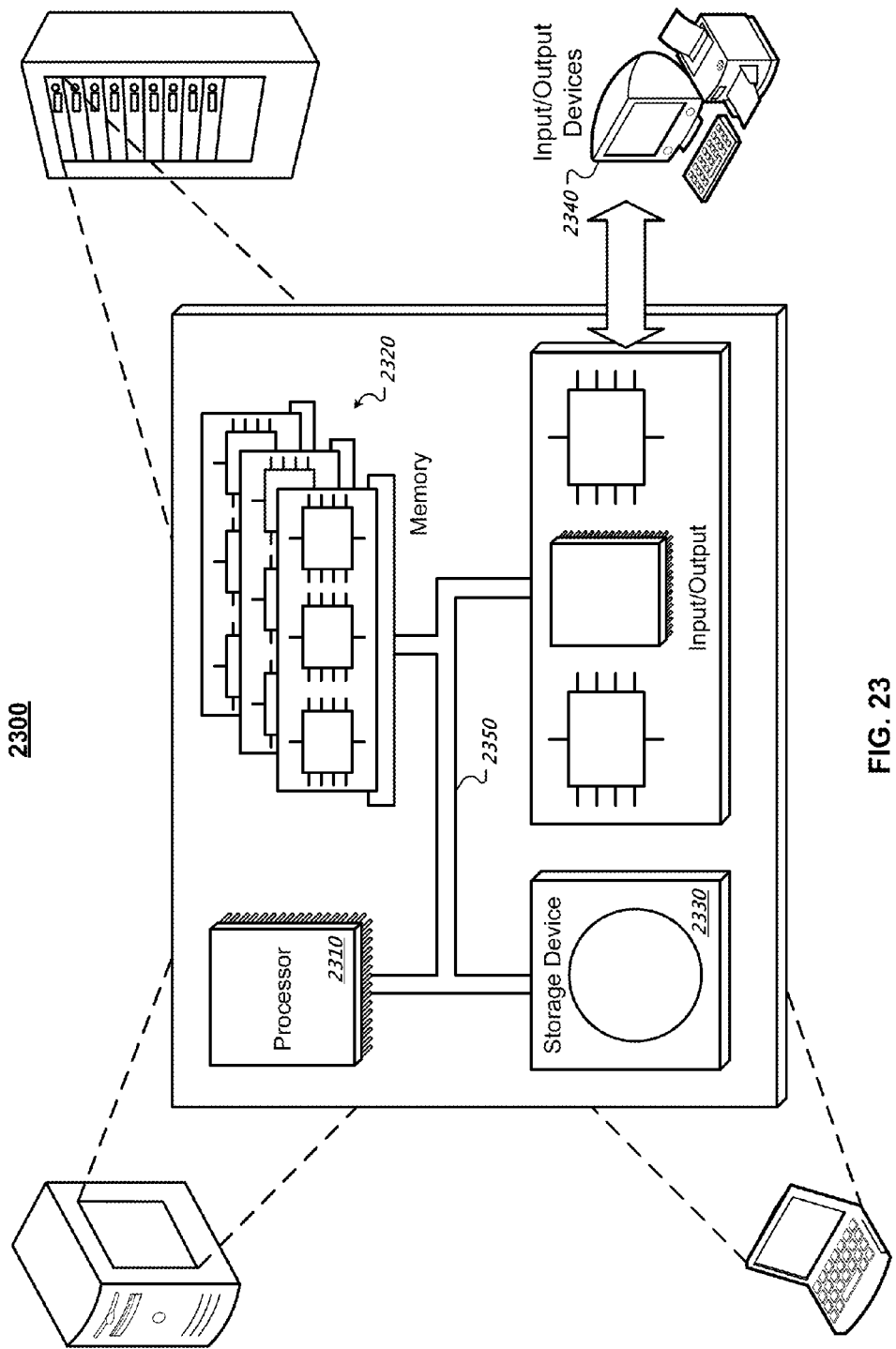
FIG. 23 illustrates components of an exemplary computer processing system.

FIG. 23 is a schematic diagram of an example of a generic computer system 2300. The system 2300 includes a processor 2310, a memory 2320, a storage device 2330, and an input/output device 2340. Each of the components 2310, 2320, 2330, and 2340 are interconnected using a system bus 2350. The processor 2310 is capable of processing instructions for execution within the system 2300. In one implementation, the processor 2310 is a single-threaded processor. In another implementation, the processor 2310 is a multi-threaded processor. The processor 2310 is capable of processing instructions stored in the memory 2320 or on the storage device 2330 to display graphical information for a user interface on the input/output device 2340.

The memory 2320 stores information within the system 2300. In one implementation, the memory 2320 is a computer-readable medium. In another implementation, the memory 2320 is a volatile memory unit. In yet another implementation, the memory 2320 is a non-volatile memory unit.

The storage device 2330 is capable of providing mass storage for the system 2300. In one implementation, the storage device 2330 is a computer-readable medium. In various different implementations, the storage device 2330 may be a floppy disk device, a hard disk device, an optical disk device, or a tape device.

The input/output device 2340 provides input/output operations for the system 2300. In one implementation, the input/output device 2340 includes a keyboard and/or pointing device. In another implementation, the input/output device 2340 includes a display unit for displaying graphical user interfaces.

The features described can be implemented in digital electronic circuitry, or in computer hardware, or in combinations of computer hardware and firmware or software. The apparatus can be implemented in a computer program product tangibly embodied in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A technician control system comprising:
    a control system configured to control scheduling and dispatch operations for work orders being handled by technicians associated with a client;
    at least one electronic data store configured to store data associated with the client; and
    multiple technician devices that are each associated with one or more technicians, configured to communicate, over a network, with the control system, and configured to provide output in response to communications that are received from the control system and that are related to the scheduling and dispatch operations performed by the control system,
    wherein the control system is configured to control supervisor mapping operations for work orders being handled by technicians associated with the client and includes at least one processor configured to perform operations comprising:
        identifying technicians supervised by a particular supervisor that uses a particular device;
        determining progress of scheduled work orders for each of the identified technicians;
        enabling the supervisor to view data reflecting the determined progress of scheduled work orders;
        monitoring progress of the scheduled work orders for each of the identified technicians;
        based on the monitoring, detecting whether a schedule or quality issue occurs in the scheduled work orders for each of the identified technicians; and
        in response to detecting that a schedule or quality issue has occurred in at least one of the scheduled work orders being handled by at least one of the identified technicians:
            sending, to the particular device used by the particular supervisor, a message to alert the supervisor of the detected issue; and
            assisting the supervisor in taking action to correct the detected issue.

2. The technician control system of claim 1:
    wherein detecting whether a schedule or quality issue occurs in the scheduled work orders for each of the identified technicians comprises:
        comparing progress of a particular work order being handled by a particular technician to an expected progress for the particular work order;
        based on the comparison, determining whether the progress of the particular work order being handled by the particular technician is behind the expected progress by more than a threshold amount;
        detecting an issue in response to a determination that the progress of the particular work order being handled by the particular technician is behind the expected progress by more than the threshold amount; and
        detecting that an issue does not exist in response to a determination that the progress of the particular work order being handled by the particular technician is not behind the expected progress by more than the threshold amount;
    wherein sending, to the particular device used by the particular supervisor, the message to alert the supervisor of the detected issue comprises sending a message that indicates that the particular technician is behind schedule in performing the particular work order, that provides an indication of the progress of the particular work order being handled by the particular technician, and that provides an indication of the expected progress; and
    wherein assisting the supervisor in taking action to correct the detected issue comprises:
        enabling the supervisor to respond to the message by communicating with the particular technician;
        enabling the supervisor to respond to the message by receiving directions to attend the particular work order; and
        enabling the supervisor to respond to the message by sending another technician to assist the particular technician with the particular work order.

3. The technician control system of claim 1:
    wherein detecting whether a schedule or quality issue occurs in the scheduled work orders for each of the identified technicians comprises:
        determining an expected amount of time remaining for a particular technician to complete a particular work order being handled by the particular technician;
        determining a travel time between a location of the particular work order and a location of a next work order scheduled for completion by the particular technician;
        identifying a scheduled start time of the next work order scheduled for completion by the particular technician;
        analyzing the expected amount of time remaining for the particular technician to complete the particular work order and the determined travel time with respect to the scheduled start time of the next work order;
        based on the analysis, determining whether the particular technician is likely to miss the scheduled start time of the next work order;
        detecting an issue in response to a determination that the particular technician is likely to miss the scheduled start time of the next work order; and
        detecting that an issue does not exist in response to a determination that the particular technician is not likely to miss the scheduled start time of the next work order;
    wherein sending, to the particular device used by the particular supervisor, the message to alert the supervisor of the detected issue comprises sending a message that indicates that the particular technician is likely to miss the scheduled start time of the next work order, that provides an indication of the expected amount of time remaining for the particular technician to complete the particular work order, that provides an indication of the determined travel time, and that provides an indication of the scheduled start time of the next work order; and wherein assisting the supervisor in taking action to correct the detected issue comprises:
enabling the supervisor to respond to the message by rescheduling the next work order for the particular technician; and
enabling the supervisor to respond to the message by communicating with a customer corresponding to the next work order.

4. The technician control system of claim 1 wherein:
the control system is configured to control scheduling and dispatch operations for multiple, different clients;
the at least one electronic data store is configured to maintain segregated data areas for each of the multiple, different clients, control access to the segregated areas using admission rights, and store configuration data for each of the multiple, different clients; and
the control system is further configured to control scheduling and dispatch operations for each of the multiple, different clients in a configured manner that leverages the stored configuration data for each of the multiple, different clients.

5. The technician control system of claim 4 wherein the at least one processor is configured to perform operations further comprising:
establishing a particular client;
defining, in the at least one electronic data store, a segregated data area for the particular client, the segregated data area being separate from other data areas associated with other clients of the control system;
setting admission rights and privileges for the particular client to enable users associated with the particular client to access the segregated data area;
enabling the particular client to configure standard, pre-defined assets and applications of the control system; and
storing configuration data for the particular client that reflects configurations to the standard, pre-defined assets and applications made by the particular client.

6. The technician control system of claim 4 wherein the at least one processor is configured to perform operations further comprising:
receiving a request from a technician device;
identifying, from among the multiple, different clients, a client associated with the technician device;
comparing admission rights of the technician device to admission rights of the identified client;
based on the comparison, determining whether the technician device is authorized to perform the request;
in response to a determination that the technician device is not authorized to perform the request, denying the request; and
in response to a determination that the technician device is authorized to perform the request:
handling the request using standard, pre-defined assets and applications based on configurations defined by the identified client; and
storing data related to the request in a segregated data area associated with the identified client.

7. The technician control system of claim 1 wherein the at least one processor is configured to perform operations further comprising:
receiving a request associated with a work order from a technician device;
accessing, from the at least one electronic data store, pre-defined work order data and work flow data related to handling the work order based on an industry associated with the technician device;
controlling user interface display on the technician device and data collection on the technician device related to the work order based on the accessed work order data; and
controlling processing flow related to handling the work order on the technician device based on the accessed work flow data.

8. The technician control system of claim 7 wherein accessing, from the at least one electronic data store, pre-defined work order data and work flow data related to handling the work order based on the industry associated with the technician device comprises:
determining, from among the multiple, different industries, the industry associated with the technician device; and
accessing, from the at least one electronic data store, pre-defined work order data and work flow data for the determined industry.

9. The technician control system of claim 7 wherein accessing, from the at least one electronic data store, pre-defined work order data and work flow data related to handling the work order based on the industry associated with the technician device comprises:
identifying, from among multiple clients, a client associated with the technician device; and
accessing, from the at least one electronic data store, pre-defined work order data and work flow data for which the technician control system has been configured to leverage for the identified client.

10. A computer-implemented method comprising:
identifying, at a control system, technicians supervised by a particular supervisor that uses a particular device;
determining, using at least one processor of the control system, progress of scheduled work orders for each of the identified technicians;
enabling the supervisor to view data reflecting the determined progress of scheduled work orders;
monitoring progress of the scheduled work orders for each of the identified technicians;
based on the monitoring, detecting whether a schedule or quality issue occurs in the scheduled work orders for each of the identified technicians; and
in response to detecting that a schedule or quality issue has occurred in at least one of the scheduled work orders being handled by at least one of the identified technicians:
sending, to the particular device used by the particular supervisor, a message to alert the supervisor of the detected issue; and
assisting the supervisor in taking action to correct the detected issue.

11. The method of claim 10:
wherein detecting whether a schedule or quality issue occurs in the scheduled work orders for each of the identified technicians comprises:
comparing progress of a particular work order being handled by a particular technician to an expected progress for the particular work order;
based on the comparison, determining whether the progress of the particular work order being handled by the particular technician is behind the expected progress by more than a threshold amount;
detecting an issue in response to a determination that the progress of the particular work order being handled by the particular technician is behind the expected progress by more than the threshold amount; and detecting that an issue does not exist in response to a determination that the progress of the particular work order being handled by the particular technician is not behind the expected progress by more than the threshold amount;
wherein sending, to the particular device used by the particular supervisor, the message to alert the supervisor of the detected issue comprises sending a message that indicates that the particular technician is behind schedule in performing the particular work order, that provides an indication of the progress of the particular work order being handled by the particular technician, and that provides an indication of the expected progress; and
wherein assisting the supervisor in taking action to correct the detected issue comprises:
enabling the supervisor to respond to the message by communicating with the particular technician;
enabling the supervisor to respond to the message by receiving directions to attend the particular work order; and
enabling the supervisor to respond to the message by sending another technician to assist the particular technician with the particular work order.

12. The method of claim 10:
wherein detecting whether a schedule or quality issue occurs in the scheduled work orders for each of the identified technicians comprises:
determining an expected amount of time remaining for a particular technician to complete a particular work order being handled by the particular technician;
determining a travel time between a location of the particular work order and a location of a next work order scheduled for completion by the particular technician;
identifying a scheduled start time of the next work order scheduled for completion by the particular technician;
analyzing the expected amount of time remaining for the particular technician to complete the particular work order and the determined travel time with respect to the scheduled start time of the next work order;
based on the analysis, determining whether the particular technician is likely to miss the scheduled start time of the next work order;
detecting an issue in response to a determination that the particular technician is likely to miss the scheduled start time of the next work order; and
detecting that an issue does not exist in response to a determination that the particular technician is not likely to miss the scheduled start time of the next work order;
wherein sending, to the particular device used by the particular supervisor, the message to alert the supervisor of the detected issue comprises sending a message that indicates that the particular technician is likely to miss the scheduled start time of the next work order, that provides an indication of the expected amount of time remaining for the particular technician to complete the particular work order, that provides an indication of the determined travel time, and that provides an indication of the scheduled start time of the next work order; and
wherein assisting the supervisor in taking action to correct the detected issue comprises:
enabling the supervisor to respond to the message by rescheduling the next work order for the particular technician; and
enabling the supervisor to respond to the message by communicating with a customer corresponding to the next work order.

13. The method of claim 10 further comprising:
controlling, using the at least one processor of the control system, scheduling and dispatch operations for multiple, different clients;
maintaining segregated data areas for each of the multiple, different clients;
controlling access to the segregated areas using admission rights;
storing configuration data for each of the multiple, different clients; and
controlling scheduling and dispatch operations for each of the multiple, different clients in a configured manner that leverages the stored configuration data for each of the multiple, different clients.

14. The method of claim 13 further comprising:
establishing a particular client;
defining, in at least one electronic data store, a segregated data area for the particular client, the segregated data area being separate from other data areas associated with other clients of the control system;
setting admission rights and privileges for the particular client to enable users associated with the particular client to access the segregated data area;
enabling the particular client to configure standard, pre-defined assets and applications of the control system; and
storing configuration data for the particular client that reflects configurations to the standard, pre-defined assets and applications made by the particular client.

15. The method of claim 13 further comprising:
receiving a request from a technician device;
identifying, from among the multiple, different clients, a client associated with the technician device;
comparing admission rights of the technician device to admission rights of the identified client;
based on the comparison, determining whether the technician device is authorized to perform the request;
in response to a determination that the technician device is not authorized to perform the request, denying the request; and
in response to a determination that the technician device is authorized to perform the request:
handling the request using standard, pre-defined assets and applications based on configurations defined by the identified client; and
storing data related to the request in a segregated data area associated with the identified client.

16. The method of claim 10 further comprising:
receiving a request associated with a work order from a technician device;
accessing, from at least one electronic data store, pre-defined work order data and work flow data related to handling the work order based on an industry associated with the technician device;
controlling user interface display on the technician device and data collection on the technician device related to the work order based on the accessed work order data; and
controlling processing flow related to handling the work order on the technician device based on the accessed work flow data.

17. The method of claim 16 wherein accessing, from the at least one electronic data store, pre-defined work order data and work flow data related to handling the work order based on the industry associated with the technician device comprises:

determining, from among the multiple, different industries, the industry associated with the technician device; and accessing, from the at least one electronic data store, pre-defined work order data and work flow data for the determined industry.

18. The method of claim 16 wherein accessing, from the at least one electronic data store, pre-defined work order data and work flow data related to handling the work order based on the industry associated with the technician device comprises:

identifying, from among multiple clients, a client associated with the technician device; and accessing, from the at least one electronic data store, pre-defined work order data and work flow data for which the technician control system has been configured to leverage for the identified client.

19. At least one non-transitory computer-readable storage medium encoded with executable instructions that, when executed by at least one processor, cause the at least one processor to perform operations comprising:

identifying technicians supervised by a particular supervisor that uses a particular device;

determining progress of scheduled work orders for each of the identified technicians;

enabling the supervisor to view data reflecting the determined progress of scheduled work orders;

monitoring progress of the scheduled work orders for each of the identified technicians;

based on the monitoring, detecting whether a schedule or quality issue occurs in the scheduled work orders for each of the identified technicians; and in response to detecting that a schedule or quality issue has occurred in at least one of the scheduled work orders being handled by at least one of the identified technicians:

sending, to the particular device used by the particular supervisor, a message to alert the supervisor of the detected issue; and assisting the supervisor in taking action to correct the detected issue.

20. The computer-readable storage medium of claim 19:

wherein detecting whether a schedule or quality issue occurs in the scheduled work orders for each of the identified technicians comprises:

comparing progress of a particular work order being handled by a particular technician to an expected progress for the particular work order;

based on the comparison, determining whether the progress of the particular work order being handled by the particular technician is behind the expected progress by more than a threshold amount;

detecting an issue in response to a determination that the progress of the particular work order being handled by the particular technician is behind the expected progress by more than the threshold amount; and detecting that an issue does not exist in response to a determination that the progress of the particular work order being handled by the particular technician is not behind the expected progress by more than the threshold amount;

wherein sending, to the particular device used by the particular supervisor, the message to alert the supervisor of the detected issue comprises sending a message that indicates that the particular technician is behind schedule in performing the particular work order, that provides an indication of the progress of the particular work order being handled by the particular technician, and that provides an indication of the expected progress; and wherein assisting the supervisor in taking action to correct the detected issue comprises:

enabling the supervisor to respond to the message by communicating with the particular technician;

enabling the supervisor to respond to the message by receiving directions to attend the particular work order; and enabling the supervisor to respond to the message by sending another technician to assist the particular technician with the particular work order.

* * * * *